(12) United States Patent
Kawashima et al.

(10) Patent No.: US 12,276,889 B1
(45) Date of Patent: Apr. 15, 2025

(54) DISPLAY DEVICE, OPERATION METHOD OF DISPLAY DEVICE, AND ELECTRONIC DEVICE

(71) Applicant: Semiconductor Energy Laboratory Co., Ltd., Kanagawa-ken (JP)

(72) Inventors: Susumu Kawashima, Kanagawa (JP); Tetsuji Ishitani, Kanagawa (JP); Kouhei Toyotaka, Kanagawa (JP); Koji Kusunoki, Kanagawa (JP); Daisuke Kubota, Kanagawa (JP); Akio Yamashita, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 1232 days.

(21) Appl. No.: 17/044,515

(22) PCT Filed: Mar. 27, 2019

(86) PCT No.: PCT/IB2019/052473
§ 371 (c)(1),
(2) Date: Oct. 1, 2020

(87) PCT Pub. No.: WO2019/193454
PCT Pub. Date: Oct. 10, 2019

(30) Foreign Application Priority Data

Apr. 6, 2018 (JP) .................. 2018-073883

(51) Int. Cl.
*G02F 1/1362* (2006.01)
*G02F 1/1334* (2006.01)
*G02F 1/1368* (2006.01)

(52) U.S. Cl.
CPC ...... *G02F 1/136286* (2013.01); *G02F 1/1334* (2013.01); *G02F 1/13624* (2013.01); *G02F 1/1368* (2013.01)

(58) Field of Classification Search
CPC ................ G02F 1/1334; G02F 1/1343; G02F 1/134309; G02F 1/134345; G02F 1/1362;
(Continued)

(56) References Cited

U.S. PATENT DOCUMENTS

| 5,712,652 A | 1/1998 | Sato et al. |
| 6,600,540 B2 | 7/2003 | Yamakita et al. |

(Continued)

FOREIGN PATENT DOCUMENTS

| CN | 106782359 A | 5/2017 |
| JP | 58-023091 A | 2/1983 |

(Continued)

OTHER PUBLICATIONS

Patent Translate JP 2009075300 (Apr. 9, 2009).*

(Continued)

*Primary Examiner* — Thoi V Duong
(74) *Attorney, Agent, or Firm* — Husch Blackwell LLP

(57) ABSTRACT

A display device including a circuit suitable for controlling a liquid crystal element is provided. The display device includes two memories in one pixel and a plurality of pixels arranged in the horizontal and vertical directions share a gate line. The display device includes a liquid crystal element and by writing charges to different polarity capacitors, power consumption in an inversion operation can be reduced. Furthermore, a liquid crystal element with a high threshold voltage can be suitably used and a wide range of voltages can be applied without impairing grayscale display characteristics in the display device. Furthermore, a voltage higher than or equal to an output voltage of a source driver can be applied to the liquid crystal element.

10 Claims, 30 Drawing Sheets

(58) Field of Classification Search
CPC ........... G02F 1/136213; G02F 1/13624; G02F 1/136286; G02F 1/1368
See application file for complete search history.

(56) References Cited

U.S. PATENT DOCUMENTS

| | | | |
|---|---|---|---|
| 6,603,525 | B2 | 8/2003 | Yamakita et al. |
| 6,661,491 | B2 | 12/2003 | Yamakita et al. |
| 6,933,916 | B2 | 8/2005 | Nakao et al. |
| 7,167,152 | B2 | 1/2007 | Nakamura |
| 7,674,650 | B2 | 3/2010 | Akimoto et al. |
| 7,732,819 | B2 | 6/2010 | Akimoto et al. |
| 7,910,490 | B2 | 3/2011 | Akimoto et al. |
| 7,932,521 | B2 | 4/2011 | Akimoto et al. |
| 8,102,346 | B2 | 1/2012 | Watanabe |
| 8,274,077 | B2 | 9/2012 | Akimoto et al. |
| 8,466,463 | B2 | 6/2013 | Akimoto et al. |
| 8,629,069 | B2 | 1/2014 | Akimoto et al. |
| 8,669,550 | B2 | 3/2014 | Akimoto et al. |
| 8,796,069 | B2 | 8/2014 | Akimoto et al. |
| 8,860,108 | B2 | 10/2014 | Yamazaki et al. |
| 9,099,562 | B2 | 8/2015 | Akimoto et al. |
| 10,109,633 | B2 | 10/2018 | Kurokawa |
| 10,545,377 | B2 | 1/2020 | Mizuno et al. |
| 10,733,946 | B2 | 8/2020 | Kurokawa |
| 11,404,016 | B2 | 8/2022 | Kurokawa |
| 2009/0079684 | A1 | 3/2009 | Watanabe |
| 2009/0213286 | A1* | 8/2009 | Kim .................. G02F 1/136286 349/39 |
| 2013/0292671 | A1 | 11/2013 | Yamazaki et al. |
| 2017/0317085 | A1 | 11/2017 | Kurokawa |
| 2020/0150490 | A1 | 5/2020 | Mizuno et al. |

FOREIGN PATENT DOCUMENTS

| | | |
|---|---|---|
| JP | 08-286170 A | 11/1996 |
| JP | 2003-107506 A | 4/2003 |
| JP | 2004-163890 A | 6/2004 |
| JP | 2007-096055 A | 4/2007 |
| JP | 2007-123861 A | 5/2007 |
| JP | 2009-075300 A | 4/2009 |
| JP | 2011-119674 A | 6/2011 |
| JP | 2016-103026 A | 6/2016 |
| JP | 2017-201570 A | 11/2017 |
| JP | 2018-021974 A | 2/2018 |
| JP | 2018-036639 A | 3/2018 |
| JP | 7273800 | 5/2023 |
| TW | 201816761 | 5/2018 |
| WO | WO-2018/037335 | 3/2018 |
| WO | WO-2019/193454 | 10/2019 |

OTHER PUBLICATIONS

International Search Report (Application No. PCT/IB2019/052473) Dated Jul. 2, 2019.
Written Opinion (Application No. PCT/IB2019/052473) Dated Jul. 2, 2019.

* cited by examiner

N-1-th frame (Positive polarity driving)

N-th frame (Negative polarity driving)

N+1-th frame (Positive polarity driving)

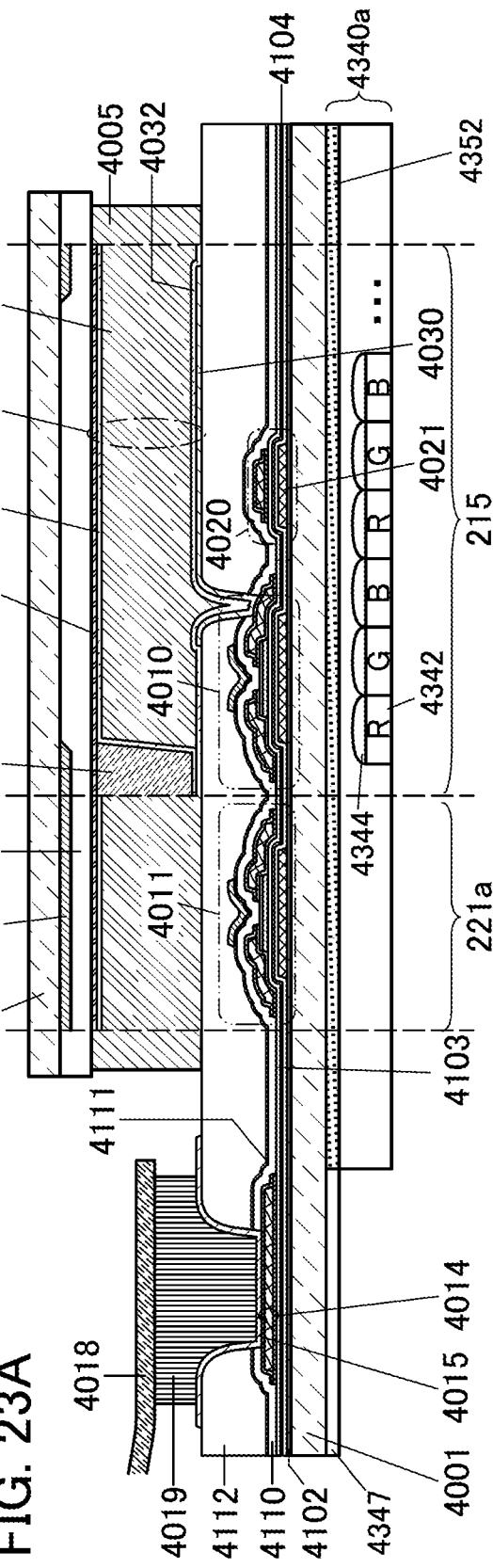
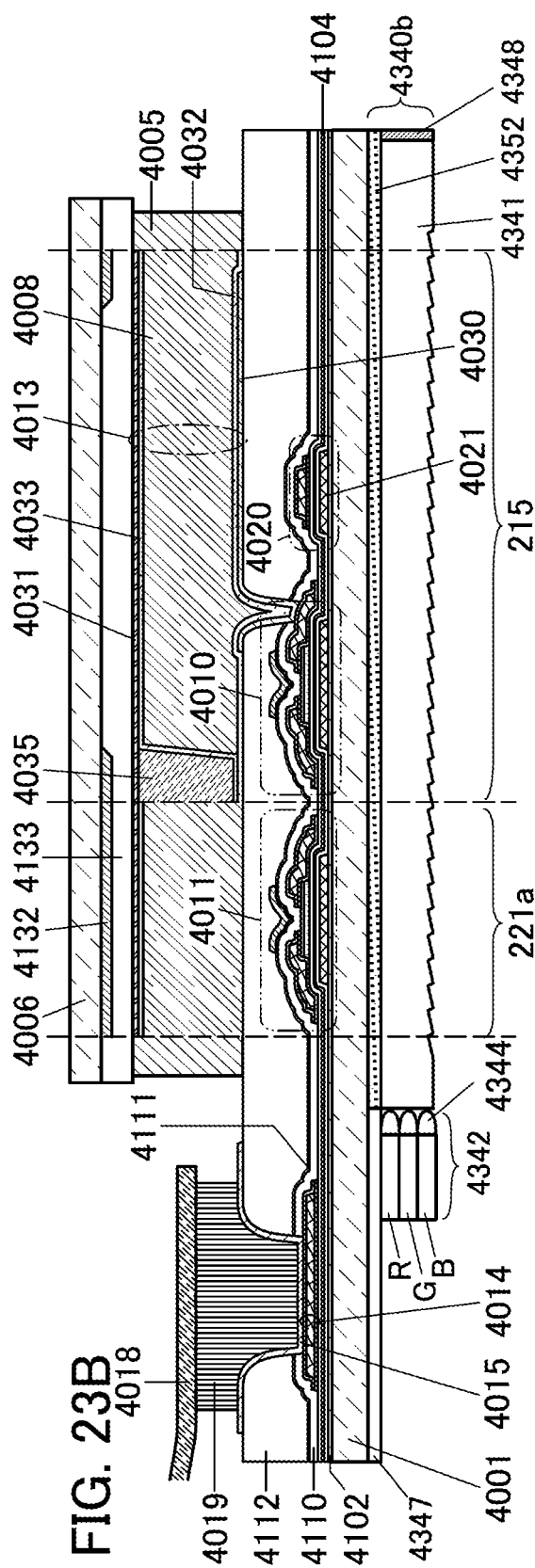
FIG. 23A
FIG. 23B

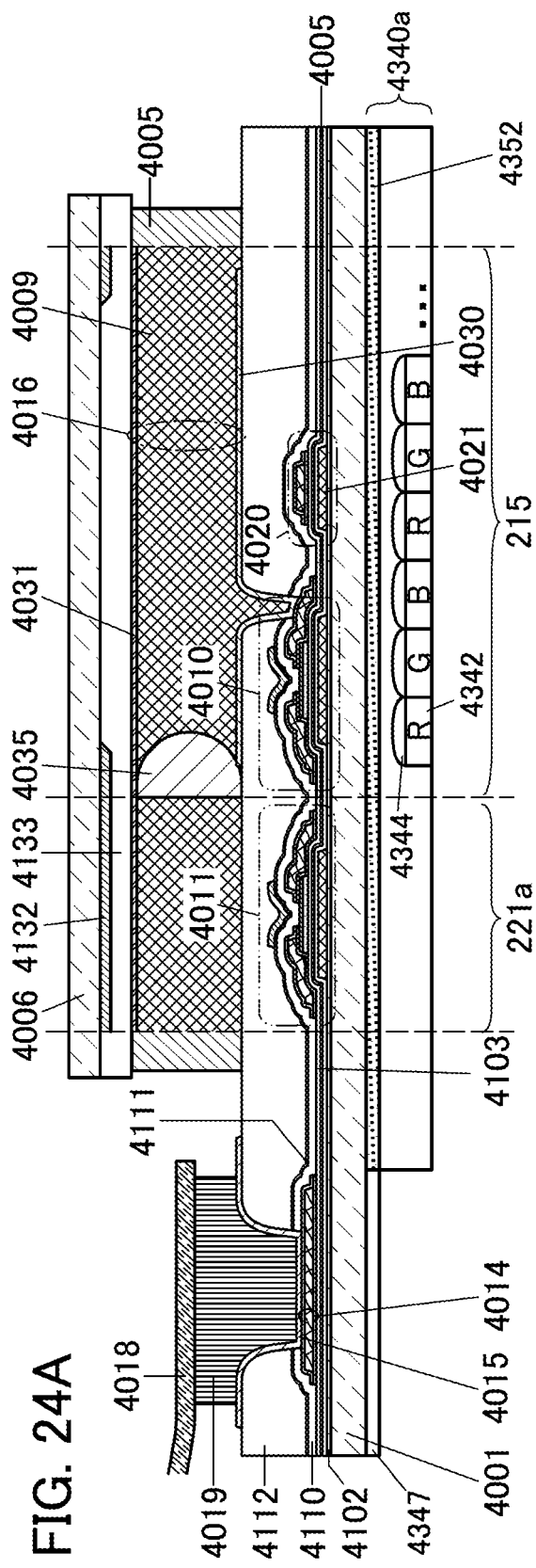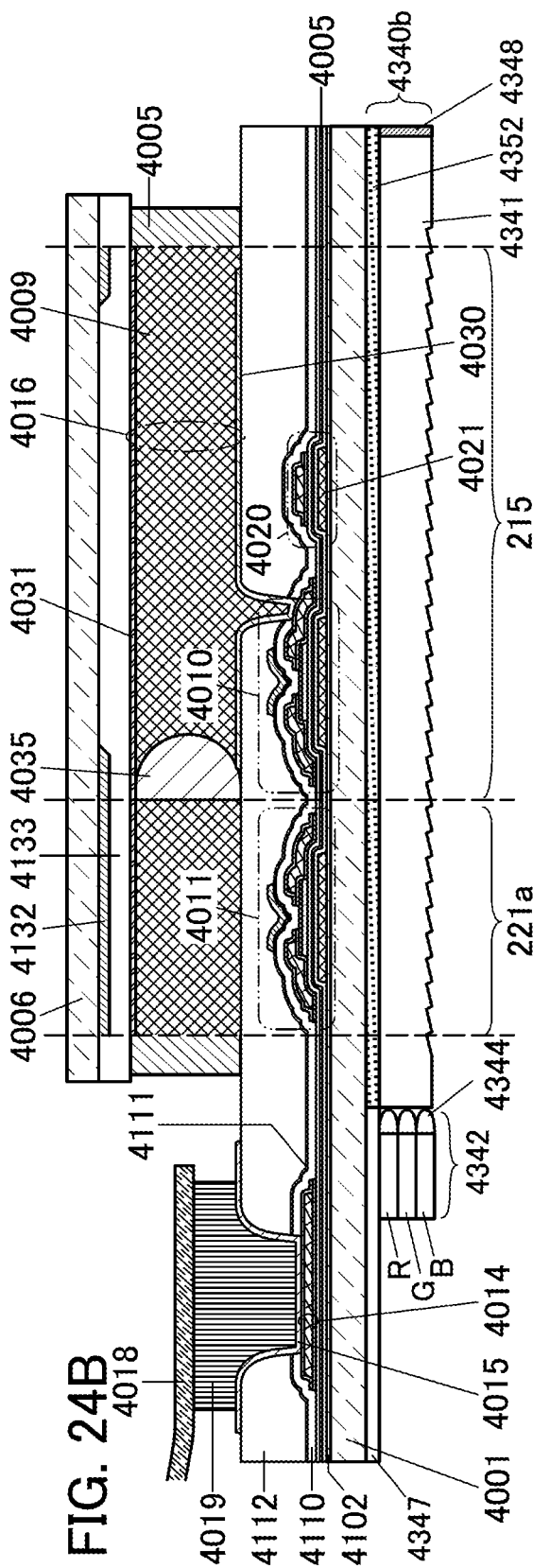

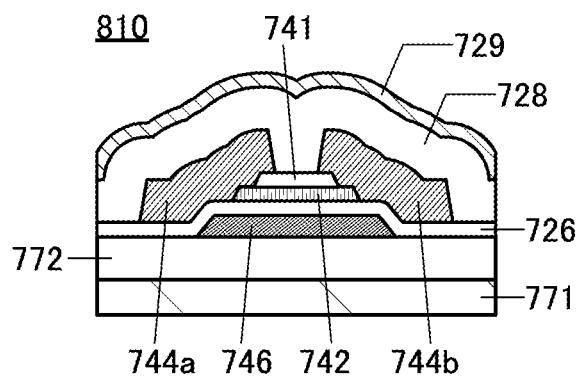
FIG. 26A1
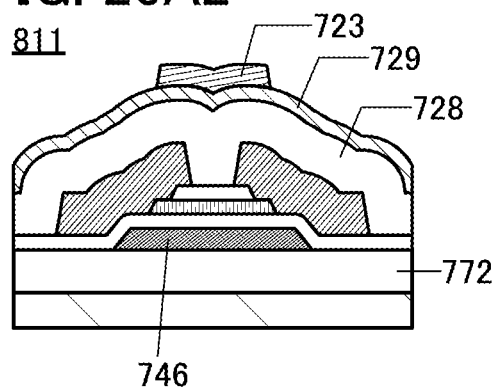
FIG. 26A2
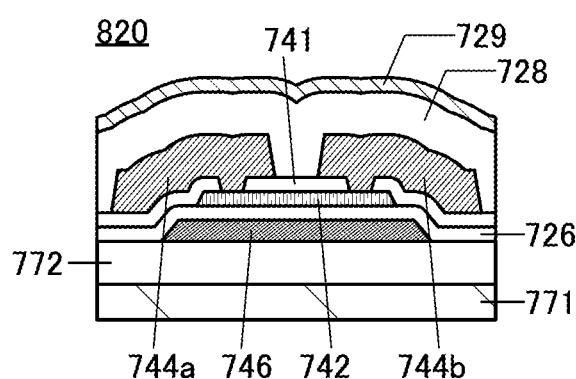
FIG. 26B1
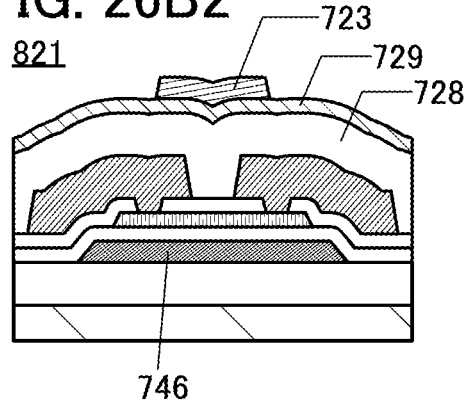
FIG. 26B2
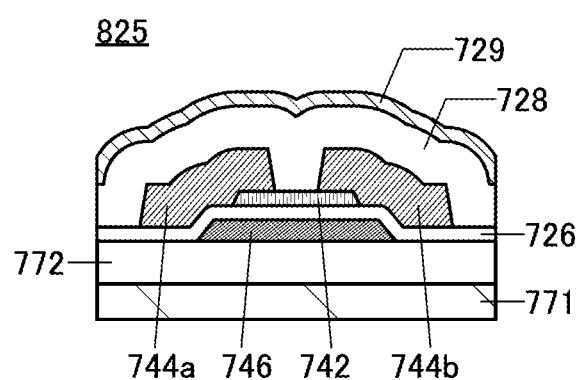
FIG. 26C1
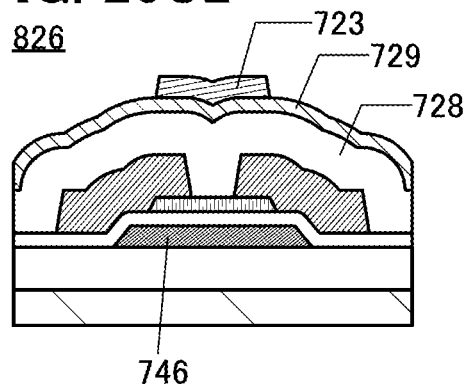
FIG. 26C2

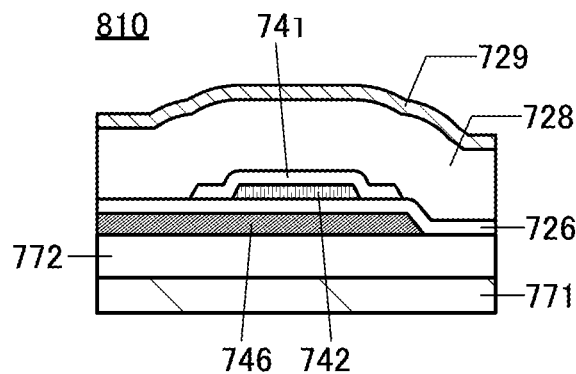
FIG. 27A1
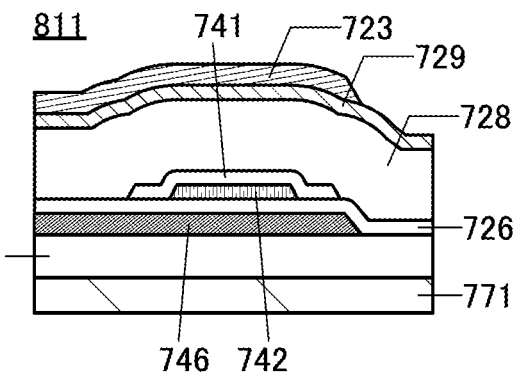
FIG. 27A2
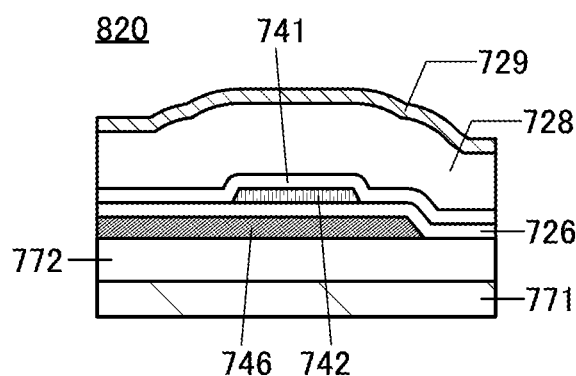
FIG. 27B1
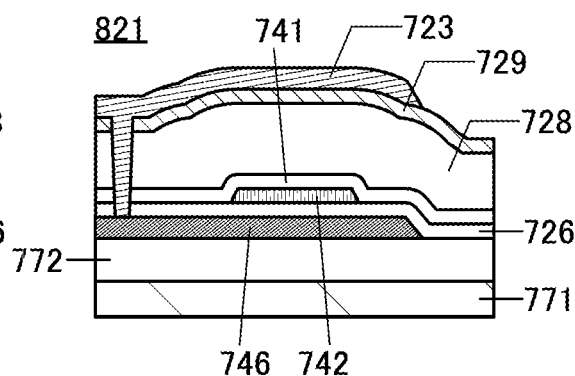
FIG. 27B2
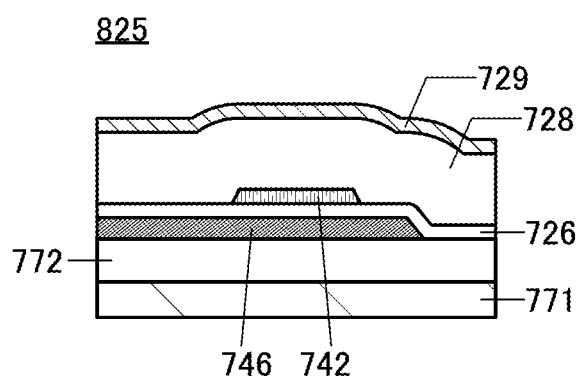
FIG. 27C1
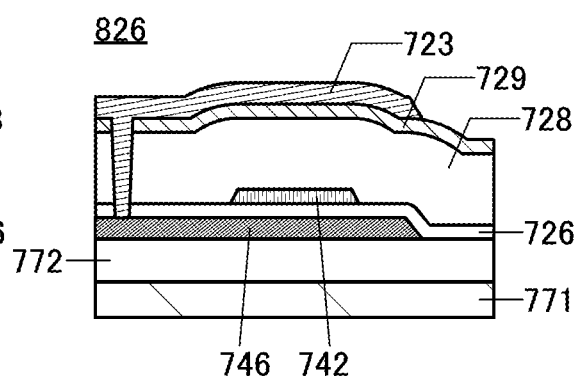
FIG. 27C2

FIG. 28A1
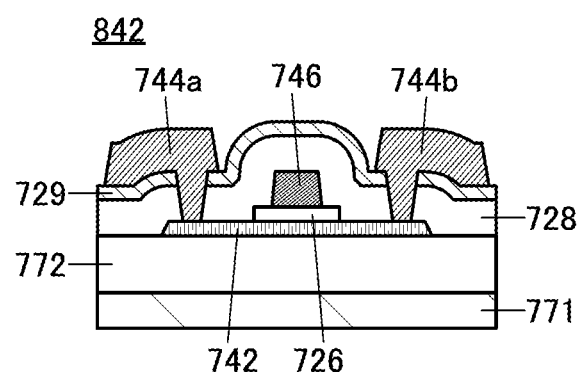
FIG. 28A2
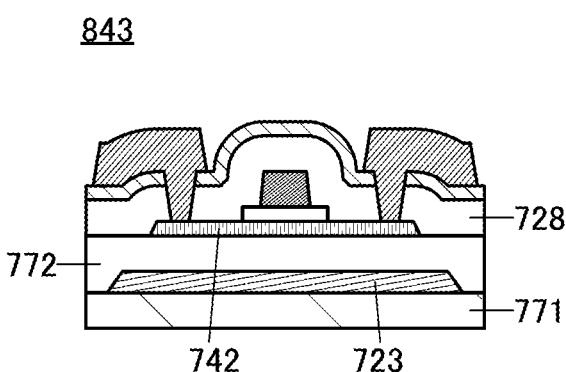
FIG. 28B1
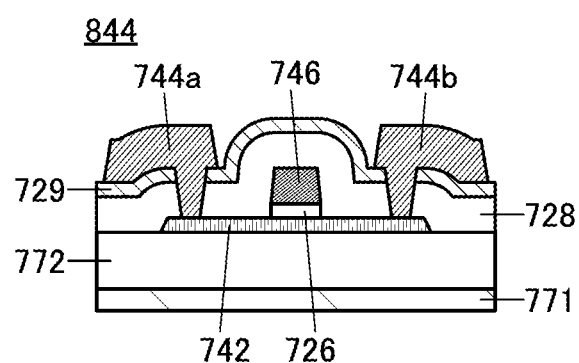
FIG. 28B2
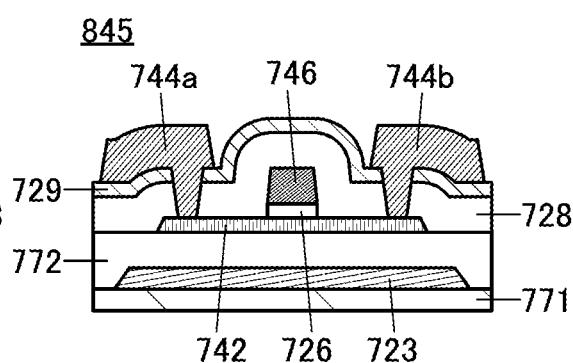
FIG. 28C1
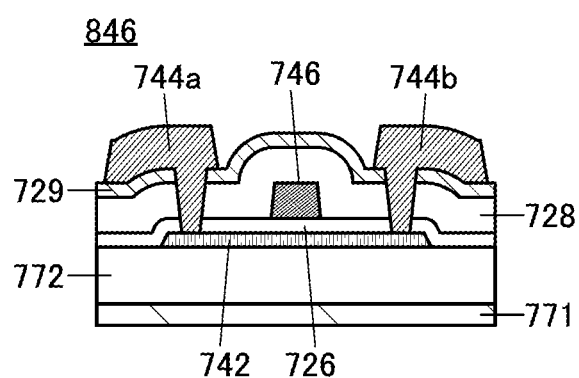
FIG. 28C2
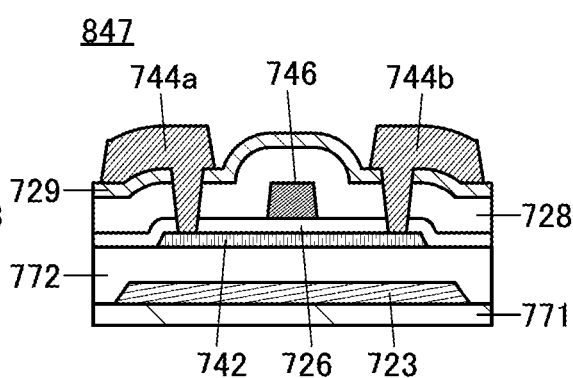

FIG. 29A1
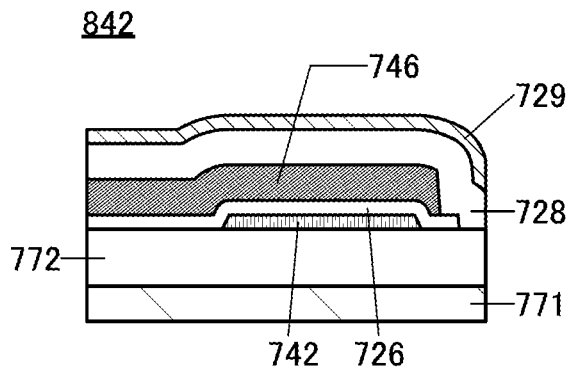
FIG. 29A2
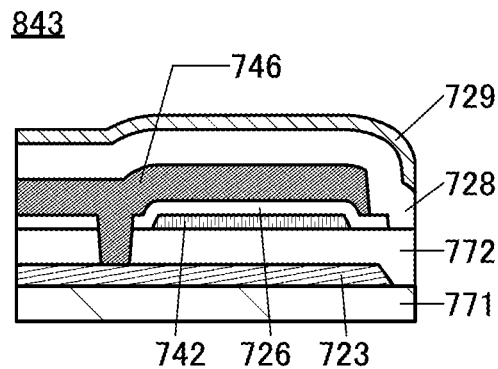
FIG. 29B1
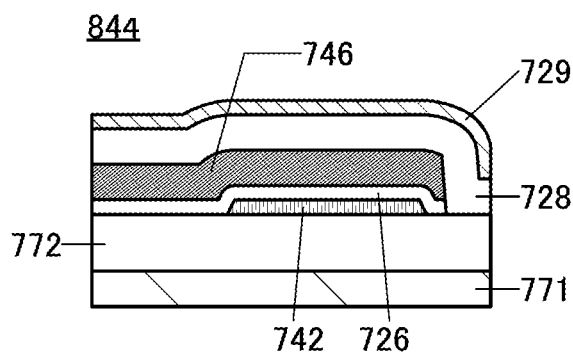
FIG. 29B2
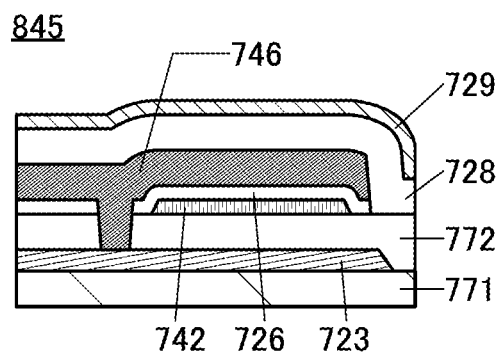
FIG. 29C1
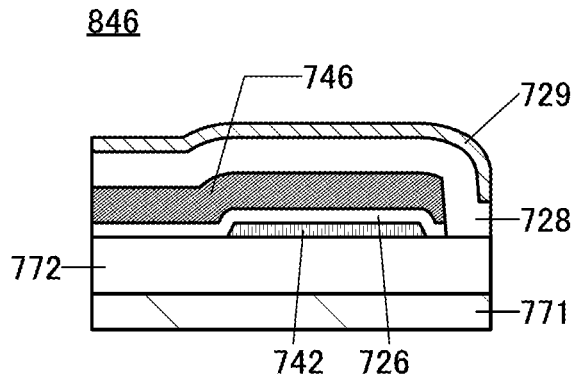
FIG. 29C2
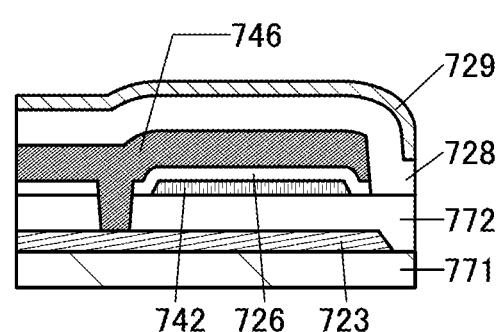

DISPLAY DEVICE, OPERATION METHOD OF DISPLAY DEVICE, AND ELECTRONIC DEVICE

This application is a 371 of international application PCT/IB2019/052473 filed on Mar. 27, 2019 which is incorporated herein by reference.

TECHNICAL FIELD

One embodiment of the present invention relates to a display device.

Note that one embodiment of the present invention is not limited to the above technical field. The technical field of one embodiment of the invention disclosed in this specification and the like relates to an object, a method, or a manufacturing method. One embodiment of the present invention relates to a process, a machine, manufacture, or a composition (composition of matter). Accordingly, more specifically, the following can be given as an example of the technical field of one embodiment of the present invention disclosed in this specification: a semiconductor device, a display device, a liquid crystal display device, a light-emitting device, a lighting device, a power storage device, a memory device, an imaging device, a method for operating any of them, or a method for manufacturing any of them.

In this specification and the like, a semiconductor device generally means a device that can function by utilizing semiconductor characteristics. A transistor and a semiconductor circuit are embodiments of semiconductor devices. In some cases, a memory device, a display device, an imaging device, or an electronic device includes a semiconductor device.

BACKGROUND ART

A technique for forming transistors using a metal oxide formed over a substrate has been attracting attention. For example, a technique in which a transistor formed using zinc oxide or In—Ga—Zn-based oxide is used as a switching element or the like of a pixel of a display device is disclosed in Patent Document 1 and Patent Document 2.

Patent Document 3 discloses a memory device using a transistor with an extremely low off-state current in a memory cell.

Furthermore, in liquid crystal display devices, various improvements and applications have been performed. For example, Patent Document 4 discloses a liquid crystal display device using an OCB (Optically Compensated Bend) mode to improve response speed. Furthermore, Patent Document 5 discloses a transparent display which performs display with a field sequential operation.

REFERENCE

Patent Document

[Patent Document 1] Japanese Published Patent Application No. 2007-123861
[Patent Document 2] Japanese Published Patent Application No. 2007-96055
[Patent Document 3] Japanese Published Patent Application No. 2011-119674
[Patent Document 4] Japanese Published Patent Application No. 2003-107506
[Patent Document 5] Japanese Published Patent Application No. 2018-21974

SUMMARY OF THE INVENTION

Problems to be Solved by the Invention

In general, liquid crystal display devices are said to have slow response speed and video display quality thereof are inferior to that of self-luminous display devices. On the other hand, the response speed of liquid crystal display devices can be significantly improved by utilizing an OCB mode using special alignment control.

In addition, transparent displays utilizing a polymer-dispersed liquid crystal have been developed. Since the transparent display can be used instead of glass windows, various applications are expected such as displaying information on car displays and show windows.

However, an element using an OCB mode and a polymer-dispersed liquid crystal (reverse mode) has a high threshold voltage; therefore, a relatively high voltage is needed to be applied to drive the element. Therefore, a problem arises in power consumption and choosing a driver IC.

In an OCB mode, it is necessary to use a special driving method such as applying a high voltage and maintaining a voltage at a certain value or higher for alignment control.

Therefore, an object of one embodiment of the present invention is to provide a display device including a circuit suitable for controlling a liquid crystal element. Another object is to provide a display device capable of applying a high voltage to a liquid crystal element. Another object is to provide a display device capable of applying a voltage higher than or equal to an output voltage of a source driver to a liquid crystal element.

Alternatively, an object of one embodiment of the present invention is to provide a low-power display device. Another object of one embodiment of the present invention is to provide a highly reliable display device. Another object of one embodiment of the present invention is to provide a novel display device or the like. Another object of one embodiment of the present invention is to provide an operation method of the display device. Another object of one embodiment of the present invention is to provide a novel semiconductor device or the like.

Note that the descriptions of these objects do not disturb the existence of other objects. One embodiment of the present invention does not have to achieve all the objects. Other objects will be apparent from and can be derived from the description of the specification, the drawings, the claims, and the like.

Means for Solving the Problems

One embodiment of the present invention relates to a display device including a circuit suitable for controlling operation of a liquid crystal element and an operation method thereof.

One embodiment of the present invention is a display device including a first pixel, a second pixel, a first wiring, a second wiring, a third wiring, a fourth wiring, a fifth wiring, and a sixth wiring; each of the first pixel and the second pixel includes a first transistor, a first memory, a second memory, and a liquid crystal element; in each of the first pixel and the second pixel, a gate of the first transistor is electrically connected to the first wiring, one of a source and a drain of the first transistor is electrically connected to the sixth wiring, the other of the source and the drain of the first transistor is electrically connected to one of electrodes of the liquid crystal element, the first memory is electrically connected to the second wiring, the first memory is electrically connected to the one of the electrodes of the liquid crystal element, the second memory is electrically connected to the third wiring, and the second memory is electrically connected to the one of the electrodes of the liquid crystal element; in the first pixel, the first memory is electrically connected to the fourth wiring, and the second memory is electrically connected to the fifth wiring; in the second pixel, the first memory is electrically connected to the fifth wiring, and the second memory is electrically connected to the fourth wiring.

Moreover, each of the first pixel and the second pixel includes a first capacitor and in each of the first pixel and the second pixel, one of electrodes of the first capacitor is electrically connected to the one of the electrodes of the liquid crystal element.

The first memory includes a second transistor and a second capacitor; the second memory includes a third transistor and a third capacitor; in each of the first pixel and the second pixel, a gate of the second transistor is electrically connected to the second wiring, one of a source and a drain of the second transistor is electrically connected to one of electrodes of the second capacitor, the other of the electrodes of the second capacitor is electrically connected to the one of the electrodes of the liquid crystal element, a gate of the third transistor is electrically connected to the third wiring, one of a source and a drain of the third transistor is electrically connected to one of electrodes of the third capacitor, and the other of the electrodes of the third capacitor is electrically connected to the one of the electrodes of the liquid crystal element; in the first pixel, the other of the source and the drain of the second transistor is electrically connected to the fourth wiring, and the other of the source and the drain of the third transistor is electrically connected to the fifth wiring; in the second pixel, the other of the source and the drain of the second transistor is electrically connected to the fifth wiring, and the other of the source and the drain of the third transistor is electrically connected to the fourth wiring.

Moreover, the display device includes a third pixel and a fourth pixel; each of the third pixel and the fourth pixel includes a fourth transistor; in each of the third pixel and the fourth pixel, a gate of the fourth transistor is electrically connected to the first wiring, and one of a source and a drain of the fourth transistor may be electrically connected to the sixth wiring.

As the liquid crystal element, an element which is driven with an OCB mode can be used. Alternatively, an element including a polymer-dispersed liquid crystal can be used.

The first transistor includes a metal oxide in a channel formation region and the metal oxide includes In, Zn, and M (M is Al, Ti, Ga, Sn, Y, Zr, La, Ce, Nd, or Hf).

Another embodiment of the present invention is an operation method of a display device in which one of a source and a drain of a transistor, one of electrodes of a first capacitor, and one of electrodes of a second capacitor are electrically and directly connected to a node to which one of electrodes of a liquid crystal element is connected; a first step in which an operation of supplying one of a high potential and a low potential to the one of the electrodes of the liquid crystal element through the transistor and an operation of supplying the other of the high potential and the low potential to the other of the electrodes of the first capacitor are included; a second step in which an operation of supplying one of the high potential and the low potential to the other of the electrodes of the first capacitor is included; the first step and the second step are performed in this order.

In the second step, an absolute value of a potential of the one of the electrodes of the liquid crystal element is preferably higher than or equal to 15 V.

Moreover, a third step may be included in which an operation of supplying a first potential to the one of the electrodes of the liquid crystal element through the transistor and an operation of supplying a second potential to the other of the electrodes of the second capacitor; the first step, the third step, and the second step are performed in this order.

The first step may include an operation of supplying the other of the high potential and the low potential to the other of the electrodes of the second capacitor, and the second step may include an operation of supplying the one of the high potential and the low potential to the other of the electrodes of the second capacitor.

Alternatively, an operation method in which the one of the electrodes of the third capacitor is electrically and directly connected to a node to which the one of the electrodes of the liquid crystal element is connected; the first step includes an operation of supplying the other of the high potential and the low potential to the other of the electrodes of the third capacitor; the third step includes an operation of supplying the one of the high potential and the low potential to the other of the electrodes of the third capacitor; the first step, the third step, and the second step may be performed in this order.

Another embodiment of the present invention is an operation method of a display device in which one of a source and a drain of a transistor, one of electrodes of a first capacitor and one of electrodes of a second capacitor are electrically and directly connected to a node to which one of electrodes of a liquid crystal element is connected, including the following steps: a first step in which an operation of supplying a first potential to the one of the electrodes of the liquid crystal element through the transistor and an operation of supplying a second potential to the other of the electrodes of the first capacitor are included; a second step of supplying a third potential to the other of the electrodes of the second capacitor; a third step in which an operation of supplying a fourth potential to the one of the electrodes of the liquid crystal element through the transistor and an operation of supplying a fifth potential to the other of the electrodes of the first capacitor are included; and a fourth step of supplying a sixth potential to the other of the electrodes of the first capacitor; the first step, the second step, the third step, and the fourth step are performed in this order.

Absolute values of the second potential and the fifth potential may be twice the value of an absolute value of the first potential or the fourth potential or a neighborhood value of twice the value. Alternatively, the first potential and the fourth potential may be the same, and the second potential may be an inversion potential of the sixth potential.

Effect of the Invention

By using one embodiment of the present invention, a display device including a circuit suitable for controlling a liquid crystal element can be provided. Alternatively, a display device capable of supplying a high voltage to a liquid crystal element can be provided. Alternatively, a display device capable of applying a voltage higher than or equal to an output voltage of a source driver to a liquid crystal element can be provided.

Alternatively, a low-power display device can be provided. Alternatively, a highly reliable display device can be provided. Alternatively, a novel display device or the like can be provided. Alternatively, an operation method of the display device can be provided. Alternatively, a novel semiconductor device or the like can be provided.

BRIEF DESCRIPTION OF THE DRAWINGS

FIGS. 23(A) and (B) Diagrams showing display devices.
FIGS. 24(A) and (B) Diagrams showing display devices.
FIG. 26(A1) to (C2) Diagrams showing transistors.
FIG. 27(A1) to (C2) Diagrams showing transistors.
FIG. 28(A1) to (C2) Diagrams showing transistors.
FIG. 29(A1) to (C2) Diagrams showing transistors.

MODE FOR CARRYING OUT THE INVENTION

Figure 1:
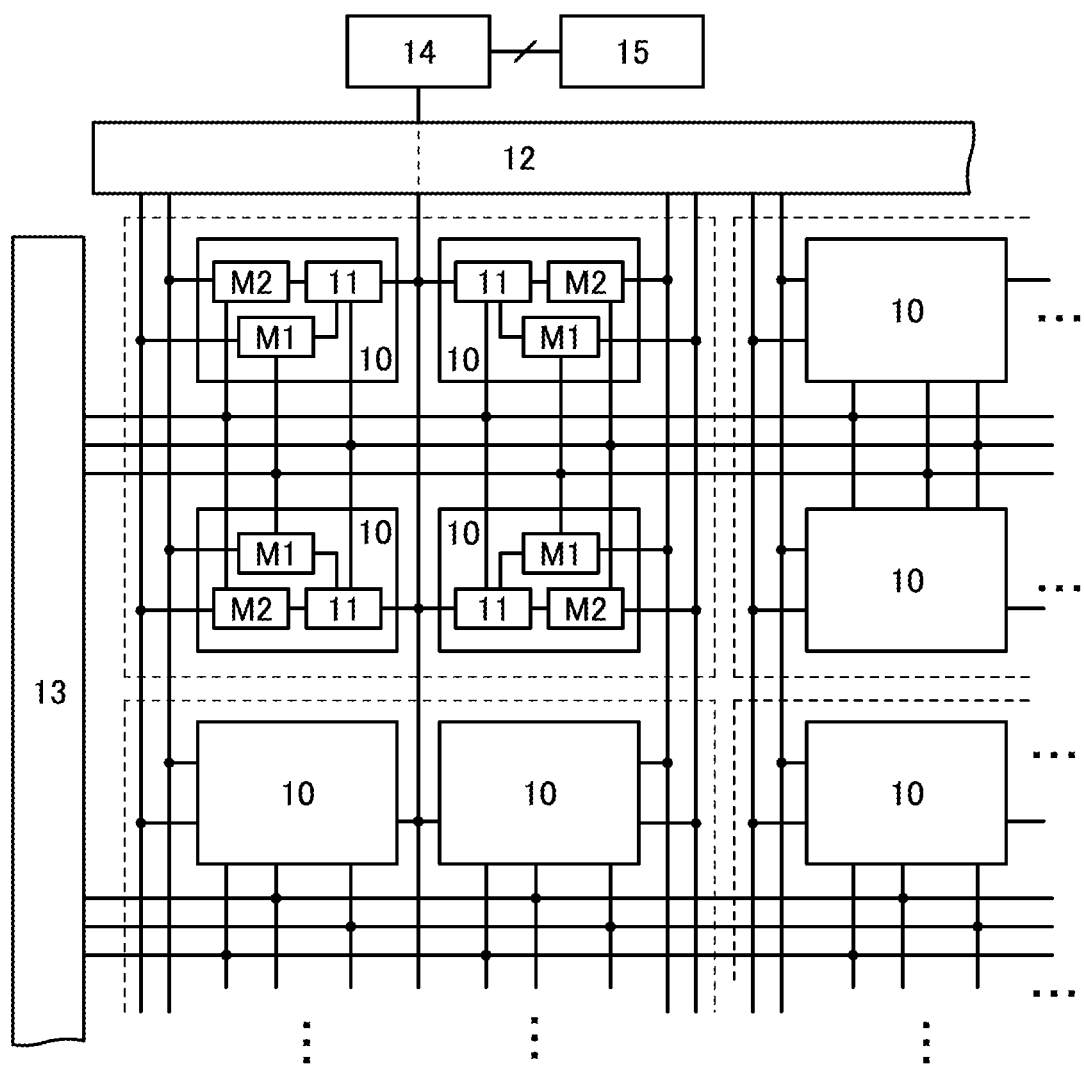
FIG. 1 A diagram showing a display device.

Embodiments will be described in detail with reference to the drawings. Note that the present invention is not limited to the following description and it will be readily appreciated by those skilled in the art that modes and details can be modified in various ways without departing from the spirit and the scope of the present invention. Therefore, the present invention should not be interpreted as being limited to the description of embodiments below. Note that in structures of the invention described below, the same portions or portions having similar functions are denoted by the same reference numerals in different drawings, and the description thereof is not repeated in some cases. The same components are denoted by different hatching patterns in different drawings, or the hatching patterns are omitted in some cases.

Even in the case where a single component is illustrated in a circuit diagram, the component may be composed of a plurality of parts as long as there is no functional inconvenience. For example, in some cases, a plurality of transistors that operate as switches are connected in series or in parallel. In some cases, capacitors are divided and arranged in a plurality of positions.

One conductor has a plurality of functions such as a wiring, an electrode, and a terminal in some cases, and in this specification, a plurality of names are used for the same component in some cases. Even in the case where elements are shown in a circuit diagram as if they were directly connected to each other, the elements may actually be connected to each other through a plurality of conductors. In this specification, such a configuration is included in the category of direct connection.

Embodiment 1

In this embodiment, a display device of one embodiment of the present invention will be described with reference to drawings.

One embodiment of the present invention is a display device in which two memories are included in one pixel and a gate line is shared by a plurality of pixels arranged in the horizontal and vertical directions. The display device includes a liquid crystal element and power consumption in an inversion operation can be reduced. Furthermore, a liquid crystal element with a high threshold voltage can be suitably used and a wide range of voltages required for grayscale display can be applied in the display device.

FIG. 1 is a diagram showing a display device of one embodiment of the present invention. The display device includes a pixel 10, a source driver 12, and a gate driver 13.

The pixel 10 includes a memory M1, a memory M2, and a circuit block 11. The memory M1 and the memory M2 are electrically connected to the circuit block 11. The circuit block 11 includes a transistor, a capacitor, and a liquid crystal element which are electrically connected to each other, for example.

In two pixels 10 which are adjacent to each other in the vertical direction (the direction to which the source line extends), the memory M1 included in each of the two pixels 10 is electrically connected to a first wiring (gate line). The memory M2 included in each of the two pixels 10 is electrically connected to a second wiring (gate line). The transistor included in each of the circuit blocks 11 in the two pixels 10 is electrically connected to a third wiring (gate line).

In addition, the memory M1 included in one of the pixels 10 and the memory M2 in the other of the pixels 10 are electrically connected to a fourth wiring (source line). In addition, the memory M2 included in one of the pixels 10 and the memory M1 included in the other of the pixels 10 are electrically connected to a fifth wiring (source line). The transistor included in each of the circuit blocks 11 in the two pixels 10 is electrically connected to a sixth wiring (source line).

Therefore, different data can be written to each of the memory M1 in accordance with a signal supplied to the first wiring. In addition, different data can be written to each of the memory M2 in accordance with a signal supplied to the second wiring.

The transistor included in each of the circuit blocks 11 in the two pixels 10 can supply the same data to each of the liquid crystal elements according to a signal supplied to the third wiring. Note that as shown in FIG. 1, the sixth wiring can be electrically connected to the transistor in the circuit block 11 included in the pixel 10 adjacent in the horizontal direction (the direction to which the gate line extends).

As described above, since wirings are shared by a plurality of the pixels 10, each of the pixel 10 needs 1.5 gate lines and 2.5 source lines, so that the number of wirings can be reduced. Therefore, the aperture ratio can be increased compared to the case where wirings are not shared. In addition, data writing can be performed fast.

In the display device of one embodiment of the present invention, data written to one of electrodes of the liquid crystal element and data written to the memory element M1 or the memory element M2 can be added. Accordingly, a voltage higher than or equal to an output voltage of a source driver can be applied to the liquid crystal element and the grayscale can be easily controlled even with the liquid crystal element with a high threshold voltage. Furthermore, a relatively high voltage can be applied to the liquid crystal element even when a general source driver is used, so that cost of the display element can be reduced.

A first potential for driving the liquid crystal element is held in one of the memory element M1 and the memory M2. A second potential for driving the liquid crystal element is held in the other of the memory M1 and the memory M2. Here, the first potential and the second potential are potentials corresponding to the inversion driving for preventing burn-in of the liquid crystal element. For example, the second potential is a negative potential when the first potential is a positive potential. The potentials held in the memory M1 and the memory M2 keep to have the same polarity, whereby the amount of supplied charges can be reduced; thus, power consumption can be reduced.

An OCB mode or a polymer-dispersed liquid crystal is known as a liquid crystal element with a high threshold voltage. In the OCB mode, liquid crystal is introduced in a cell on which parallel rubbing is performed, so that splay alignment is made. After that, a relatively strong electric field is applied to form bend alignment. With the liquid crystal element in the OCB mode, grayscale control can be performed when bend alignment is kept; however, when an applied electric field is reduced to a value under a predetermined value, the alignment returns to splay alignment.

Figure 2A:
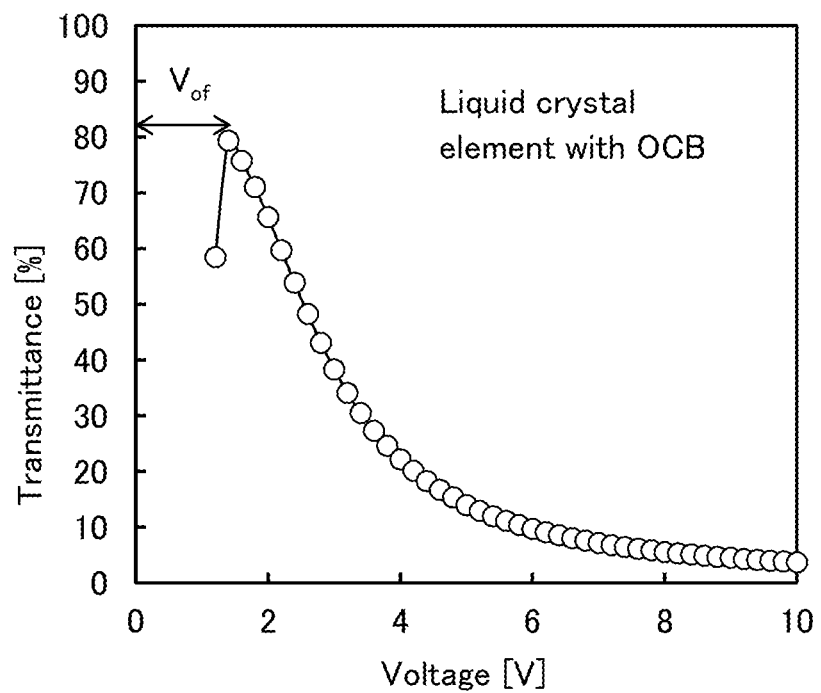
FIGS. 2(A) and (B) Charts showing an operation method of a liquid crystal element.

FIG. 2(A) shows an example of the voltage-transmittance characteristics (the transmittance in parallel Nicols is 100%) of the liquid crystal element in the OCB mode. After a high voltage is applied to form bend alignment, the transmittance increases as the voltage decreases until about 2 V; however, after that, the transmittance drastically decreases. This means that the alignment returns to splay alignment. Therefore, in the OCB mode, it is necessary to apply a voltage at least about 2 V.

Figure 2B:
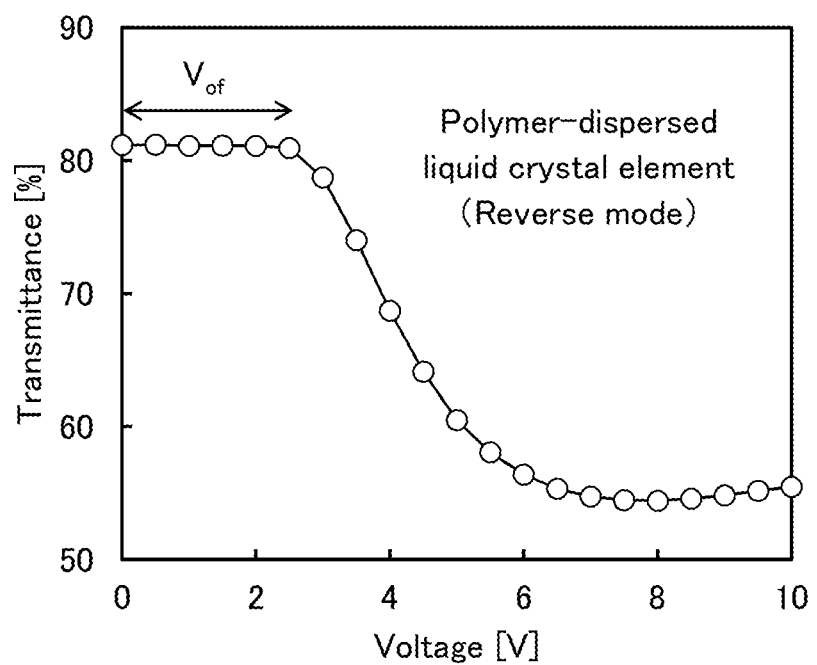

FIG. 2(B) shows an example of the voltage-transmittance characteristics of the polymer-dispersed liquid crystal element (the transmittance of the light from the light source is 100%). The polymer-dispersed liquid crystal element is operated in a reverse mode and has a high transmittance state without voltage application. Decrease in transmittance starts after the voltage is over 2 V and becomes constant around 8 V. Grayscale control can be performed within this voltage range.

As described above, the liquid crystal element in the OCB mode and the polymer-dispersed liquid crystal element require at least several volts to be applied to start grayscale control. The voltage is referred to as an offset voltage ($V_{of}$) in this specification. Although a voltage corresponding to the offset voltage may be offset by a common voltage, power consumption becomes large in a liquid crystal element which requires reverse driving. In the case where supplying the voltage and the offset voltage necessary for grayscale control depends on the source driver, a source driver for a high voltage is required and novel development cost may arise.

In one embodiment of the present invention, even when the liquid crystal element has a high offset voltage, the common voltage can be constant in the driving mode and a general source driver can be used. In addition, it is easy to keep the offset voltage and to generate a high voltage to form bend alignment of the liquid crystal in the OCB mode. Note that a display device including the pixel of one embodiment of the present invention is not limited to the structure including the liquid crystal element in the OCB mode and the polymer-dispersed liquid crystal element but may be a structure including other liquid crystal display elements.

Figure 3:
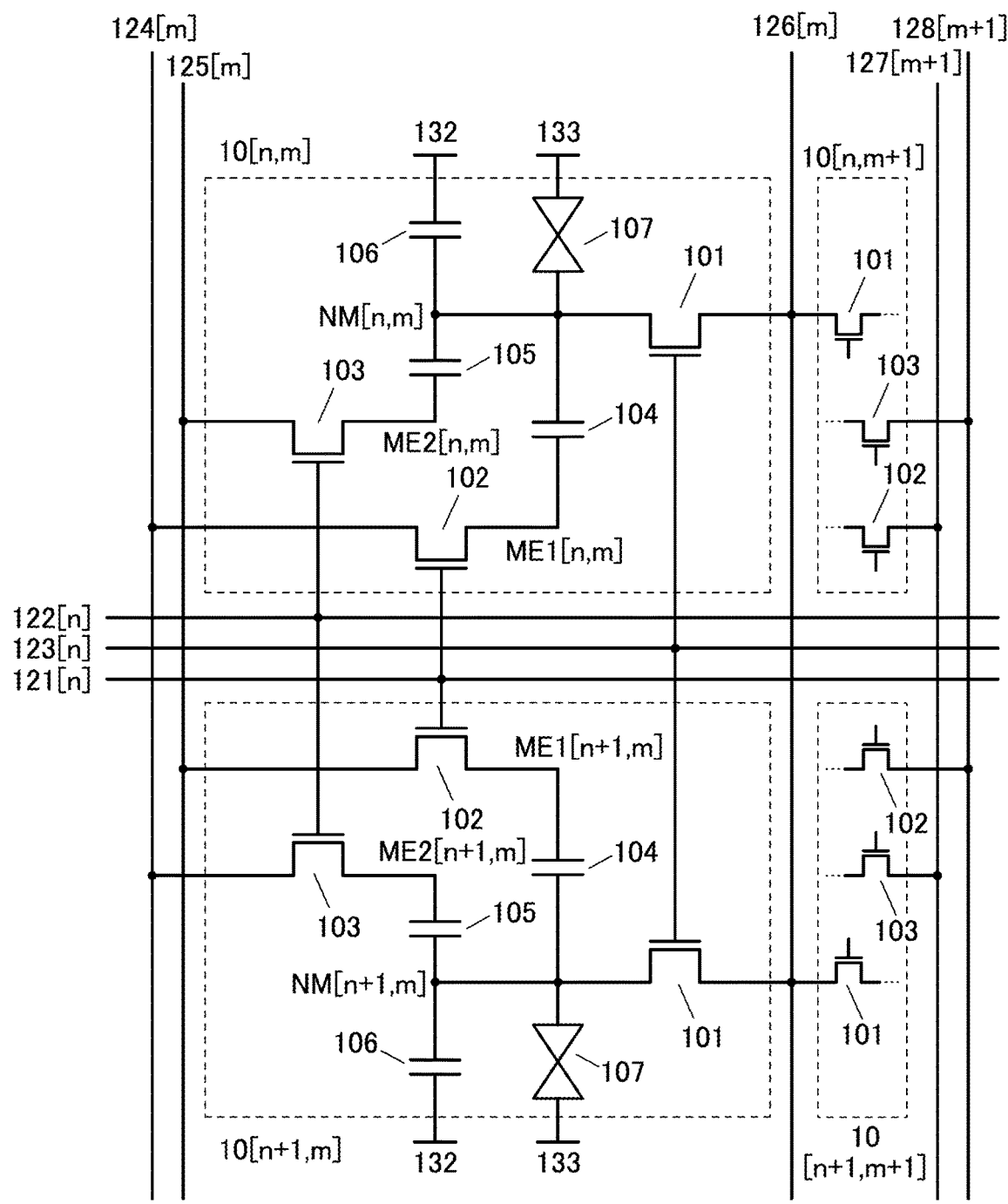
FIG. 3 A diagram showing a pixel circuit.

FIG. 3 shows a specific example of the pixels 10 in the m-th column, the m+1-th column, the n-th row, and the n+1-th row (m and n are each a natural number larger than or equal to one) in a pixel array. Note that FIG. 3 shows four pixels of the pixel 10[n,m], the pixel 10[n+1,m], the pixel 10[n,m+1], and the pixel 10[n+1,m+1]; however, details of the pixel 10[n,m+1] and the pixel 10[n+1,m+1] are omitted.

The pixel 10 can have a structure including a transistor 101, a transistor 102, a transistor 103, a capacitor 104, a capacitor 105, a capacitor 106, and a liquid crystal element 107.

One of a source and a drain of the transistor 101 is electrically connected to one of electrodes of the capacitor 104. The other of the electrodes of the capacitor 104 is electrically connected to one of a source and a drain of the transistor 102. The one of the electrodes of the capacitor 104 is electrically connected to one of electrodes of the capacitor 105. The other of the electrodes of the capacitor 105 is electrically connected to one of a source and a drain of the transistor 103. The one of the electrodes of the capacitor 105 is electrically connected to one of electrodes of the capacitor 106. The one of the electrodes of the capacitor 106 is electrically connected to one of electrodes of the liquid crystal element 107.

Here, a wiring to which the one of the source and the drain of the transistor 101, the one of the electrodes of the capacitor 104, the one of the electrodes of the capacitor 105, the one of the electrodes of the capacitor 106, and the one of the electrodes of the liquid crystal element 107 are connected is referred to as a node NM. The node NM can be in a floating state and the liquid crystal element 107 operates in accordance with the potential of the node NM.

A wiring to which the one of the source and the drain of the transistor 102 and the other of the electrodes of the capacitor 104 are connected is referred to as a node ME1. A wiring to which the one of the source and the drain of the transistor 103 and the other of the electrodes of the capacitor 105 are connected is referred to as a node ME2.

Note that the memory M1 in FIG. 1 corresponds to the node ME1 and the peripheral components thereof. In addition, the memory M2 in FIG. 1 corresponds to the node ME2 and the peripheral components thereof. Furthermore, the circuit block 11 in FIG. 1 includes the transistor 101, the capacitor 106, and the liquid crystal element 107 as components.

A connection between components included in the pixel 10[n,m] and the pixel 10[n+1,m] and wirings is described. First, a connection state common between the pixel 10[n,m] and the pixel 10[n+1,m] will be described. A gate of the transistor 101 is electrically connected to a wiring 123[n]. A gate of the transistor 102 is electrically connected to a wiring 121. A gate of the transistor 103 is electrically connected to a wiring 122. The other of the source and the drain of the transistor 101 is electrically connected to a wiring 126. The other of the electrodes of the capacitor 106 is electrically connected to a wiring 132. The other of the electrodes of the liquid crystal element 107 is electrically connected to a wiring 133.

Next, a connection state different between the pixel 10[$n, m$] and the pixel 10[$n$+1,$m$] is described. In the pixel 10[$n,m$], the other of the source and the drain of the transistor 102 is electrically connected to a wiring 124[$m$]. In addition, the other of the source and the drain of the transistor 103 is electrically connected to a wiring 125[$m$]. In the pixel 10[$n$+1,$m$], the other of the source and the drain of the transistor 102 is electrically connected to the wiring 125[$m$]. The other of the source and the drain of the transistor 103 is electrically connected to the wiring 124[$m$].

Note that in the pixel 10[$n,m$+1] and the pixel 10[$n$+1,$m$+1], the other of the source and the drain of the transistor 101 can be electrically connected to the wiring 126[$m$]. The transistor 102 included in the pixel 10[$n,m$+1] can be electrically connected to a wiring 127[$m$+1], and the transistor 103 can be electrically connected to a wiring 128[$m$+1]. The transistor 102 included in the pixel 10[$n$+1,$m$+1] can be electrically connected to the wiring 128[$m$+1], and the transistor 102 can be electrically connected to the wiring 127[$m$+1].

The wirings 121, 122, and 123 have a function of a gate line and are electrically connected to the gate driver 13 (see FIG. 1). The wiring 132 and the wiring 133 have a function of a common wiring which supplies a constant potential. The wirings 124, 125, 127, and 128 have a function of a source line and are electrically connected to the source driver 12 (see FIG. 1).

Note that the wiring 126 also functions as a source line and a wiring which supplies a constant potential; thus, it can be electrically connected to a predetermined power supply circuit 15 through a selection circuit 14 (see FIG. 1). Note that the power supply circuit 15 is not limited to one circuit. The power supply circuit 15 may be a power supply circuit included in another circuit such as a source driver.

Figure 4A:
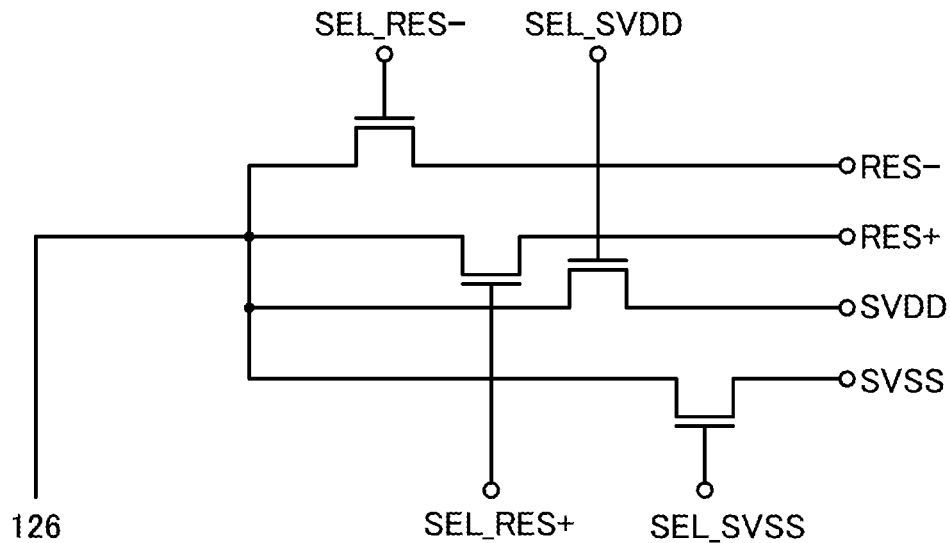
FIG. 4(A) to (C) Diagrams showing selection circuits.
Figure 4B:
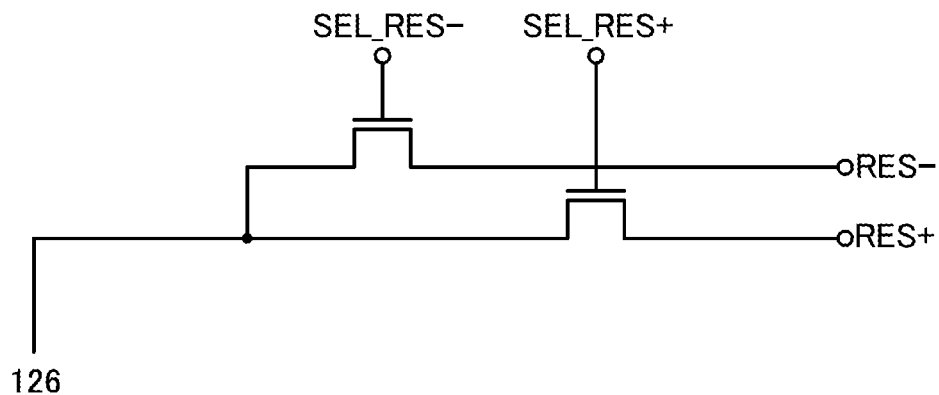
Figure 4C:
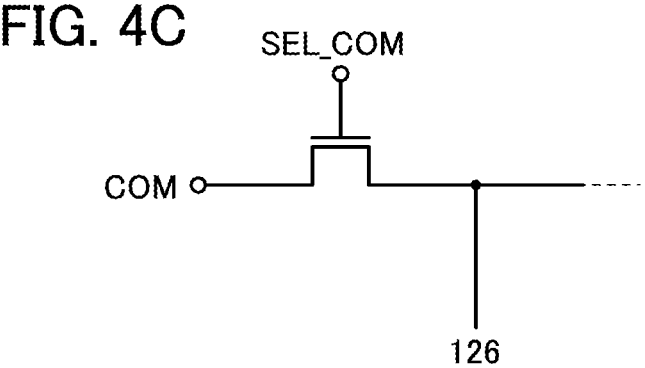

Note that the selection circuit 14 can have a structure shown in FIGS. 4(A) and 4(B), for example, and can select a reset potential (RES+, RES−), a power potential of the source driver (SVDD, SVSS), or the like and supply it to the wiring 126 in accordance with application. As shown in FIG. 4(C), a path that can select a common potential (VCOM) may be added to the structures in FIGS. 4(A) and 4(B). Note that SEL_RES−, SEL_RES+, SEL_SVDD, SEL SVSS, and SEL_COM are signals to control each transistor.

The node NM, the node ME1, and the node ME2 serve as memory nodes. When the transistors connected to each node are turned on, data can be written to each node. When the transistors are turned off, the data can be held in each node. The use of a transistor with extremely low off-state current as the transistors can suppress leakage current and enable long-term retention of the potential at each node. As the transistor, a transistor using a metal oxide in a channel formation region (hereinafter referred to as an OS transistor) can be used, for example.

Specifically, OS transistors are preferably used as the transistors 101, 102 and 103. An OS transistor may also be applied to components included in the circuit block 110. In the case where the operation is performed in an allowable range of the leakage current amount, a transistor including Si (hereinafter Si transistor) in a channel formation region can be applied. Alternatively, both an OS transistor and a Si transistor may be used. Examples of the Si transistor include a transistor including amorphous silicon and a transistor including crystalline silicon (typically, low-temperature polysilicon or single crystal silicon).

As a semiconductor material used for an OS transistor, a metal oxide whose energy gap is greater than or equal to 2 eV, preferably greater than or equal to 2.5 eV, more preferably greater than or equal to 3 eV can be used. A typical example is an oxide semiconductor containing indium, and a CAAC-OS or a CAC-OS described later can be used, for example. A CAAC-OS has a crystal structure including stable atoms and is suitable for a transistor that highly requires reliability, and the like. A CAC-OS has high mobility and is suitable for a transistor that operates at high speed, and the like.

The OS transistor has a large energy gap, and thus the OS transistor has characteristics with an extremely low off-state current of several yA/μm (current per micrometer of a channel width). The OS transistor has features such that impact ionization, an avalanche breakdown, a short-channel effect, or the like does not occur, which are different from those of a Si transistor. Thus, the use of the OS transistor enables formation of a highly reliable circuit. Moreover, variations in electrical characteristics due to crystallinity unevenness, which are caused in the Si transistor, are less likely to occur in the OS transistor.

A semiconductor layer included in the OS transistor can be, for example, a film represented by an In-M-Zn-based oxide that contains indium, zinc, and M (a metal such as aluminum, titanium, gallium, germanium, yttrium, zirconium, lanthanum, cerium, tin, neodymium, or hafnium)

In the case where the oxide semiconductor contained in the semiconductor layer is an In-M-Zn-based oxide, it is preferable that the atomic ratio of metal elements of a sputtering target used to form a film of the In-M-Zn oxide satisfy In≥M and Zn≥M. The atomic ratio of metal elements in such a sputtering target is preferably, for example, In:M:Zn=1:1:1, In:M:Zn=1:1:1.2, In:M:Zn=3:1:2, In:M:Zn=4:2:3, In:M:Zn=4:2:4.1, In:M:Zn=5:1:6, In:M:Zn=5:1:7, or In:M:Zn=5:1:8. Note that the atomic ratio in the formed semiconductor layer varies from the above atomic ratio of metal elements of the sputtering target in a range of ±40%.

An oxide semiconductor with low carrier density is used for the semiconductor layer. For example, the semiconductor layer may use an oxide semiconductor whose carrier density is lower than or equal to $1\times10^{17}/cm^3$, preferably lower than or equal to $1\times10^{15}/cm^3$, more preferably lower than or equal to $1\times10^{13}/cm^3$, still more preferably lower than or equal to $1\times10^{11}/cm^3$, even more preferably lower than $1\times10^{10}/cm^3$, and higher than or equal to $1\times10^{-9}/cm^3$. Such an oxide semiconductor is referred to as a highly purified intrinsic or substantially highly purified intrinsic oxide semiconductor. The oxide semiconductor has low density of defect states and can be regarded as an oxide semiconductor having stable characteristics.

Note that, without limitation to those described above, a material with an appropriate composition may be used in accordance with required semiconductor characteristics and electrical characteristics (e.g., field-effect mobility and threshold voltage) of a transistor. To obtain the required semiconductor characteristics of the transistor, it is preferable that the carrier density, the impurity concentration, the density of defect states, the atomic ratio between a metal element and oxygen, the interatomic distance, the density, and the like of the semiconductor layer be set to appropriate values.

When silicon or carbon, which is an element belonging to Group 14, is contained in the oxide semiconductor contained in the semiconductor layer, the amount of oxygen vacancies is increased in the semiconductor layer, and the semiconductor layer becomes n-type. Thus, the concentration of silicon or carbon (measured by secondary ion mass spectrometry) in the semiconductor layer is set to lower than or equal to $2\times10^{18}$ atoms/cm$^3$, preferably lower than or equal to $2\times10^{17}$ atoms/cm$^3$.

Alkali metal and alkaline earth metal might generate carriers when bonded to an oxide semiconductor, in which case the off-state current of the transistor might be increased. Therefore, the concentration of alkali metal or alkaline earth metal in the semiconductor layer (measured by secondary ion mass spectrometry) is set to lower than or equal to $1\times10^{18}$ atoms/cm$^3$, preferably lower than or equal to $2\times10^{16}$ atoms/cm$^3$.

When nitrogen is contained in the oxide semiconductor contained in the semiconductor layer, electrons serving as carriers are generated and the carrier density increases, so that the semiconductor layer easily becomes n-type. Thus, a transistor using an oxide semiconductor that contains nitrogen is likely to be normally-on. Hence, the concentration of nitrogen in the semiconductor layer (measured by secondary ion mass spectrometry) is preferably set to lower than or equal to $5\times10^{18}$ atoms/cm$^3$.

In addition, when the oxide semiconductor included in the semiconductor layer contains hydrogen, the hydrogen reacts with oxygen bonded to a metal atom to generate water, and thus an oxygen vacancy is formed in the oxide semiconductor in some cases. When the channel formation region of the oxide semiconductor includes oxygen vacancies, the transistor may have normally-on characteristics. A defect that is an oxygen vacancy into which hydrogen enters may function as a donor and generates an electron serving as a carrier. Furthermore, bonding of part of hydrogen to oxygen bonded to a metal atom may cause generation of an electron serving as a carrier. Thus, a transistor using an oxide semiconductor that contains a large amount of hydrogen is likely to have normally-on characteristics.

A defect in which hydrogen has entered an oxygen vacancy can function as a donor of the oxide semiconductor. However, it is difficult to evaluate the defects quantitatively. Thus, the oxide semiconductor is sometimes evaluated by not its donor concentration but its carrier concentration. Therefore, in this specification and the like, the carrier concentration assuming the state where an electric field is not applied is sometimes used, instead of the donor concentration, as the parameter of the oxide semiconductor. That is, "carrier concentration" in this specification and the like can be replaced with "donor concentration" in some cases.

Accordingly, hydrogen in the oxide semiconductor is preferably reduced as much as possible. Specifically, the hydrogen concentration of the oxide semiconductor, which is measured by secondary ion mass spectrometry (SIMS: Secondary Ion Mass Spectrometry), is lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$. When an oxide semiconductor with sufficiently reduced impurities such as hydrogen is used for the channel formation region of the transistor, stable electrical characteristics can be given.

The semiconductor layer may have a non-single-crystal structure, for example. The non-single-crystal structure includes, for example, a CAAC-OS (C-Axis Aligned Crystalline Oxide Semiconductor) including a c-axis aligned crystal, a polycrystalline structure, a microcrystalline structure, or an amorphous structure. Among the non-single-crystal structures, an amorphous structure has the highest density of defect states, whereas CAAC-OS has the lowest density of defect states.

An oxide semiconductor film having an amorphous structure has disordered atomic arrangement and no crystalline component, for example. In another example, an oxide film having an amorphous structure has an absolutely amorphous structure and no crystal part.

Note that the semiconductor layer may be a mixed film including two or more of a region having an amorphous structure, a region having a microcrystalline structure, a region having a polycrystalline structure, a region of CAAC-OS, and a region having a single crystal structure. The mixed film has, for example, a single-layer structure or a layered structure including two or more of the foregoing regions in some cases.

Described below is the composition of a CAC (Cloud-Aligned Composite)-OS, which is one embodiment of a non-single-crystal semiconductor layer.

The CAC-OS is, for example, a composition of a material in which elements included in an oxide semiconductor are unevenly distributed to have a size of greater than or equal to 0.5 nm and less than or equal to 10 nm, preferably greater than or equal to 1 nm and less than or equal to 2 nm, or a similar size. Note that in the following description, a state in which one or more metal elements are unevenly distributed and regions including the metal element(s) are mixed to have a size of greater than or equal to 0.5 nm and less than or equal to 10 nm, preferably greater than or equal to 1 nm and less than or equal to 2 nm, or a similar size in an oxide semiconductor is referred to as a mosaic pattern or a patch-like pattern.

Note that an oxide semiconductor preferably contains at least indium. In particular, indium and zinc are preferably contained. In addition, one or more of aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, CAC-OS in an In—Ga—Zn oxide (of the CAC-OS, an In—Ga—Zn oxide may be particularly referred to as CAC-IGZO) has a composition (hereinafter, referred to as cloud-like composition) in which materials are separated into indium oxide (hereinafter, $InO_{X1}$ (X1 is a real number greater than 0)) or indium zinc oxide (hereinafter, $In_{X2}Zn_{Y2}O_{Z2}$ (X2, Y2, and Z2 are real numbers greater than 0)), and gallium oxide (hereinafter, $GaO_{X3}$ (X3 is a real number greater than 0)) or gallium zinc oxide (hereinafter, $Ga_{X4}Zn_{Y4}O_{Z4}$ (X4, Y4, and Z4 are real numbers greater than 0)) to form a mosaic pattern, and $InO_{X1}$ or $In_{X2}Zn_{Y2}O_{Z2}$ forming the mosaic pattern is evenly distributed in the film.

That is, the CAC-OS is a composite oxide semiconductor with a composition in which a region containing $GaO_{X3}$ as a main component and a region containing $In_{X2}Zn_{Y2}O_{Z2}$ or $InO_{X1}$ as a main component are mixed. Note that in this specification, for example, when the atomic ratio of In to an element M in a first region is greater than the atomic ratio of In to an element M in a second region, the first region is described as having higher In concentration than the second region.

Note that IGZO is a common name, which may specify a compound containing In, Ga, Zn, and O. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1\leq x0\leq 1$; m0 is a given number).

The above crystalline compounds have a single crystal structure, a polycrystalline structure, or a CAAC structure. Note that the CAAC structure is a crystal structure in which a plurality of IGZO nanocrystals have c-axis alignment and are connected in the a-b plane direction without alignment.

The CAC-OS relates to the material composition of an oxide semiconductor. In a material composition of a CAC-OS containing In, Ga, Zn, and O, nanoparticle regions containing Ga as a main component are observed in part of the CAC-OS and nanoparticle regions containing In as a main component are observed in part thereof. These nanoparticle regions are randomly dispersed to form a mosaic pattern. Thus, the crystal structure is a secondary element for the CAC-OS.

Note that in the CAC-OS, a layered structure including two or more films with different compositions is not included. For example, a two-layer structure of a film containing In as a main component and a film containing Ga as a main component is not included.

A boundary between the region containing $GaO_{X3}$ as a main component and the region containing $In_{X2}Zn_{Y2}O_{Z2}$ or $InO_{X1}$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium, nanoparticle regions containing the selected metal element(s) as a main component(s) are observed in part of a CAC-OS and nanoparticle regions containing In as a main component are observed in part of the CAC-OS, and these nanoparticle regions are randomly dispersed to form a mosaic pattern in the CAC-OS.

The CAC-OS can be formed by a sputtering method under a condition where a substrate is intentionally not heated, for example. In the case where the CAC-OS is formed by a sputtering method, one or more of an inert gas (typically, argon), an oxygen gas, and a nitrogen gas may be used as a deposition gas. The flow rate of the oxygen gas to the total flow rate of the deposition gas in deposition is preferably as low as possible, for example, the flow rate of the oxygen gas is higher than or equal to 0% and lower than 30%, preferably higher than or equal to 0% and lower than or equal to 10%.

The CAC-OS is characterized in that a clear peak is not observed when measurement is conducted using a θ/2θ scan by an Out-of-plane method, which is an X-ray diffraction (XRD) measurement method. That is, it is found from X-ray diffraction measurement that no alignment in an a-b plane direction and a c-axis direction is observed in a measured region.

In addition, in an electron diffraction pattern of the CAC-OS that is obtained by irradiation with an electron beam with a probe diameter of 1 nm (also referred to as a nanobeam electron beam), a ring-like high-luminance region (a ring region) and a plurality of bright spots in the ring region are observed. Thus, it is found from the electron diffraction pattern that the crystal structure of the CAC-OS includes an nc (nano-crystal) structure that does not show alignment in the plane direction and the cross-sectional direction.

For example, energy dispersive X-ray spectroscopy (EDX) is used to obtain EDX mapping, and according to the EDX mapping, the CAC-OS of the In—Ga—Zn oxide has a composition in which the regions containing $GaO_{X3}$ as a main component and the regions containing $In_{X2}Zn_{Y2}O_{Z2}$ or $InO_{X1}$ as a main component are unevenly distributed and mixed.

The CAC-OS has a structure different from that of an IGZO compound in which metal elements are evenly distributed, and has characteristics different from those of the IGZO compound. That is, in the CAC-OS, regions containing $GaO_{X3}$ or the like as a main component and regions containing $In_{X2}Zn_{Y2}O_{Z2}$ or $InO_{X1}$ as a main component are separated to form a mosaic pattern.

The conductivity of a region containing $In_{X2}Zn_{Y2}O_{Z2}$ or $InO_{X1}$ as a main component is higher than that of a region containing $GaO_{X3}$ or the like as a main component. In other words, when carriers flow through regions containing $In_{X2}Zn_{Y2}O_{Z2}$ or $InO_{X1}$ as a main component, the conductivity of an oxide semiconductor is generated. Accordingly, when regions containing $In_{X2}Zn_{Y2}O_{Z2}$ or $InO_{X1}$ as a main component are distributed in an oxide semiconductor like a cloud, high field-effect mobility (μ) can be achieved.

In contrast, the insulating property of a region containing $GaO_{X3}$ or the like as a main component is more excellent than that of a region containing $In_{X2}Zn_{Y2}O_{Z2}$ or $InO_{X1}$ as a main component. In other words, when regions containing $GaO_{X3}$ or the like as a main component are distributed in an oxide semiconductor, leakage current can be suppressed and favorable switching operation can be achieved.

Accordingly, when a CAC-OS is used in a semiconductor element, the insulating property derived from $GaO_{X3}$ or the like and the conductivity derived from $In_{X2}Zn_{Y2}O_{Z2}$ or $InO_{X1}$ complement each other, whereby high on-state current (Ion) and high field-effect mobility (μ) can be achieved.

A semiconductor element using a CAC-OS has high reliability. Thus, the CAC-OS is suitably used as a material in a variety of semiconductor devices.

Figure 5:
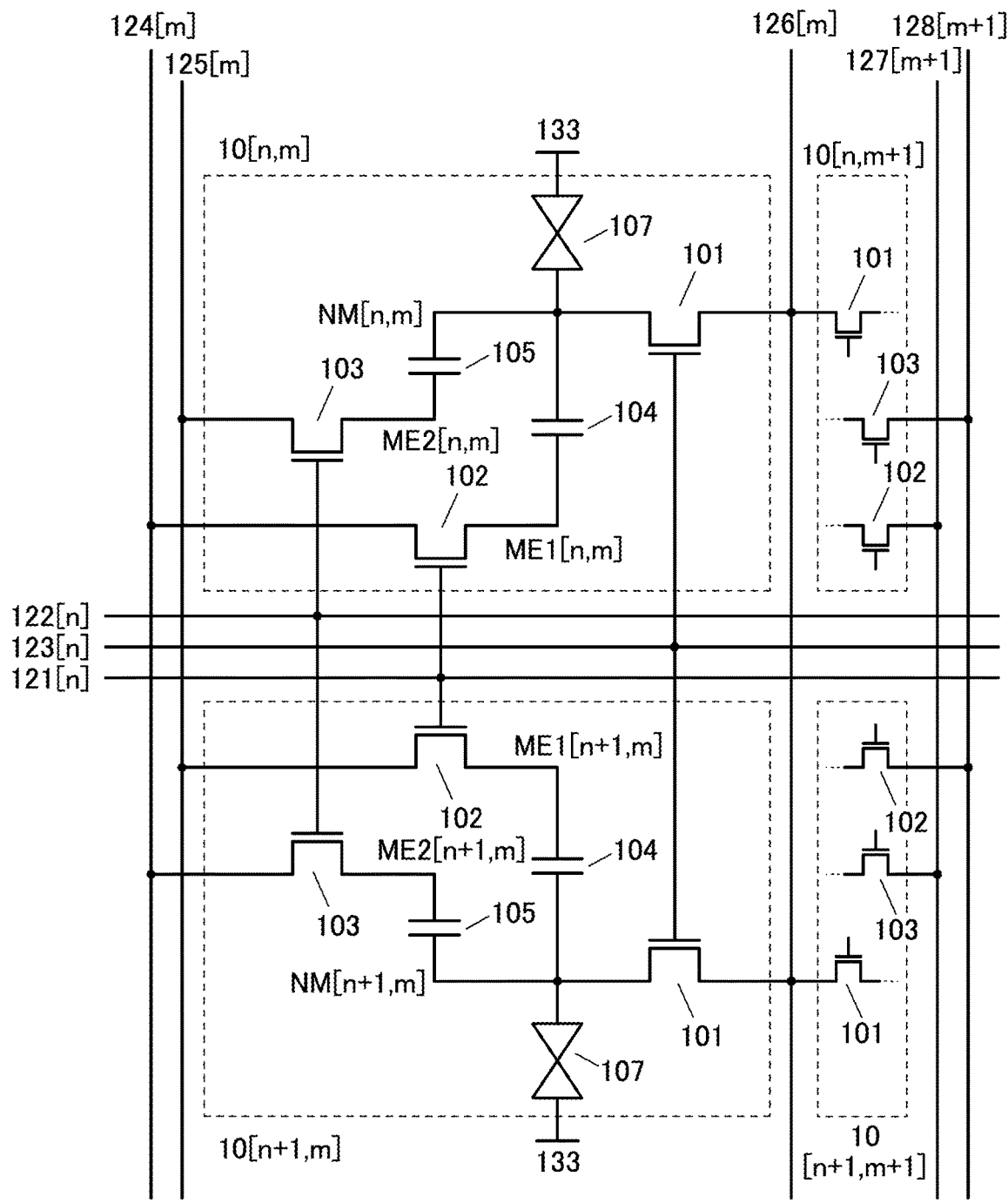
FIG. 5 A diagram showing a pixel circuit.

Note that as shown in FIG. 5, the pixel 10 may have a structure without the capacitor 106. As described above, an OS transistor can be used as the transistor connected to the node NM. Since the leakage current of the OS transistor is extremely low, display can be held for a comparatively long time even when the capacitor 106 functioning as a storage capacitor is omitted. Omitting the capacitor 106 is effective not only in the case of a structure using an OS transistor but also when high-speed operation allows a shorter period for displaying an image (e.g., field sequential driving). The aperture ratio can be improved by removing the capacitor 106. Alternatively, the transmittance of the pixel can be improved.

Next, an operation method using the pixel 10 of one embodiment of the present invention is described. First, a common operation is described, and an operation in accordance with application is described.

Figure 6A:
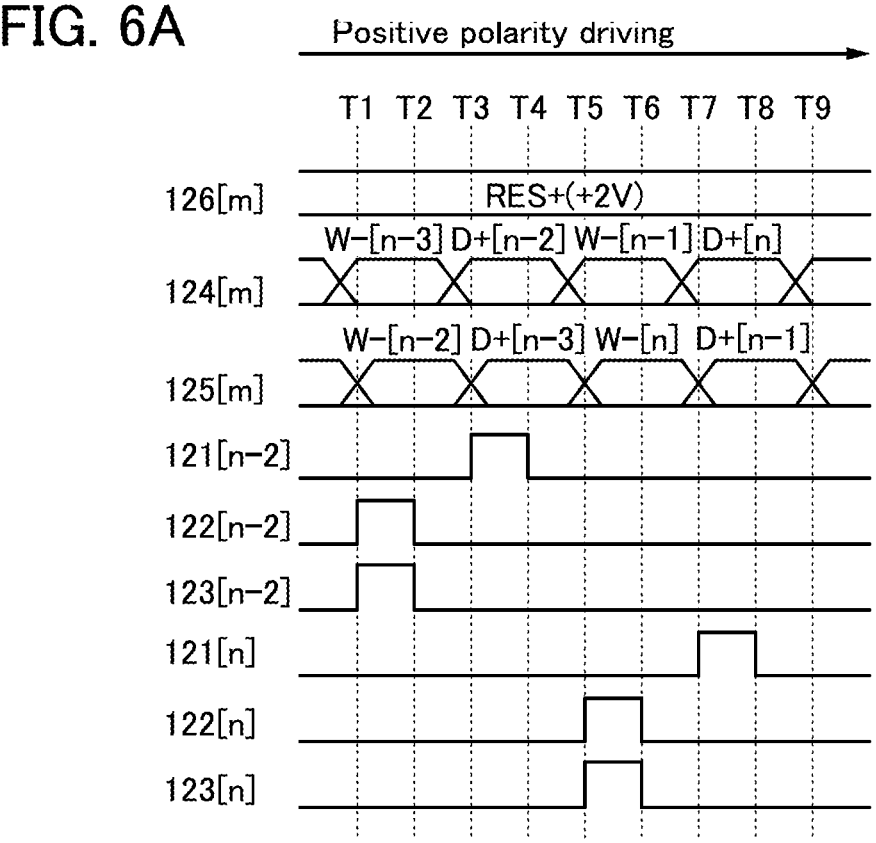
FIGS. 6(A) and (B) Timing charts showing an operation of a display device.
Figure 6B:
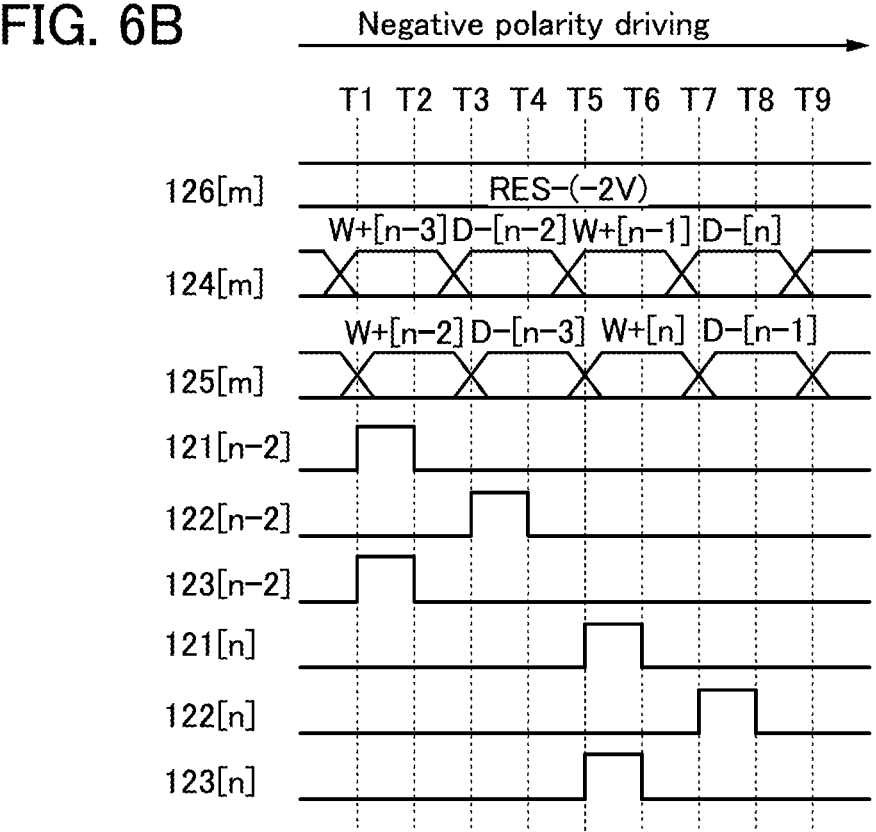

FIGS. 6(A) and 6(B) show a positive polarity driving and a negative polarity driving of a liquid crystal element. Normally, the positive polarity driving and the negative polarity driving are performed alternately by each frame. The wirings 124[*m*] and 125[*m*] are the source lines in the m-th column and different data can be supplied to each of them. The wirings 121, 122, and 123 are gate lines. As shown in FIG. 3, the wirings 121[*n*], 122[*n*], and 123[*n*] are electrically connected to the pixel 10 in the n-th row and the pixel 10 in the n+1-th row. Furthermore, the wirings 121[*n*−2], 122[*n*−2], and 123[*n*−2] are electrically connected to the pixel 10 in the n−2-th row and the pixel 10 in the n−1-th row.

A signal potential (W) which corresponds to a weight is supplied to the wirings 124[*m*] and 125[*m*] and then a signal potential (D) which corresponds to data is supplied thereto.

The signal potential used when the voltage applied to the liquid crystal element is positive (positive polarity driving) is accompanied with a sign "+", and the signal potential used when the voltage applied to the liquid crystal element is negative (negative polarity driving) is accompanied with a sign "−". That is, "W+" and "D+" represent a weight and data used for a positive polarity driving. "W−" and "D−" represent a weight and data used for a negative polarity driving. Note that the weight "W+" is written in the negative polarity driving and "W−" is written in the positive polarity driving. Furthermore, "W−" and "D+" can be positive potentials and "W+" and "D−" can be negative potentials.

In the signal potentials supplied to the wirings 124 and 125 shown in FIGS. 6(A) and 6(B), [n], [n−1], and the like mean the row number; for example, W−[n−1] means the weight (W−) supplied to the pixel 10 in the [n−1]-th row.

In the positive polarity driving shown in FIG. 6(A), W−[n−3] and W−[n−2] are supplied from the time T1 to the time T2 to be written in the pixel 10 in the [n−3]-th row and in the pixel 10 in the [n−2]-th row respectively. Furthermore, D+[n−2] and D+[n−3] are supplied from the time T3 to the time T4 to be written in the pixel 10 in the [n−2]-th row and in the pixel 10 in the [n−3]-th row respectively.

Here, W−[n−3] and W−[n−2] written from the time T1 to the time T2 are not used for the positive polarity driving in the frame, held until the negative polarity driving in the next frame, and added to D−[n−2] and D−[n−3] written in the next frame. In addition, W+[n−3] and W+[n−2] written in the previous frame and held are added to D+[n−2] and D+[n−3] written from the time T3 to the time T4.

In the negative polarity driving shown in FIG. 6(B), W+[n−3] and W+[n−2] are supplied from the time T1 to the time T2 to be written in the pixel 10 in [n−3]-th row and in the pixel 10 in [n−2]-th row respectively. Furthermore, D−[n−2] and D−[n−3] are supplied from the time T3 to the time T4 to be written in the pixel 10 in [n−2]-th row and in the pixel 10 in [n−3]-th row respectively.

Here, W+[n−3] and W+[n−2] written from the time T1 to the time T2 are not used for the negative polarity driving in the frame, held until the positive polarity driving in the next frame, and added to D+[n−2] and D+[n−3] written in the next frame. In addition, W−[n−3] and W−[n−2] written in the previous frame and held are added to D−[n−2] and D−[n−3] written from the time T3 to the time T4.

The above is the common operation of one embodiment of the present invention, which includes writing weights and data, and an addition operation. Note that W− and D+ (positive potential) are always written to one of the memories (e.g., the memory including the node ME1, the memory M1) and W+ and D− (negative potential) are always written to the other of the memories (e.g., the memory including the node ME2, the memory M2). Thus, charges of the same polarity are always written to the capacitor included in one of the memories or the other of the memories. Therefore, charges are not written in order to invert the electrode polarity, so that the supply amount of charges can be reduced and the power consumption can be reduced. Note that the polarities of the potentials written to a first memory and a second memory can be opposite to each other.

Figure 7A:
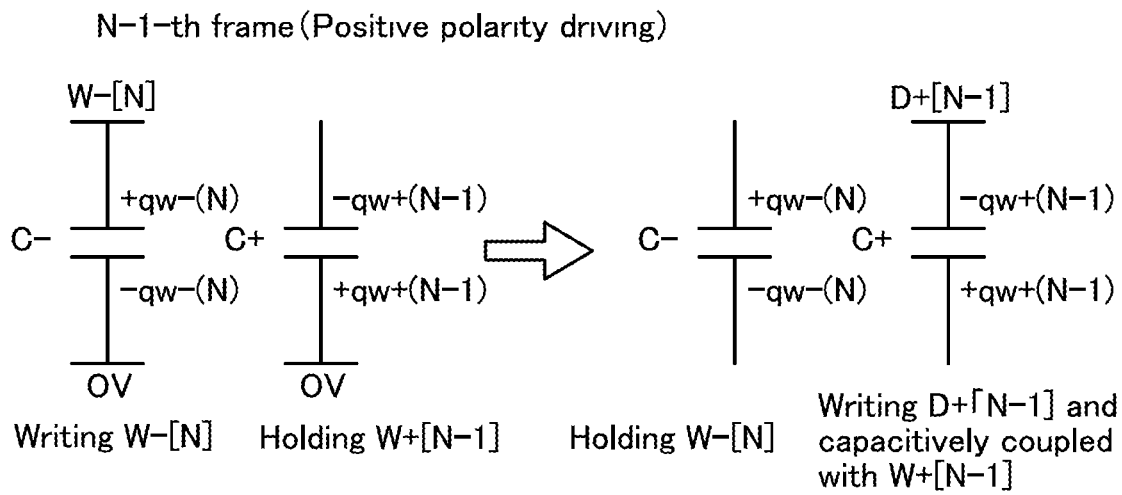
FIG. 7(A) to (C) Diagrams showing charges held in a capacitor.
Figure 7B:
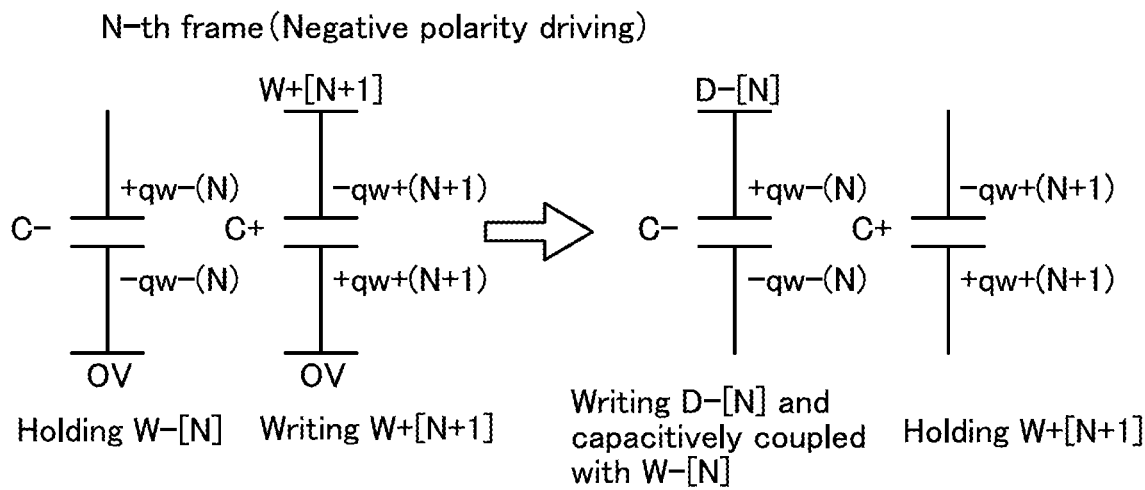
Figure 7C:
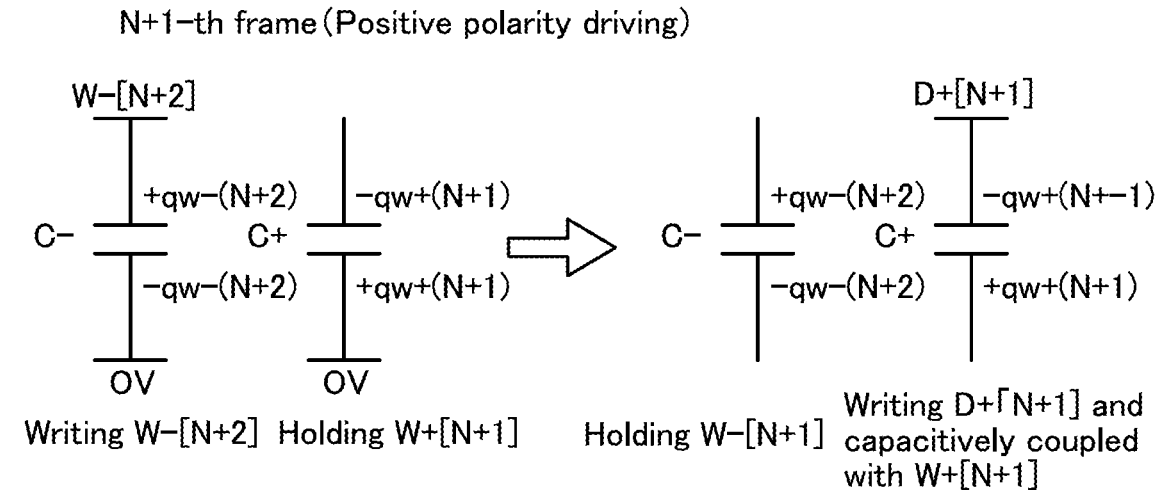

FIGS. 7(A) to 7(C) show charges written to the capacitor included in one of the memories or the other of the memories in a specific pixel 10. Here, the capacitor included in one of the memories is shown by C+ and the capacitor included in the other of the memories is shown by C−. Specifically, C+ corresponds to the capacitor 104 shown in FIG. 3 and FIG. 5. In addition, C− corresponds to the capacitor 105 shown in FIG. 3 and FIG. 5.

In FIGS. 7(A) to 7(C), [N], [N+1], and the like added to the weight (W) or data (D) mean the frame used in an addition operation. Furthermore, qw means charge amount of the weight, + and—before qw mean charge polarity, + and—after qw mean the kind of the capacitor (+means the charges accumulated in C+), and (N), (N+1), and the like mean the frame used in an addition operation.

Here, the operation of a capacitor C−is mainly described for clarity. FIG. 7(A) shows the charge accumulated in the capacitors C− and C+ in the N−1-th frame (positive polarity driving). The left means weight (W) writing and the right means data (D) writing in the same frame. In the N−1-th frame, first, one of the electrodes of the capacitor C−is supplied with the weight "W−[N]" and the other of the electrodes thereof is supplied with a potential 0 V as an example. At this time, the charge of +qw−(N) is accumulated in one of the electrodes, and the charge of −qw−(N) is accumulated in the other of the electrodes.

Next, when the data "D+[N−1]" is supplied to one of the electrodes of the capacitor C+, the electrodes at both ends of the capacitor C− are floating and the charge in the capacitor C− is held.

Next, in the N-th frame (negative polarity driving) shown in FIG. 7(B), when the weight "W+[N+1]" is supplied to one of the electrodes of the capacitor C+, the one of the electrodes of the capacitor C− is floating; thus, the charge in the capacitor C− is continuously held.

Next, the negative polarity data "D−[N]" is supplied to the one of the electrodes of the capacitor C−; the other of the electrodes of the capacitor C− has the potential of the capacitive coupling with the held weight "W−[N]", but the other of the electrodes is floating, so that the charge held in the capacitor C−does not change.

Next, in the N+1-th frame (positive polarity driving) shown in FIG. 7(C), one of the electrodes of the capacitor C−is supplied with the weight "W−[N+2]" and the other of the electrodes is supplied with the potential 0 V as an example. At this time, the charge in the capacitor C− is rewritten; the charge+qw−(N+2) is accumulated in one of the electrodes and the charge−qw−(N+2) is accumulated in the other of the electrodes.

The polarity of the charge accumulated in both electrodes of the capacitor C− does not turn opposite and is always constant so far. In addition, similarly in the capacitor C+, the polarity of the charge accumulated in both electrodes can be constant. Thus, in one embodiment of the present invention, the amount of charges supplied during the inversion operation can be reduced, so that power consumption of the display device can be reduced.

Next, an operation example in accordance with application is described. First, an operation in which a high voltage is applied to a liquid crystal element is described. The operation can be used for a liquid crystal of the OCB mode which requires a bend alignment operation with a high voltage application, for example. Note that though "SVDD" is used as a high potential and "SVSS" is used as a low potential here, other potentials can be employed. Note that the difference between the high potential and the low potential is preferably large to increase the voltage to be generated.

Figure 8:
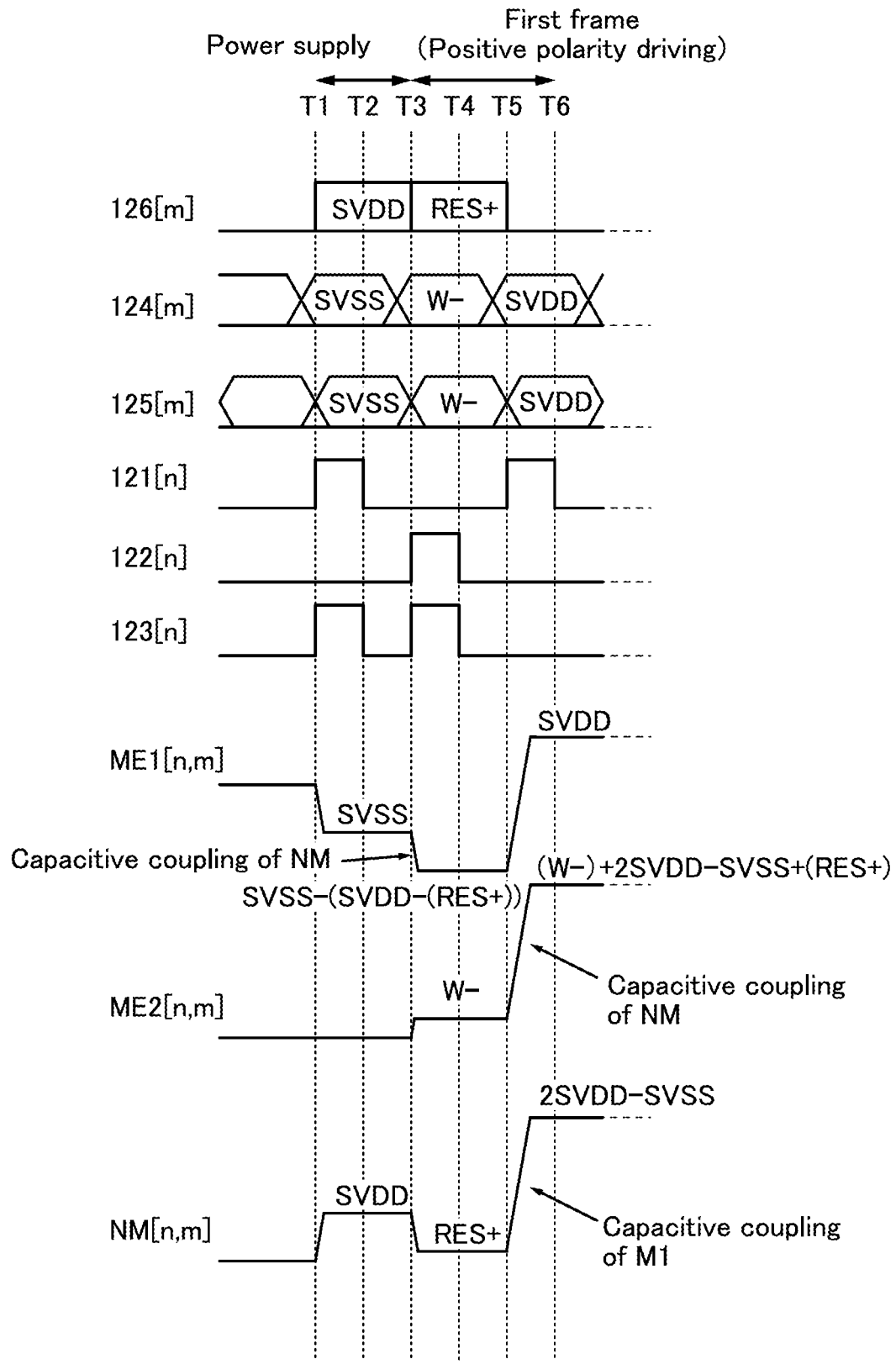
FIG. 8 A timing chart showing an operation of a display device.

FIG. 8 shows an operation from the power supply to the first frame with the pixel 10 shown in FIG. 3. Note that an operation for generating a high potential is performed in the first frame and image data is not input; here a positive polarity operation is applied. The operation includes the operation in which the weight (W−) for the negative polarity driving in the next frame is written in one of the memories.

Note that the circuit shown in FIG. 4(A) can be used for the selection circuit 14 when the operation is performed.

In this embodiment, it is assumed for clarity that the capacitance values of the liquid crystal element 107 and the capacitor 106 in the pixel 10 is sufficiently small. In the operation of FIG. 8, the common operation in which a high voltage is applied to the liquid crystal element is performed on each pixel from the power supply to the first frame; thus, the wirings 124[m] and 125[m] are supplied with the same potential signal. In and after the second frame, different image data is supplied to each of the pixel 10; thus, the data (D) supplied is different between the wirings 124[m] and 125[m]. Note that the weight (W) is a certain value, and the same value of the weight (W) is supplied to the wirings 124[m] and 125[m] in the same frame period. The wirings 132 and 133 are set to 0 V.

At the time T1, when "SVDD" is supplied to the wiring 126[m], "SVSS" is supplied to the wirings 124[m] and 125[m], and the potentials of the wirings 121[n] and 123[n] are set to "H", the transistor 101 is turned on and the potential of the node NM becomes "SVDD". Furthermore, the transistor 102 is turned on, and the potential of the node ME1 becomes "SVSS".

At the time T2, when the potentials of the wirings 121[n] and 123[n] are set to "L", the transistors 101 and 102 are turned off and the potentials of the nodes NM and ME1 are held.

At the time T3, when "RES+" is supplied to the wiring 126, "W−" as the weight (W) is supplied to the wirings 124[m] and 125[m], and the potentials of the wirings 122[n] and 123[n] are set to "H", the transistor 101 is turned on and the node NM is reset from "SVDD" to the reset potential "RES+". At this time, the potential of the node ME1 becomes "SVSS−(SVDD−(RES+))" due to capacitive coupling.

Here, the reset potential (RES) is an absolute value of the offset voltage ($V_{of}$) of the liquid crystal element or the vicinity thereof, and it is set to a positive potential (RES+) in a positive polarity driving frame and a negative potential (RES−) in a negative polarity driving frame. Here, a positive potential is applied to the reset potential (RES) and the reset potential (RES) is set to +2 V, for example.

In addition, the transistor 103 is turned on, and the potential of the node ME2 becomes "W−". Here, the weight (W) is the absolute value twice the above reset voltage (RES); it is set to a positive potential when it is a weight written in the positive polarity driving frame and a negative potential when it is a weight written in the negative polarity driving frame. By writing such values as a weight, a potential difference corresponding to the reset potential (RES) is held between the node ME2 and the node NM or between the node ME1 and the node NM. Thus, when the data (D) is written to the node ME2 or the node ME1, the potential of the node NM becomes the reset potential (RES)+the data (D). Here, a positive potential is applied to the weight (W), and it is set to +4 V, for example.

At the time T4, when the potentials of the wirings 122[n] and 123[n] are set to "L", the transistors 101 and 103 are turned off and the potentials of the nodes NM and ME2 are held.

At the time T5, when the wirings 124[m] and 125[m] are supplied with data "D1+" for the positive polarity driving and the potential of the wiring 121[n] is set to "H", the transistor 102 is turned on and the potential of the node ME1 becomes "D1+". Here, when "SVDD" is supplied as the "D1+", the potential of the node ME1 becomes "SVDD". Thus, the potential of the node NM becomes "(RES+)+ (SVDD−(SVSS−(SVDD−(RES+))))"="2SVDD−SVSS". In other words, when the absolute values of "SVDD" and "SVSS" are the same, the voltage three times as high as that can be applied to the liquid crystal element 107.

Note that application of approximately 15 V is necessary for bend alignment of the liquid crystal of the OCB mode and it is enough for the source driver to provide a power supply voltage which is one third as high as that. Note that in consideration of the grayscale control by the liquid crystal element 107, the power supply voltage that can be output by the source driver 12 is set to higher than or equal to 5 V, preferably higher than or equal to 6 V, more preferably higher than or equal to 7 V.

Figure 9:
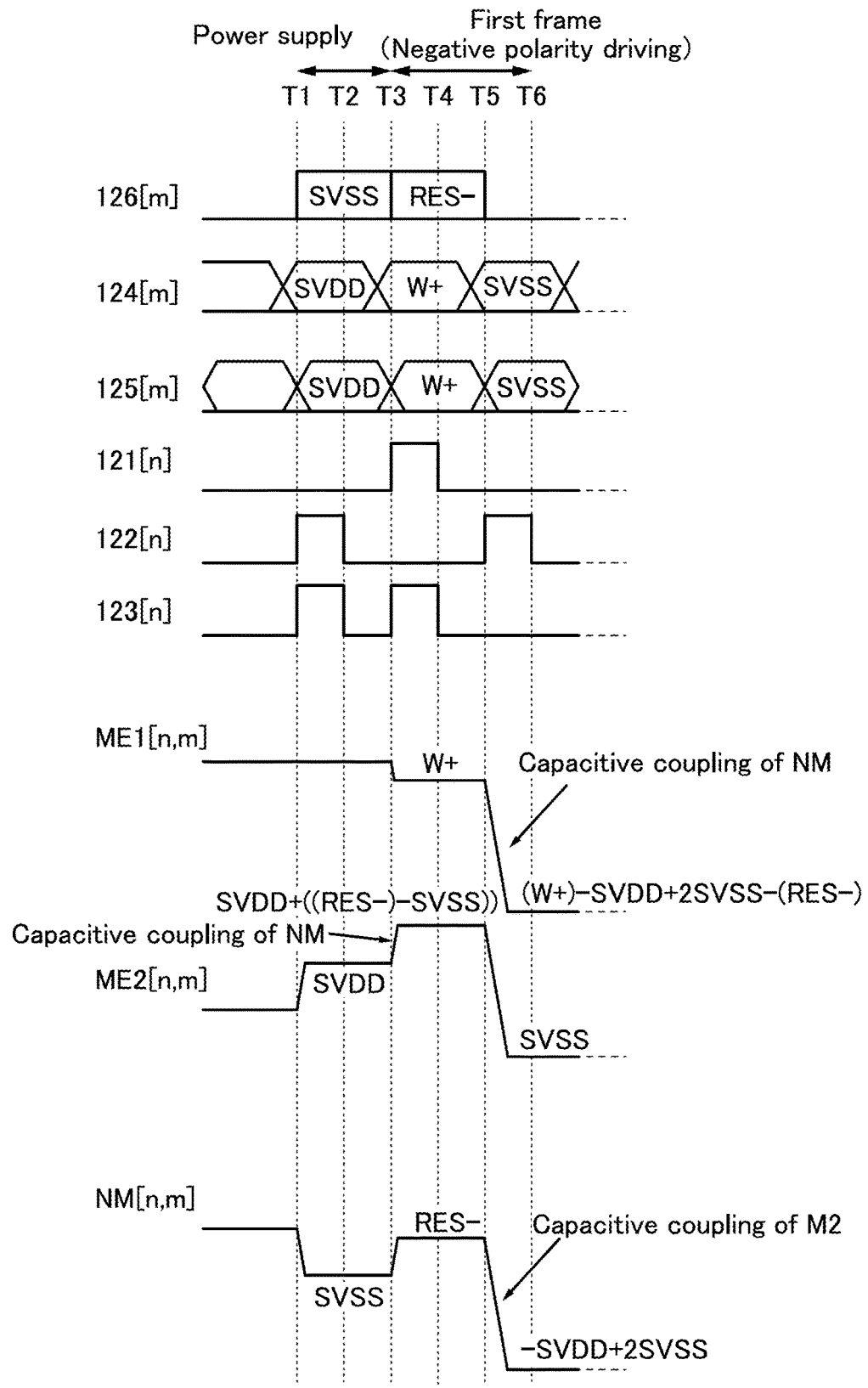
FIG. 9 A timing chart showing an operation of a display device.

Although the above operation is a description when the first frame is the positive polarity driving, the first frame may be the negative polarity driving as shown in FIG. 9. In the case of the negative polarity driving, "SVDD", "W+", and "SVSS" as data "D−" are supplied to the wirings 124[m] and 125[m], whereby a high voltage (−SVDD+2SVSS) which is applied to the liquid crystal element 107 can be generated.

Figure 10A:
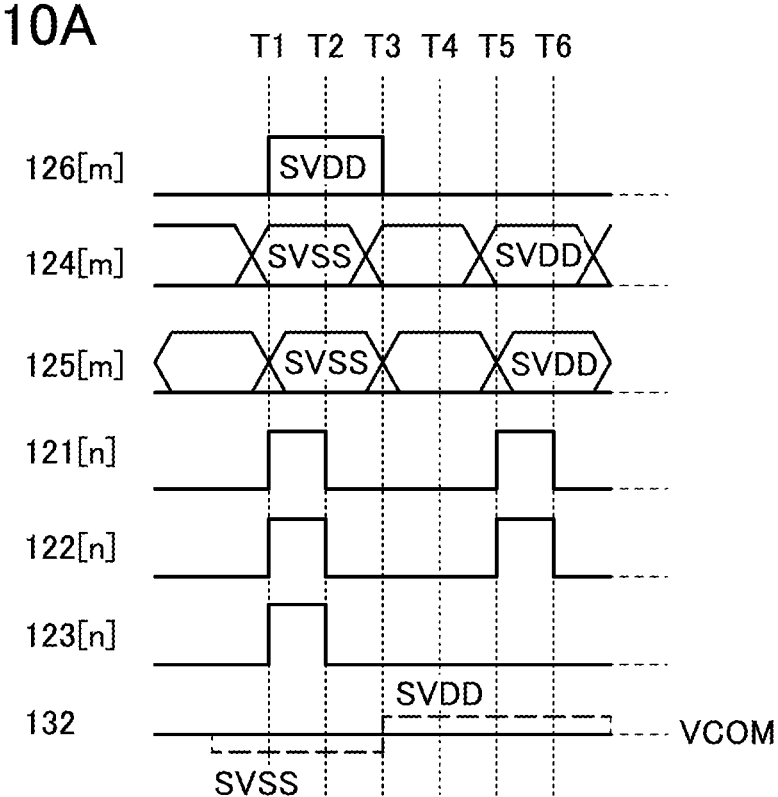
FIGS. 10(A) and (B) Timing charts showing an operation of a display device.

In addition, the operation of writing the weight (W) may be omitted and only the operation for generating a high voltage may be performed. For example, it is possible to operate according to the timing chart shown in FIG. 10(A). In FIGS. 8 and 9, the potential of the node NM is raised by capacitive coupling using one capacitor; but the operation can raise the potential of the node NM by two capacitors to generate a higher voltage.

Since the operation of writing weight (W) is omitted, an operation for raising the potential of the node NM may be performed with three capacitors by using the operation of the wiring 132 (common wiring) shown in the broken line. In this case, it is preferable that the potential of the wiring 132 be changed from SVSS to SVDD.

Figure 10B:
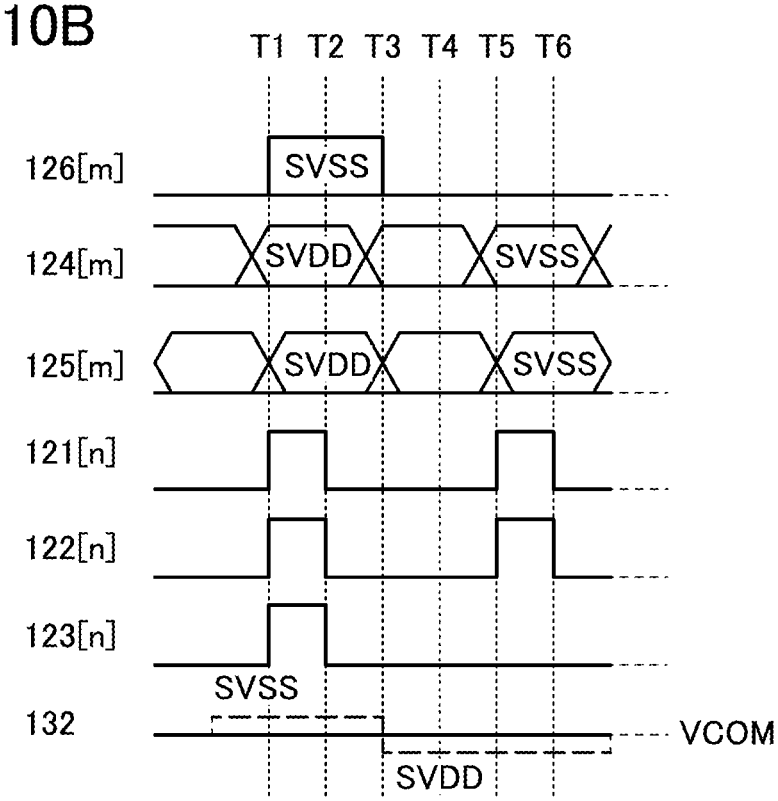

Note that as shown in FIG. 10(B), the operation may be the operation to change the supply of SVDD and SVSS.

Next, the second frame and subsequent frames are described. When the OCB mode is used, the operation of the first frame is performed, and then operations of the second and subsequent frames, which is described below, are performed.

Figure 11:
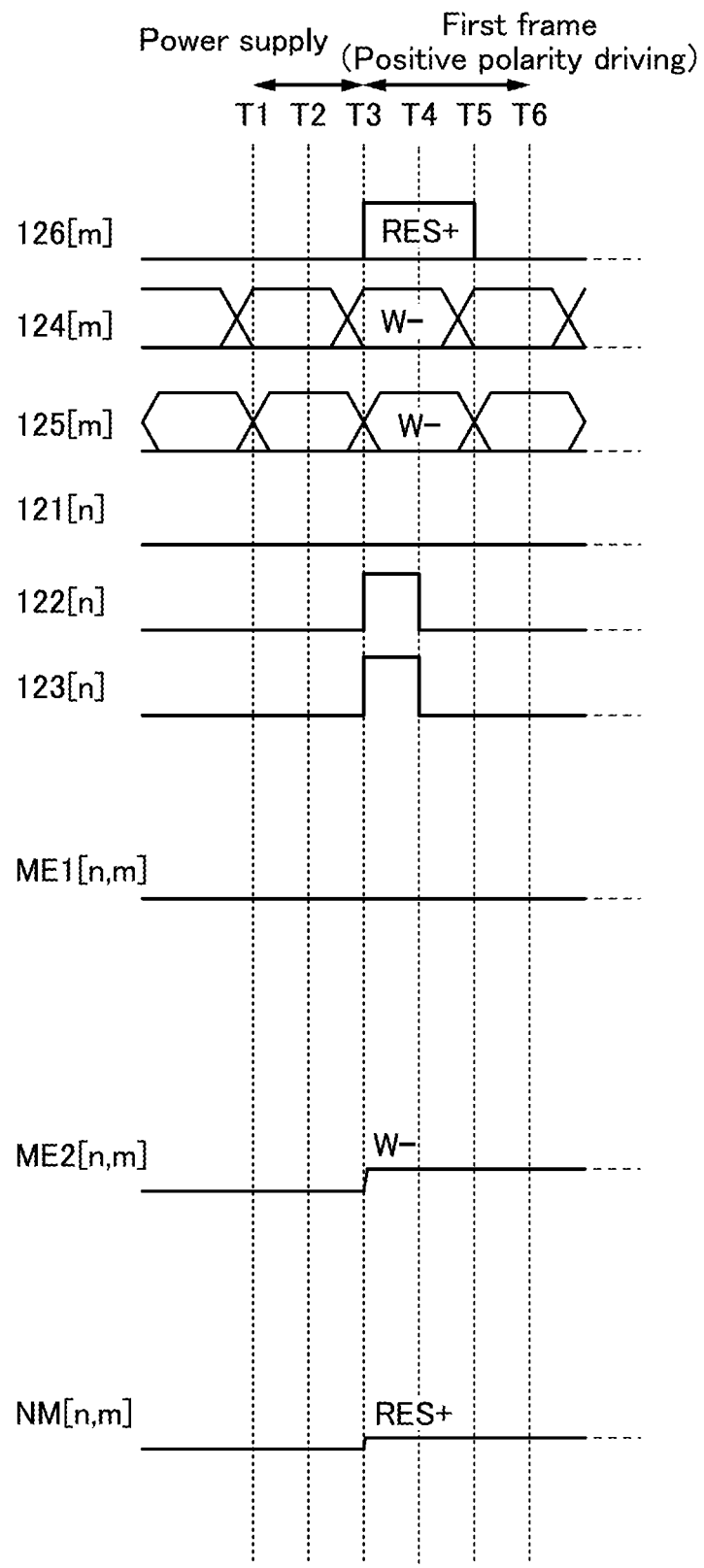
FIG. 11 A timing chart showing an operation of a display device.

In the case of using a polymer-dispersed liquid crystal, it is unnecessary to apply a high voltage to the liquid crystal element; thus, in the first frame, the operation of writing "W−" as the weight (W) and "RES+" as the reset potential (RES) is performed, and then operations of the second and subsequent frames described below are performed. Note that although the positive polarity driving is shown as an example in FIG. 11, operations writing "W+" and "RES−" may be performed in the negative polarity driving. In the case of using the polymer-dispersed liquid crystal, FIG. 4(A) or 4(B) can be used for the selection circuit 14.

In the first frame, the above high-voltage generation operation is performed, and a writing operation of the weight (W) is performed. In the case where the first frame is the positive polarity operation, the weight "W−" for the next frame negative polarity operation is written; in the case where the first frame is the negative polarity operation, the weight "W+" for the next frame positive polarity operation is written. Also in and after the second frame, writing the weight (W) for the next frame is performed.

Figure 12:
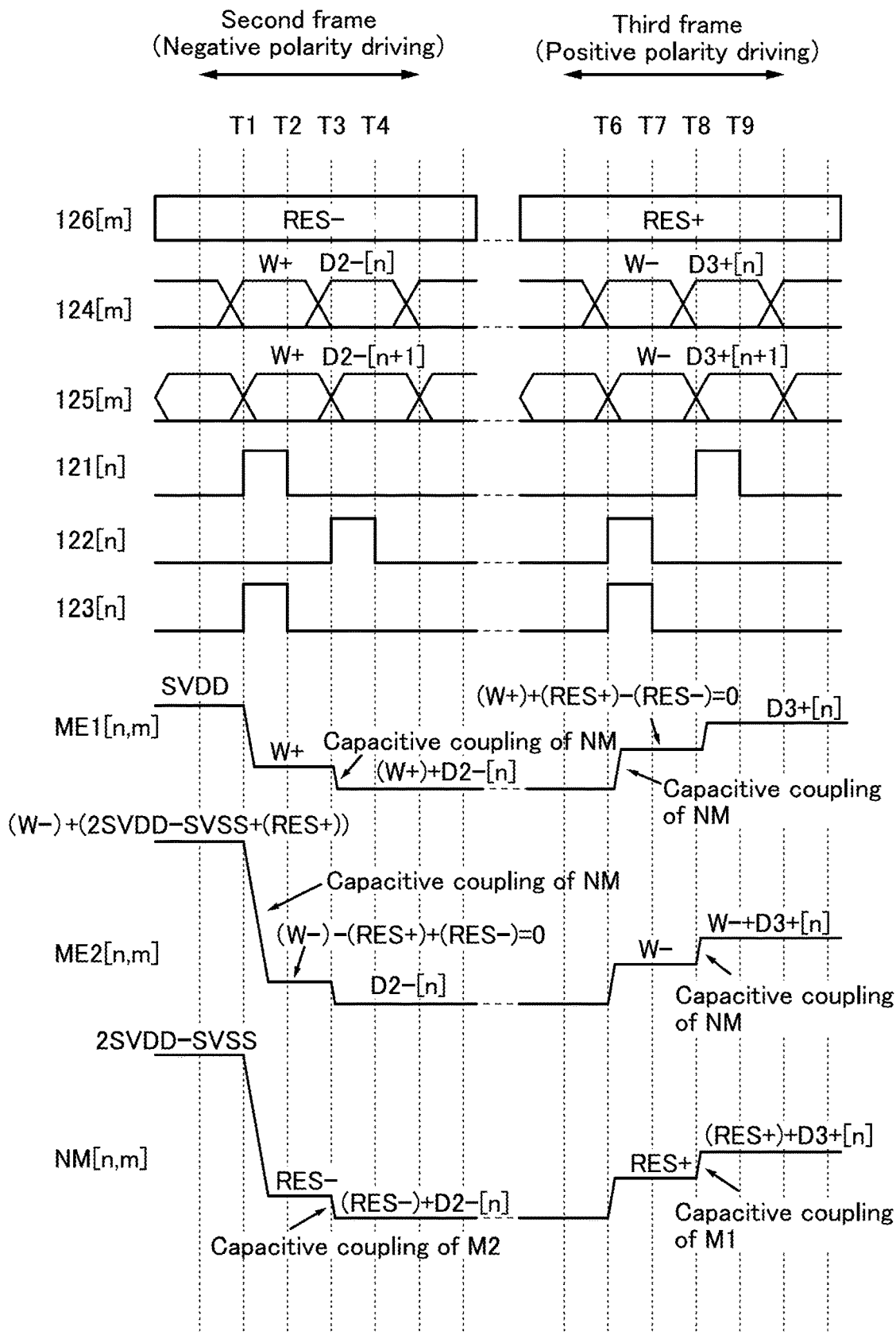
FIG. 12 A timing chart showing an operation of a display device.

FIG. 12 is the timing chart showing operations of the second and the third frame following the operation of the first frame shown in FIG. 8. The operation of the second frame is a negative polarity driving and the operation of the third frame is a positive polarity driving.

At the time T1, when "RES−" is supplied to the wiring 126[*m*], the weight "W+" is supplied to the wirings 124[*m*] and 125[*m*], and the potentials of the wirings 121[*n*] and 123[*n*] are set to "H", the transistor 101 is turned on and the node NM is reset to the reset potential "RES−". At this time, the potential of the node ME2 becomes "(W−)−(RES+)+ (RES−)"="0" due to capacitive coupling. The transistor 102 is turned on, and the potential of the node ME1 becomes "W+".

At the time T2, when the potentials of the wirings 121[*n*] and 123[*n*] are set to "L", the transistors 101 and 102 are turned off and the potentials of the nodes NM and ME1 are held.

At the time T3, when the wirings 124[*m*] and 125[*m*] are supplied with data "D2−[n]" and "D2−[n+1]" for the negative polarity driving respectively and the potential of the wiring 122[*n*] is set to "H", the transistor 103 is turned on and the potential of the node ME2 in the pixel 10[*n,m*] becomes "D2−[n]". The potential of the node ME2 in the pixel 10[*n*+1,m] becomes "D2−[n+1]".

Therefore, the potential of the node NM in the pixel 10[*n,m*] becomes "(RES−)+D2−[n]" due to capacitive coupling. The potential of the node NM in the pixel 10[*n*+1,m] becomes "(RES−)+D2−[n+1]" due to capacitive coupling. In addition, the potential of the node ME1 in the pixel 10[*n,m*] becomes "(W+)+D2−[n]" due to capacitive coupling. The potential of the node NM in the pixel 10[*n*+1,m] becomes "(W+)+D2−[n+1]" due to capacitive coupling.

At the time T4, when the potential of the wiring 122[*n*] is set to "L", the transistor 103 is turned off, the potential of the node NM is held, and display is maintained until the next frame rewriting. The above is the description of the operation of the second frame.

Next, the operation of the third frame is described. The operation of the third frame is the positive polarity driving.

At the time T6, when "RES+" is supplied to the wiring 126, the weight "W−" is supplied to the wirings 124[*m*] and 125[*m*], and the potentials of the wirings 122[*n*] and 123[*n*] are set to "H", the transistor 101 is turned on and the node NM is reset to the reset potential "RES+". At this time, the potential of the node ME1 becomes "(W+)+ (RES+)− (RES−)"="0" due to capacitive coupling. The transistor 103 is turned on, and the potential of the node ME2 becomes "W−".

At the time T7, when the potentials of the wirings 122[*n*] and 123[*n*] are set to "L", the transistors 101 and 103 are turned off and the potentials of the nodes NM and ME2 are held.

At the time T8, when the wirings 124[*m*] and 125[*m*] are supplied with data "D3+[n]" and "D3+[n+1]" for the positive polarity driving respectively and the potential of the wiring 121[*n*] is set to "H", the transistor 102 is turned on and the potential of the node ME1 in the pixel 10[*n,m*] becomes "D3+[n]". The potential of the node ME1 in the pixel 10[*n*+1,m] becomes "D3+[n+1]".

Therefore, the potential of the node NM in the pixel 10[*n,m*] becomes "(RES+)+D3+[n]" due to capacitive coupling. The potential of the node NM in the pixel 10[*n*+1,m] becomes "(RES+)+D3+[n+1]" due to capacitive coupling. In addition, the potential of the node ME2 in the pixel 10[*n,m*] becomes "(W−)+D3+[n]" due to capacitive coupling. The potential of the node NM in the pixel 10[*n*+1,m] becomes "(W−)+D3+[n+1]" due to capacitive coupling.

At the time T9, when the potential of the wiring 121[*n*] is set to "L", the transistor 102 is turned off, the potential of the node NM is held, and display is maintained until the next frame rewriting. The above is the description of the operation of the third frame.

As described above, in the node NM, a high voltage is generated in the first frame, and then the voltage is held at the level of the reset potential "RES-" or a lower potential than that in the second frame (negative polarity driving). In addition, the voltage is held at the level of the reset potential "RES+" or a higher potential than that in the third frame (positive polarity driving). Thus, the event in which bend alignment returns to splay alignment can be inhibited when using the liquid crystal element of the OCB mode.

Although the above describes the operation with the liquid crystal element with a high threshold voltage, the pixel 10 and an operation method thereof of one embodiment of the present invention are applicable without being limited by the kind of the liquid crystal element. For example, when an operation method which is different from the above-described operation method is used, a voltage about twice as high as the output voltage of the source driver can be applied to the liquid crystal element.

Figure 13:
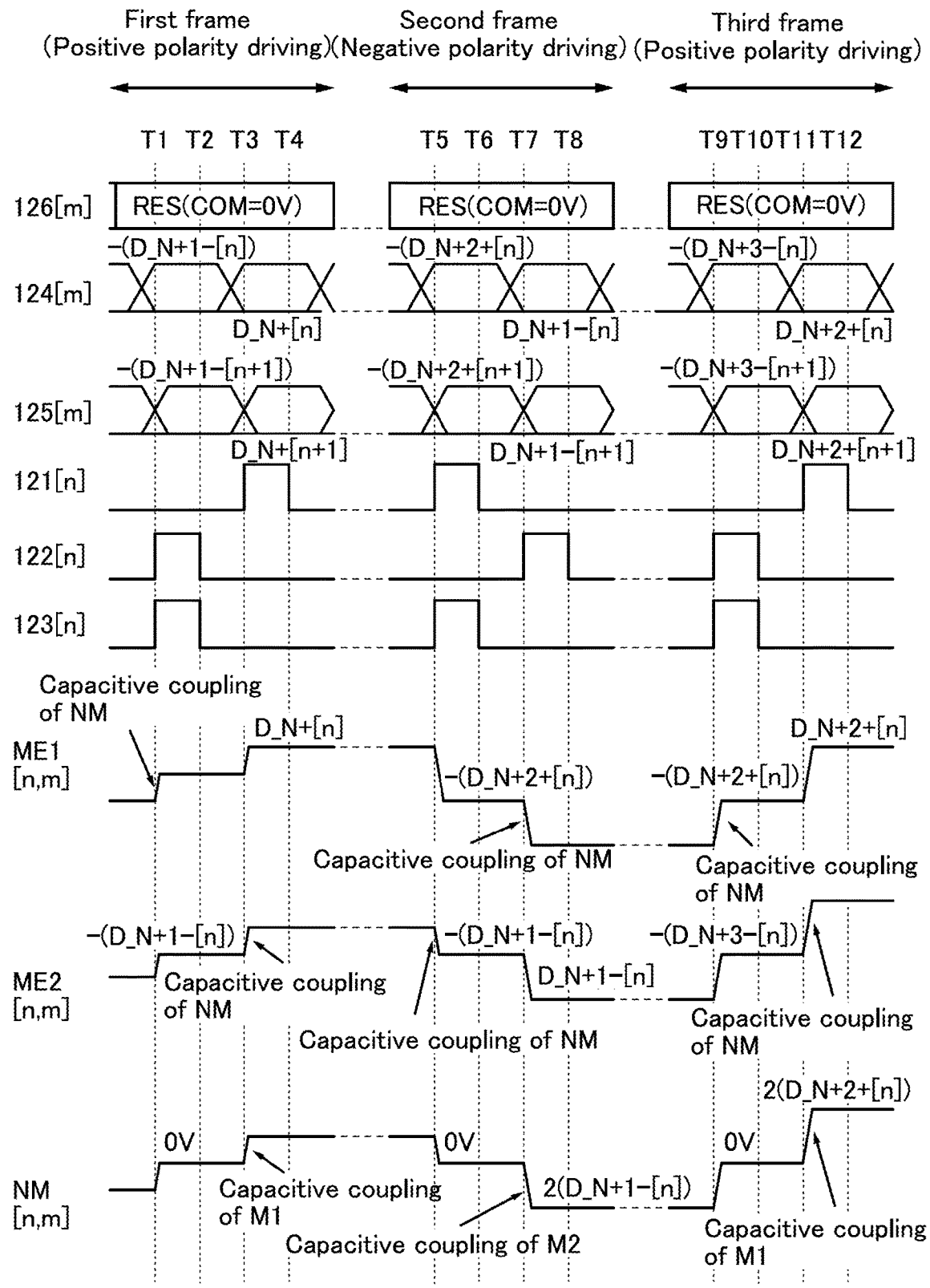
FIG. 13 A timing chart showing an operation of a display device.

FIG. 13 is the timing chart showing an operation in which a voltage about twice as high as the output voltage of the source driver 12 can be applied to the liquid crystal element 107 by using the pixel 10 shown in FIG. 3. In the operation, polarity inversion data of the data (D) written in the next frame is used as the weight (W). In addition, as the reset potential (RES), 0 V (e.g., the common potential) is used. Note that although the operation in which the weight (W) and the data (D) has the same absolute value and the output voltage is made about twice is described here, a desired voltage can be generated by supplying a predetermined weight (W) in the output range of the source driver 12.

In the signal potential supplied to the wirings 124[*m*] and 125[*m*] shown in FIG. 13, for example, "D" in "D_N+[n]" means data, "N" means the frame which is used, "+" means the signal potential for the positive polarity driving, and [n] means the signal potential of the pixel 10 for the n-th column. Note that the polarity inversion data of the signal potential is represented as "−(D_N+[n])". In addition, the first frame is the positive polarity driving.

At the time T1, when the wiring 126[*m*] is supplied with the reset potential "0 V", the wiring 124[*m*] is supplied with the weight "−(D_N+1−[n])", the wiring 125[*m*] is supplied with the weight "−(D_N+1−[n+1])", and the potentials of the wirings 122[*n*] and 123[*n*] are set to "H", the transistor 101 is turned on and the node NM is reset to "0 V". In addition, the transistor 103 is turned on and the potential of the node ME2 in the pixel 10[*n,m*] becomes "−(D_N+1− [n])". The potential of the node ME2 in the pixel 10[*n*+1,m] becomes "−(D_N+1−[n+1])". At the time T2, when the potentials of the wirings 122[*n*] and 123[*n*] are set to "L", the transistors 101 and 103 are turned off and the potentials of the nodes NM and ME2 in each pixel 10 are held.

At the time T3, when the wiring 124[*m*] is supplied with data "D_N+[n]" for the positive polarity driving, the wiring 125[*m*] is supplied with data "D_N+[n+1]" for the positive polarity driving, and the potential of the wiring 121[*n*] is set to "H", the transistor 102 is turned on and the potential of the node ME1 in the pixel 10[*n,m*] becomes "D_N+[*n*]". In addition, the potential of the node ME1 in the pixel 10[*n*+ 1,m] becomes "D_N+[n+1]".

Therefore, the potential of the node NM in the pixel 10[*n,m*] becomes higher than 0 V due to capacitive coupling; however, the potential is not set enough due to lack of the weight writing operation in the previous frame. That is, the first frame is not suitable for the display operation.

At the time T4, when the potential of the wiring 121[$n$] is set to "L", the transistor 102 is turned off, and the potential of the node NM is held. The above is the description of the operation of the first frame.

Next, the operation of the second frame is described. The operation of the second frame is the negative polarity driving.

At the time T5, when the wiring 126[$m$] is supplied with the reset potential "0 V", the wiring 124 is supplied with the weight "-(D_N+2-[n])", the wiring 125[$m$] is supplied with the weight "-(D_N+2-[n+1])", and the potentials of the wirings 121[$n$] and 123[$n$] are set to "H", the transistor 101 is turned on and the node NM is reset to the reset potential "0 V".

At this time, the potential of the node ME2 in the pixel 10[$n,m$] becomes "-(D_N+1-[n])" due to capacitive coupling. The transistor 102 is turned on and the potential of the node ME1 becomes "-(D_N+2+[n])". In addition, the potential of the node ME2 in the pixel 10[$n$+1,$m$] becomes "-(D_N+1-[n+1])" due to capacitive coupling. In addition, the potential of the node ME1 becomes "-(D_N+2+[n+1])".

At the time T6, when the potentials of the wirings 121[$n$] and 123[$n$] are set to "L", the transistor 102 and the transistor 103 are turned off and the potentials of the nodes NM and ME1 are held. At this time, the potentials of all nodes are determined.

At the time T7, when the wirings 124[$m$] and 125[$m$] are supplied with data "D_N+1-[n]" and "D_N+1-[n+1]" for the negative polarity driving respectively and the potential of the wiring 122[$n$] is set to "H", the transistor 103 is turned on and the potential of the node ME2 in the pixel 10[$n,m$] becomes "D_N+1-[n]". In addition, the potential of the node ME2 in the pixel 10[$n$+1,$m$] becomes "D_N+1-[n+1]"

Thus, the potential of the node NM in the pixel 10[$n,m$] becomes 0-(-(D_N+1-[n])-D_N+1-[n])=2 (D_N+1-[n]) due to capacitive coupling. Furthermore, the potential of the node NM in the pixel 10[$n$+1,$m$] becomes 0-(-(D_N+1-[n+1])-D_N+1-[n+1])=2 (D_N+1-[n+1]) due to capacitive coupling. That is, a voltage twice as high as the signal voltage supplied as data can be supplied to the liquid crystal element 107.

At the time T8, when the potential of the wiring 122[$n$] is set to "L", the transistor 102 is turned off, the potential of the node NM is held, and display is performed until the next frame rewriting. The above is the description of the operation of the second frame.

Next, the operation of the third frame is described. The operation of the third frame is the positive polarity driving.

At the time T9, when the wiring 126[$m$] is supplied with the reset potential "0 V", the wiring 124[$m$] is supplied with the weight "-(D_N+3-[n])", the wiring 125[$m$] is supplied with the weight "-(D_N+3-[n+1])", and the potentials of the wirings 122[$n$] and 123[$n$] are set to "H", the transistor 101 is turned on and the node NM is reset to the reset potential "0 V".

At this time, the potential of the node ME1 in the pixel 10[$n,m$] becomes "-(D_N+2+[n])" due to capacitive coupling. The transistor 103 is turned on, and the potential of the node ME2 becomes "-(D_N+3-[n])". In addition, the potential of the node ME1 in the pixel 10[$n$+1,$m$] becomes "-(D_N+2+[n+1])" due to capacitive coupling. In addition, the potential of the node ME2 becomes "-(D_N+3-[n+1])".

At the time T10, when the potentials of the wirings 122[$n$] and 123[$n$] are set to "L", the transistors 101 and 103 are turned off and the potentials of the nodes NM and ME2 are held.

At the time T11, when the wirings 124[$m$] and 125[$m$] are supplied with data "D_N+2+[n]" and "D_N+2+[n+1]" for the positive polarity driving respectively and the potential of the wiring 121[$n$] is set to "H", the transistor 102 is turned on and the potential of the node ME1 in the pixel 10[$n,m$] becomes "D_N+2+[n]". In addition, the potential of the node ME1 in the pixel 10[$n$+1,$m$] becomes "D_N+2+[n+1]".

Thus, the potential of the node NM in the pixel 10[$n,m$] becomes 0+ (D_N+2+[n])-(-(D_N+2+[n])=2 (D_N+2+[n]) due to capacitive coupling. Furthermore, the potential of the node NM in the pixel 10[$n$+1,$m$] becomes 0+ (D_N+2+[n+1])-(-D_N+2+[n+1])=2 (D_N+2+[n+1]) due to capacitive coupling. That is, a voltage twice as high as the signal voltage supplied as data can be supplied to the liquid crystal element 107.

At the time T12, when the potential of the wiring 121[$n$] is set to "L", the transistor 102 is turned off, the potential of the node NM is held, and display is performed until the next frame rewriting. The above is the description of the operation of the third frame.

As described above, with the above operation method, twice a voltage as high as the signal voltage supplied as data can be supplied to the liquid crystal element 107. In addition, in the operation method, since the weight is rewritten without inversion of the charge in both electrodes of the capacitor, driving can be performed with low power consumption.

Figure 14A:
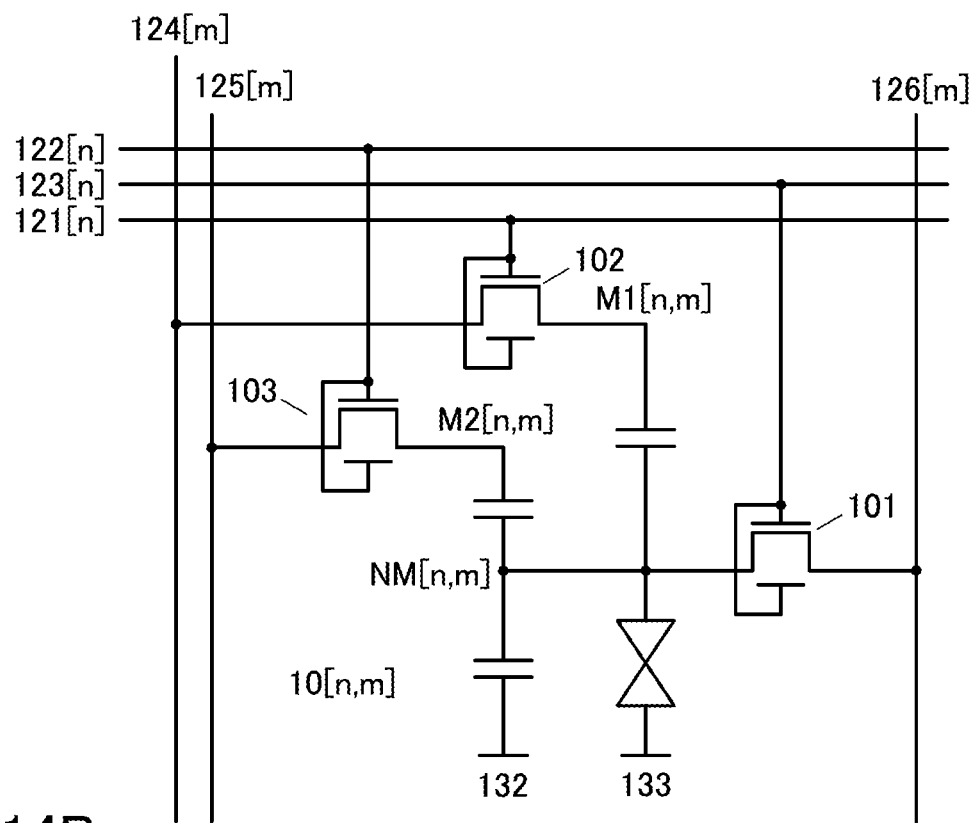
FIGS. 14(A) and (B) Diagrams showing pixel circuits.

As shown in FIG. 14(A), the pixel 10 may employ a structure in which the transistors 101, 102, and 103 each include a back gate. FIG. 14(A) shows a structure in which the back gates are electrically connected to the front gates, which has an effect of increasing on-state currents. In addition, a structure in which a back gate is electrically connected to a wiring through which a constant potential can be supplied may be used. In such a structure, the threshold voltage of the transistor can be controlled. Note that other transistors included in the display element may also have a back gate.

Figure 14B:
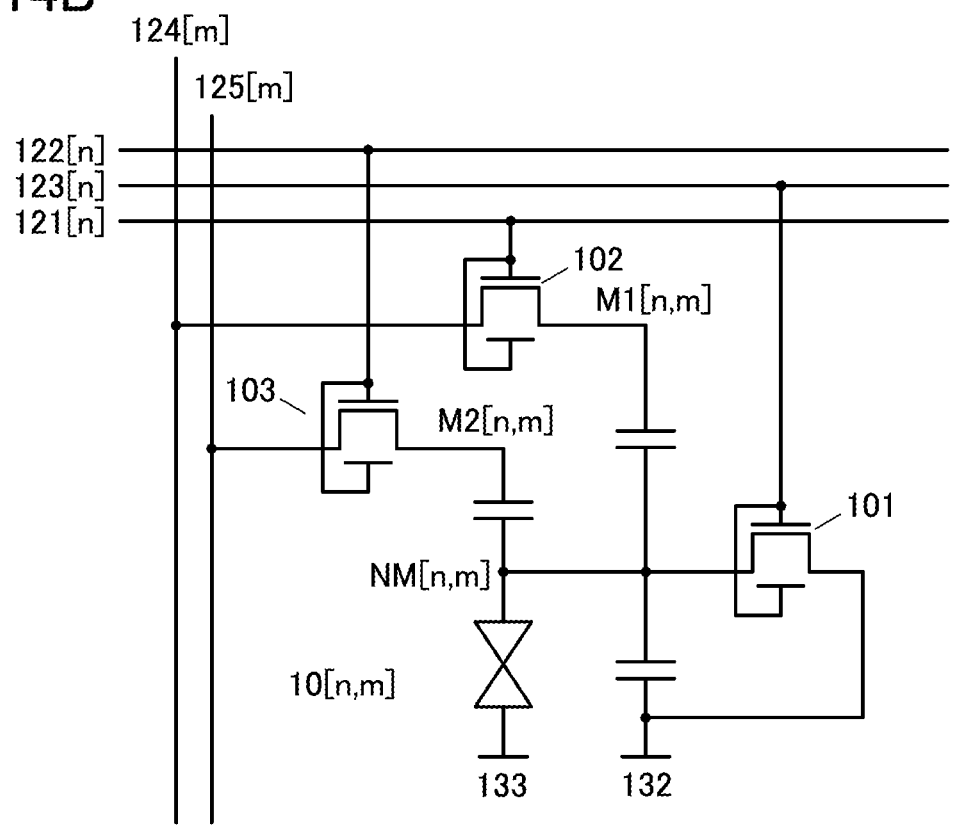

In the display device which is assumed to perform the operation in FIG. 13, since the reset potential is fixed to 0 V (e.g., the common potential), the other of the source and drain of the transistor 101 may be connected to the wiring 132 as shown in FIG. 14(B). With the structure, the wiring 126 can be omitted, leading to an increase in aperture ratio.

Next, simulation results of the pixel 10 of the display device shown in FIG. 3 are described. The simulation was performed on four pixels; the voltage change in a node N to which one of electrodes of a liquid crystal element (Clc) of one of the four pixels (see FIG. 15(A)) was connected was calculated. The following is the parameters used for the simulation: the transistor size was L/W=4 μm/4 μm (the transistor included in the pixel 10), the capacitances of capacitors C+ and C-were 500 fF, the capacitance of a capacitor Cs was 100 fF, the capacitance of the liquid crystal element Clc was 100 fF, and common electrodes VCOM and TCOM were set to 0 V. In addition, the voltage applied to the gate of the transistor was set to +15 V as "H" and -5 V as "L". Note that SPICE was used as circuit simulation software.

Figure 15A:
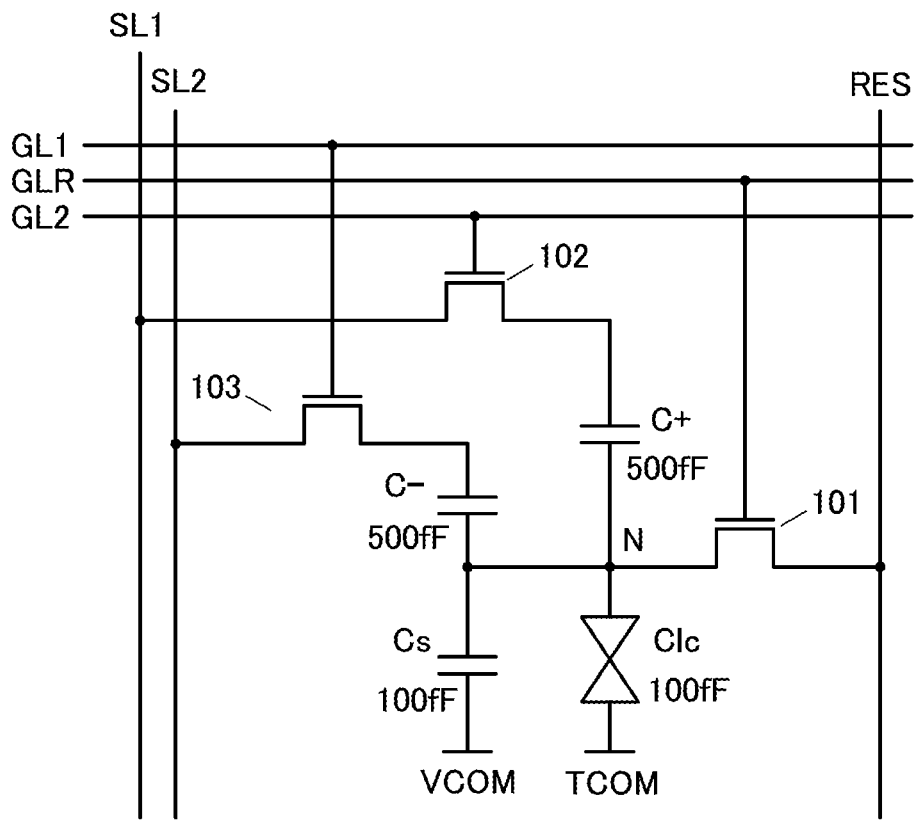
FIG. 15(A) A diagram showing a pixel circuit configuration used for a simulation. (B) A timing chart used for the simulation.
Figure 15B:
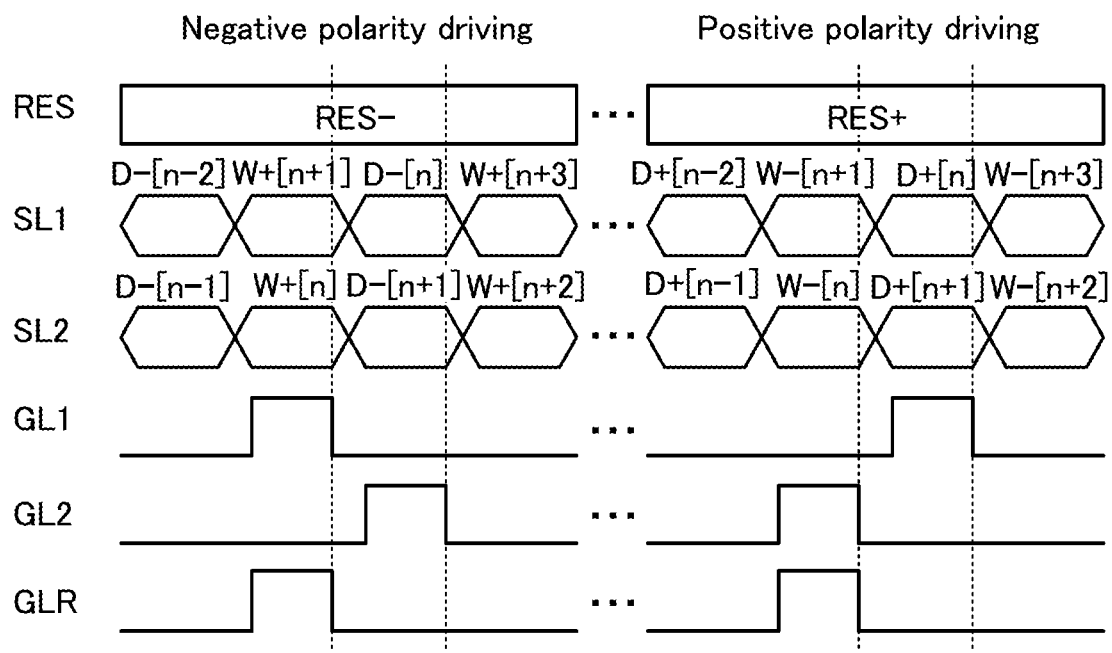

FIG. 15(B) is a timing chart used for the simulation. The negative polarity driving and the positive polarity driving were repeated several times in this order. The simulation was performed on an operation A in which a voltage at a certain value or higher can be held in the node N of the OCB mode or the like and an operation B of the normal liquid crystal (e.g., twice an output value operation). In the former, "RES-" was -2 V, "RES+" was +2 V, W+ was -4 V, D-was −5 V, W− was +4 V, and D+ was +5 V. In the latter, "RES−" and "RES+" were 0 V, W+ was −4 V, D− was −5 V, W− was +4 V, and D+ was +5 V.

Figure 16A:
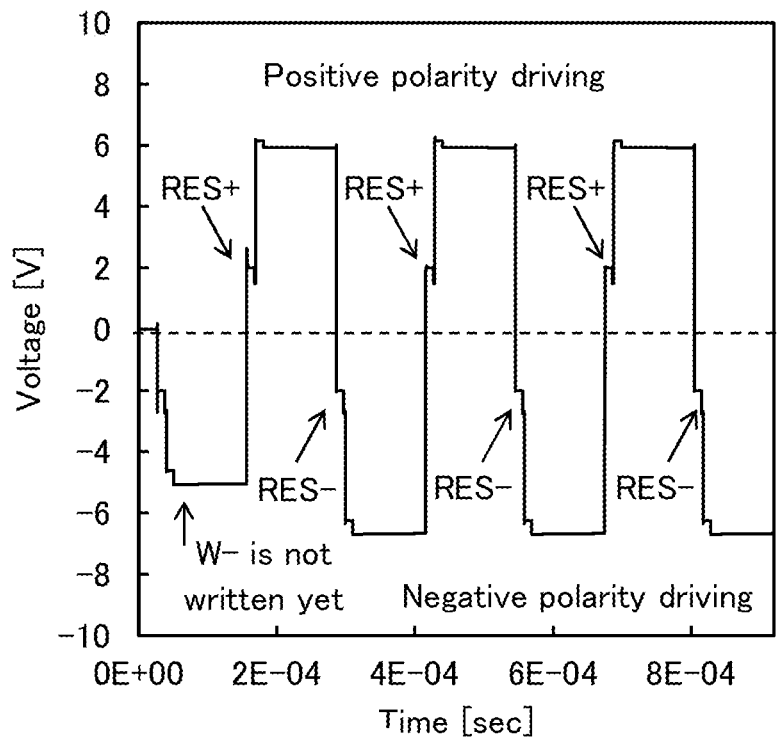
FIGS. 16(A) and (B) Charts showing simulation results.

FIG. 16(A) shows the simulation result of the operation A. The horizontal axis represents the time and the vertical axis represents the voltage of the node N. The upper side over 0 V at the middle of the graph shows the positive polarity operation and the lower side shows the negative polarity driving. In the negative polarity operation at first, the voltage was relatively low since there was no writing of W− of the previous operation; but in other operations, it was confirmed that a voltage higher than the input data by the weight was output. In addition, it was confirmed that there was a period in which "RES+" or "RES−" corresponding to the offset voltage was held and the node N was not held less than or equal to a predetermined voltage. The above results show that in the case where the liquid crystal element of the OCB mode is used, returning from bend alignment to splay alignment can be prevented.

Figure 16B:
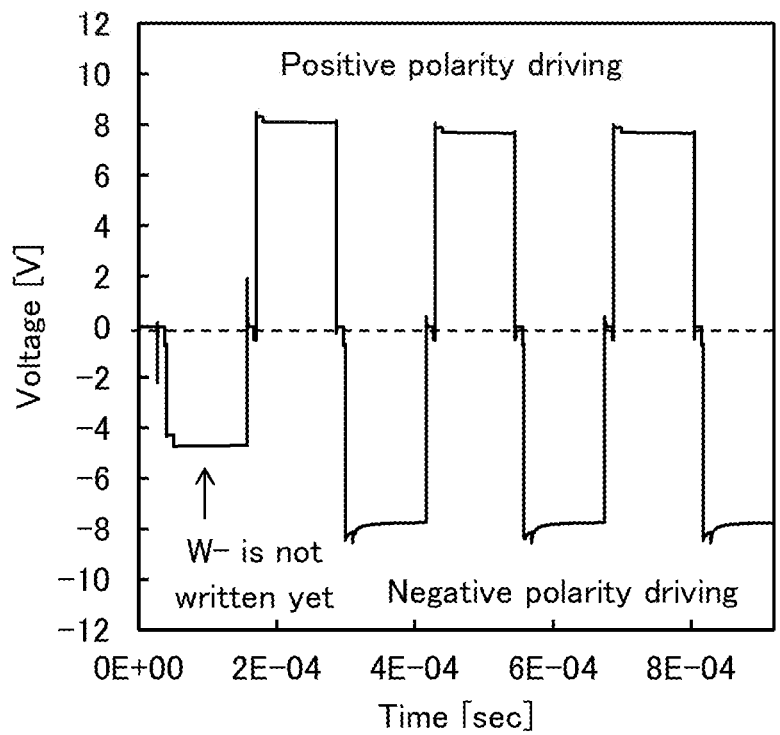

FIG. 16(B) shows the simulation result of the operation B. As in the operation A, in the negative polarity operation at first, the voltage was relatively low since there was no writing of W− of the previous operation. In other operations, it was confirmed that a voltage higher than the input data was output. In addition, in the operations A and B, it was confirmed that the weight was held after the period of polarity operation change.

Figure 17:
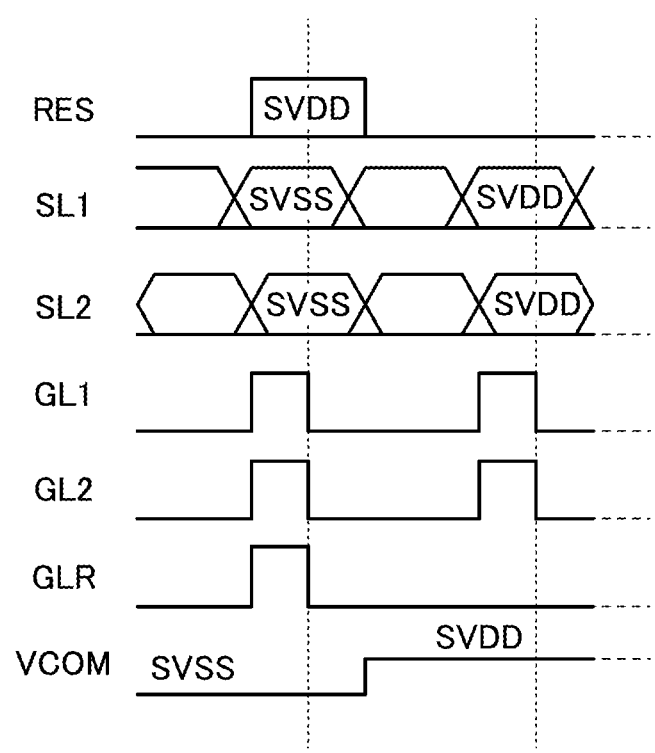
FIG. 17 A timing chart used for a simulation.
Figure 18:
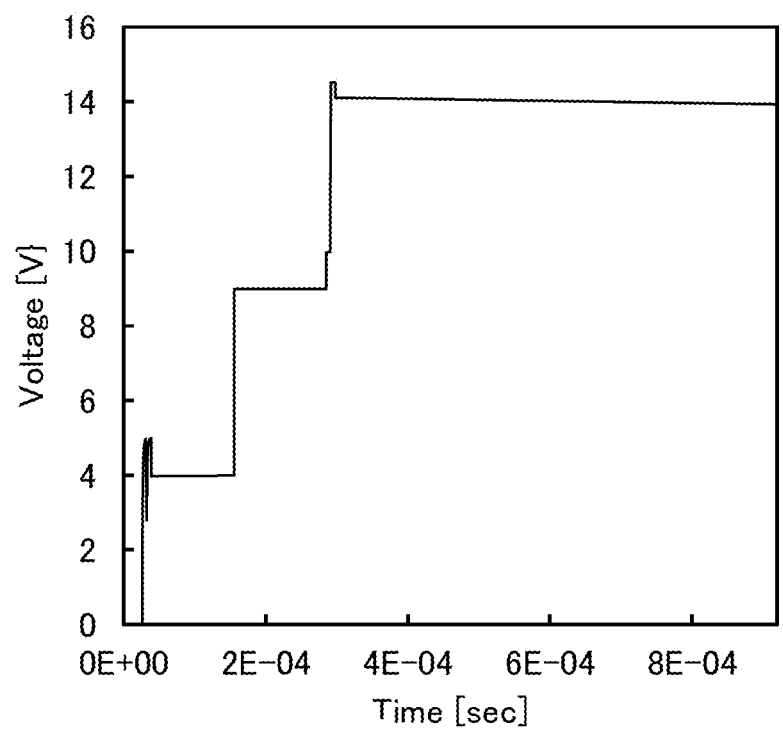
FIG. 18 A chart showing a simulation result.

Furthermore, an operation of generating a high voltage in the pixel shown in FIG. 15(A) was verified using the timing chart shown in FIG. 17. In the operation, the potential of the node N was raised by using the three capacitors C+, C−, and Cs. Here, SVDD was +5 V and SVSS was −5 V. FIG. 18 shows the simulation result. By the operation, it was confirmed that a voltage nearly three times higher than the power supply voltage can be obtained. The result shows that when the liquid crystal element with the OCB mode is used, bend alignment can be achieved.

According to the simulation result, the effect of one embodiment of the present invention is confirmed.

This embodiment can be implemented in combination with any of the structures described in the other embodiments and the like, as appropriate.

Embodiment 2

In this embodiment, structure examples of a display device including a liquid crystal element will be described. Note that the description of the components, operations, and functions of the display device described in Embodiment 1 is omitted in this embodiment.

Figure 19A:
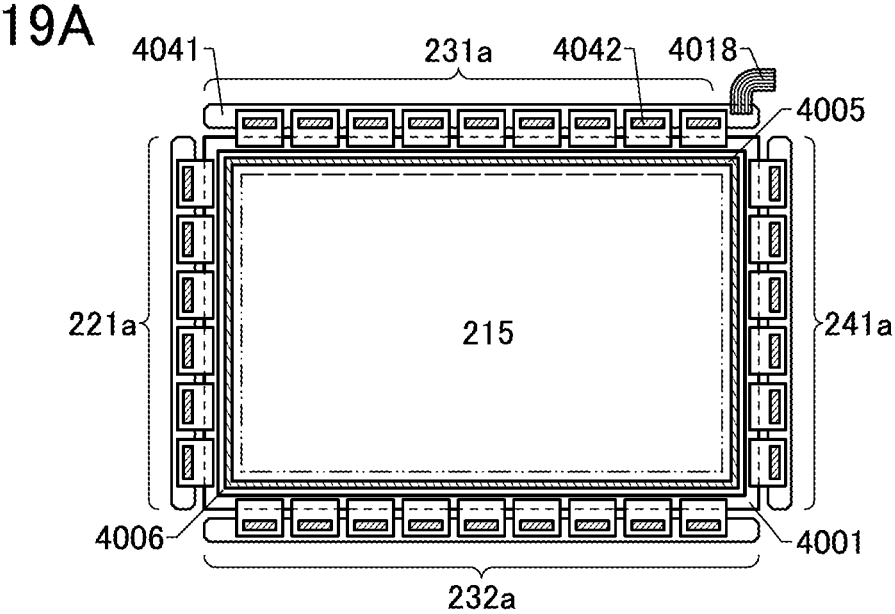
FIG. 19(A) to (C) Diagrams showing display devices.
Figure 19B:
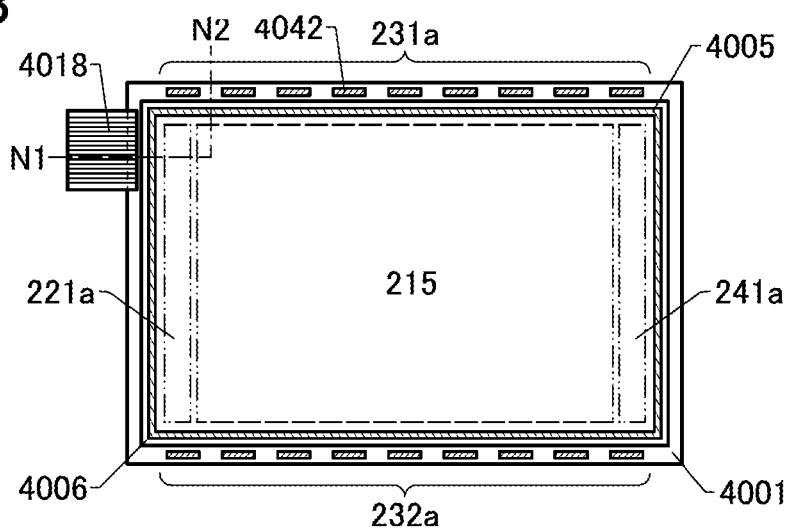
Figure 19C:
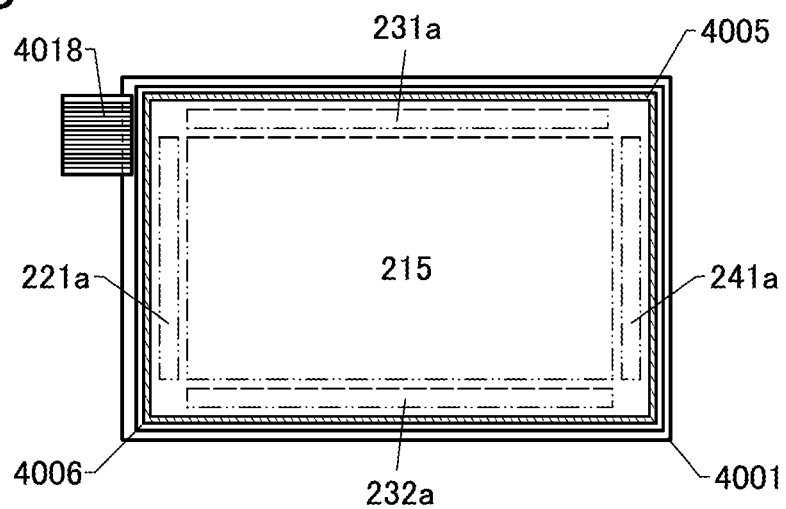

FIGS. 19(A) to 19(C) are diagrams each showing a structure of a display device in which one embodiment of the present invention can be used.

In FIG. 19(A), a sealant 4005 is provided to surround a display portion 215 provided over a first substrate 4001, and the display portion 215 is sealed with the sealant 4005 and a second substrate 4006.

The pixel 10 and the like described in Embodiment 1 can be provided in the display portion 215. Note that a scan line driver circuit and a signal line driver circuit which are described below correspond to the gate driver and the source driver, respectively.

In FIG. 19(A), a scan line driver circuit 221a, a signal line driver circuit 231a, a signal line driver circuit 232a, and a common line driver circuit 241a each include a plurality of integrated circuits 4042 provided over a printed circuit board 4041. The integrated circuits 4042 are each formed using a single crystal semiconductor or a polycrystalline semiconductor. The common line driver circuit 241a has a function of providing a predetermined potential to the wirings 126, 132, 133, and the like described in Embodiment 1.

Signals and potentials are supplied to the scan line driver circuit 221a, the common line driver circuit 241a, the signal line driver circuit 231a, and the signal line driver circuit 232a through an FPC (FPC: Flexible Printed Circuit) 4018.

The integrated circuits 4042 included in the scan line driver circuit 221a and the common line driver circuit 241a each have a function of providing a selection signal to the display portion 215. The integrated circuits 4042 included in the signal line driver circuit 231a and the signal line driver circuit 232a each have a function of supplying image data to the display portion 215. The integrated circuits 4042 are mounted in a region different from a region surrounded by the sealant 4005 over the first substrate 4001.

Note that the connection method of the integrated circuits 4042 is not particularly limited; a wire bonding method, a COG (Chip On Glass) method, a TCP (Tape Carrier Package) method, a COF (Chip On Film) method, or the like can be used.

FIG. 19(B) shows an example of mounting the integrated circuits 4042 included in the signal line driver circuit 231a and the signal line driver circuit 232a by a COG method. Some or all of the driver circuits can be formed over a substrate over which the display portion 215 is formed, whereby a system-on-panel can be formed.

In the example shown in FIG. 19(B), the scan line driver circuit 221a and the common line driver circuit 241a are formed over the substrate over which the display portion 215 is formed. When the driver circuits are formed concurrently with the pixel circuit in the display portion 215, the number of components can be reduced. Accordingly, the productivity can be increased.

In FIG. 19(B), the sealant 4005 is provided to surround the display portion 215, the scan line driver circuit 221a, and the common line driver circuit 241a over the first substrate 4001. The second substrate 4006 is provided over the display portion 215, the scan line driver circuit 221a, and the common line driver circuit 241a. Consequently, the display portion 215, the scan line driver circuit 221a, and the common line driver circuit 241a are sealed together with a display element with the use of the first substrate 4001, the sealant 4005, and the second substrate 4006.

Although the signal line driver circuit 231a and the signal line driver circuit 232a are formed separately and mounted on the first substrate 4001 in the example shown in FIG. 19(B), one embodiment of the present invention is not limited to this structure. The scan line driver circuits may be separately formed and then mounted, or part of the signal line driver circuits or part of the scan line driver circuits may be separately formed and then mounted. The signal line driver circuit 231a and the signal line driver circuit 232a may be provided over the substrate over which the display portion 215 is formed, as illustrated in FIG. 19(C).

In some cases, the display device encompasses a panel in which a display element is sealed, and a module in which an IC or the like including a controller is mounted on the panel.

The display portion and the scan line driver circuit over the first substrate each include a plurality of transistors. Any of the transistors described in the above embodiment can be used as the transistors.

Transistors included in the peripheral driver circuits and transistors included in the pixel circuits of the display portion may have the same structure or different structures. The transistors included in the peripheral driver circuit may be transistors having the same structure, or transistors having two or more kinds of structures may be included. Similarly, the transistors included in the pixel circuits may be transistors having the same structure, or transistors having two or more kinds of structures may be included.

An input device 4200 can be provided over the second substrate 4006. The display devices shown in FIGS. 19(A) to 19(C) and provided with an input device 4200 can function as a touch panel.

There is no particular limitation on a detection element (also referred to as a sensor element) included in the touch panel of one embodiment of the present invention. A variety of sensors that can sense proximity or touch of a sensing target such as a finger or a stylus can be used as the sensor element.

For example, a variety of types such as a capacitive type, a resistive type, a surface acoustic wave type, an infrared type, an optical type, and a pressure-sensitive type can be used for the sensor.

In this embodiment, a touch panel including a capacitive sensor element will be described as an example.

Examples of the capacitive sensor element include a surface capacitive sensor element and a projected capacitive sensor element. Examples of the projected capacitive sensor element include a self-capacitive sensor element and a mutual capacitive sensor element. The use of a mutual capacitive sensor element is preferable because multiple points can be sensed simultaneously.

The touch panel of one embodiment of the present invention can have any of a variety of structures, including a structure in which a display device and a sensor element that are separately formed are attached to each other and a structure in which an electrode and the like included in a sensor element are provided on one or both of a substrate supporting a display element and a counter substrate.

Figure 20A:
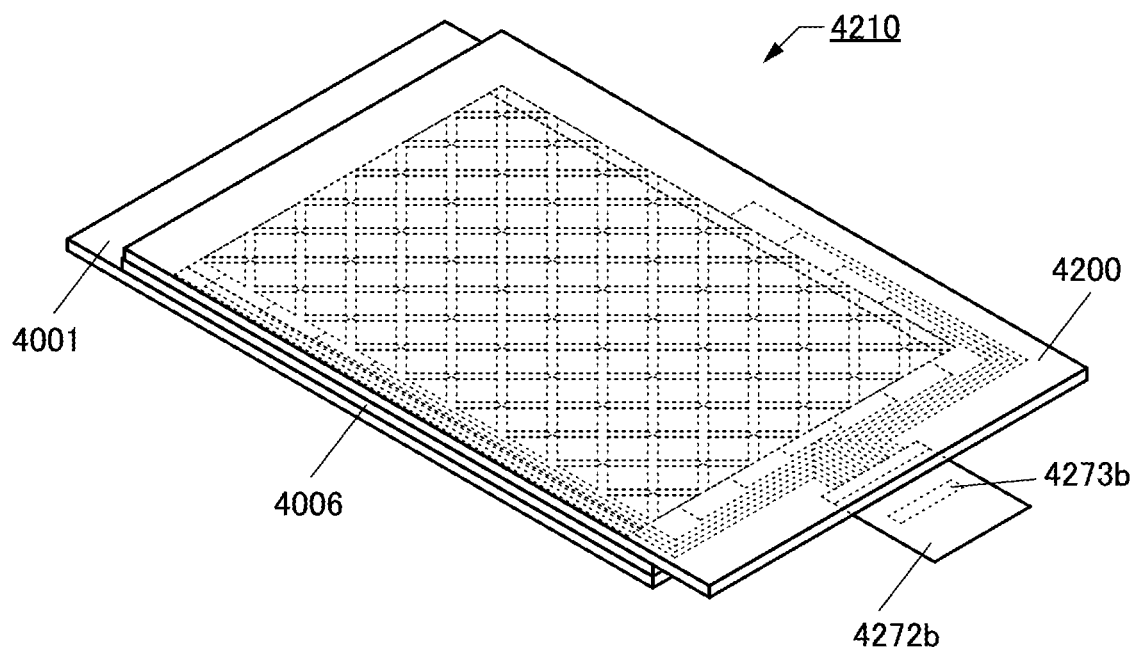
FIGS. 20(A) and (B) Diagrams showing touch panels.
Figure 20B:
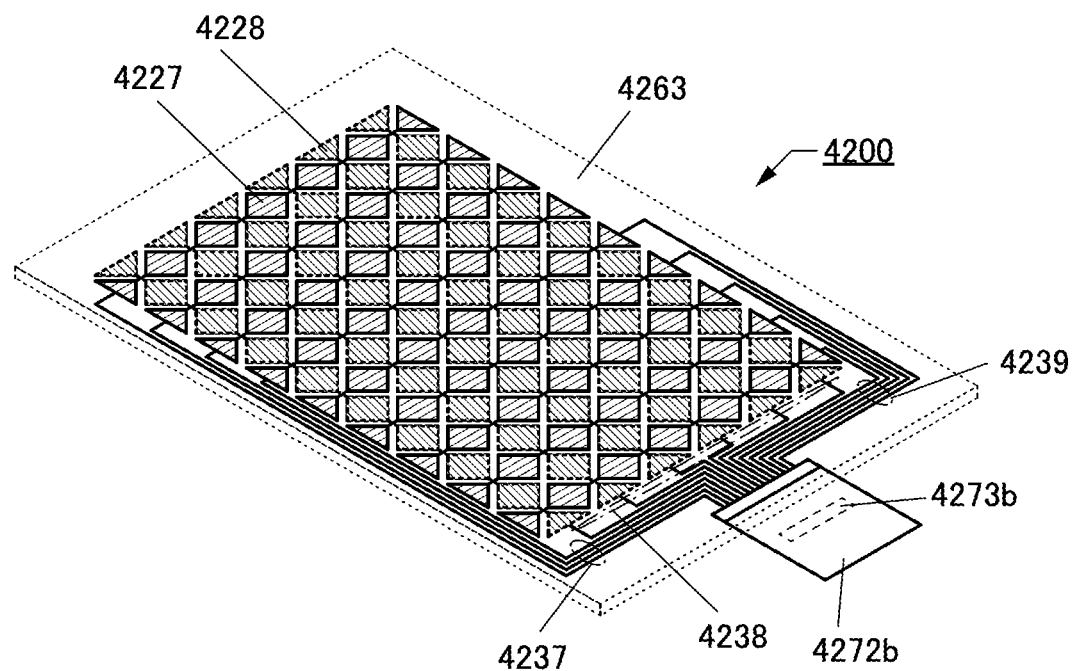

FIGS. 20(A) and 20(B) show an example of the touch panel. FIG. 20(A) is a perspective view of a touch panel 4210. FIG. 20(B) is a schematic perspective view of the input device 4200. Note that for simplicity, only the major components are shown.

The touch panel 4210 has a structure in which a display device and a sensor element that are formed separately are bonded together.

The touch panel 4210 includes the input device 4200 and the display device, which are provided to overlap with each other.

The input device 4200 includes a substrate 4263, an electrode 4227, an electrode 4228, a plurality of wirings 4237, a plurality of wirings 4238, and a plurality of wirings 4239. For example, the electrode 4227 can be electrically connected to the wiring 4237 or 4239. In addition, the electrode 4228 can be electrically connected to the wiring 4239. An FPC 4272b is electrically connected to each of the plurality of wirings 4237 and the plurality of wirings 4238. An IC 4273b can be provided on the FPC 4272b.

Furthermore, a touch sensor may be provided between the first substrate 4001 and the second substrate 4006 in the display device. In the case where a touch sensor is provided between the first substrate 4001 and the second substrate 4006, either a capacitive touch sensor or an optical touch sensor including a photoelectric conversion element may be used.

Figure 21:
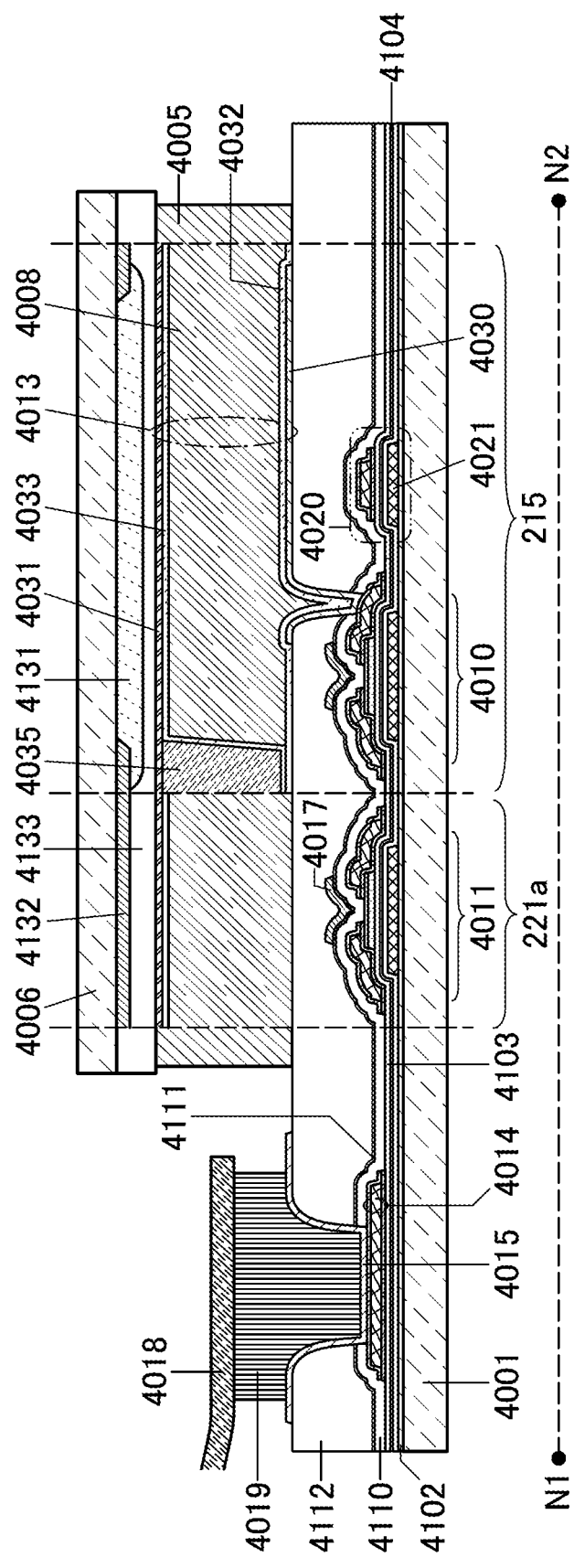
FIG. 21 A diagram showing a display device.

FIG. 21 is a cross-sectional view taken along the chain line N1-N2 in FIG. 19(B). A display device shown in FIG. 21 includes an electrode 4015, and the electrode 4015 is electrically connected to a terminal included in an FPC 4018 through an anisotropic conductive layer 4019. In FIG. 21, the electrode 4015 is electrically connected to a wiring 4014 in an opening formed in an insulating layer 4112, an insulating layer 4111, and an insulating layer 4110.

The electrode 4015 is formed of the same conductive layer as a first electrode layer 4030, and the wiring 4014 is formed of the same conductive layer as source and drain electrodes of transistors 4010 and 4011.

The display portion 215 and the scan line driver circuit 221a provided over the first substrate 4001 each include a plurality of transistors. In FIG. 21, the transistor 4010 included in the display portion 215 and the transistor 4011 included in the scan line driver circuit 221a are shown as an example. In the example shown in FIG. 21, the transistor 4010 and the transistor 4011 are bottom-gate transistors but may be top-gate transistors.

In FIG. 21, the insulating layer 4112 is provided over the transistor 4010 and the transistor 4011.

The transistor 4010 and the transistor 4011 are provided over an insulating layer 4102. The transistor 4010 and the transistor 4011 each include an electrode 4017 formed over the insulating layer 4111. The electrode 4017 can serve as a back gate electrode.

The display device shown in FIG. 21 includes a capacitor 4020. The capacitor 4020 includes an electrode 4021 formed in the same step as a gate electrode of the transistor 4010, and an electrode formed in the same step as a source electrode and a drain electrode of the transistor 4010. Each of the electrodes overlap with each other with an insulating layer 4103 therebetween.

In general, the capacitance of a capacitor provided in a pixel portion of a display device is set in consideration of the leakage current or the like of transistors provided in the pixel portion so that charges can be held for a predetermined period. The capacitance of the capacitor may be set considering the off-state current of the transistor or the like.

The transistor 4010 included in the display portion 215 is electrically connected to the display element. FIG. 21 shows an example of a liquid crystal display device using a liquid crystal element as the display element. In FIG. 21, a liquid crystal element 4013 that is a display element includes the first electrode layer 4030, a second electrode layer 4031, and a liquid crystal layer 4008. Note that an insulating layer 4032 and an insulating layer 4033 functioning as alignment films are provided so that the liquid crystal layer 4008 is positioned therebetween. The second electrode layer 4031 is provided on the second substrate 4006 side, and the first electrode layer 4030 and the second electrode layer 4031 overlap with each other with the liquid crystal layer 4008 therebetween.

A liquid crystal element having a variety of modes can be used as the liquid crystal element 4013. For example, a liquid crystal element using a VA (Vertical Alignment) mode, a TN (Twisted Nematic) mode, an IPS (In-Plane-Switching) mode, an ASM (Axially Symmetric aligned Micro-cell) mode, an OCB (Optically Compensated Bend) mode, an FLC (Ferroelectric Liquid Crystal) mode, an AFLC (AntiFerroelectric Liquid Crystal) mode, an ECB (Electrically Controlled Birefringence) mode, a VA-IPS mode, a guest-host mode, or the like can be used.

As the liquid crystal display device of this embodiment, a normally black liquid crystal display device such as a transmissive liquid crystal display device employing a vertical alignment (VA) mode may be used. As the vertical alignment mode, an MVA (Multi-Domain Vertical Alignment) mode, a PVA (Patterned Vertical Alignment) mode, an ASV (Advanced Super View) mode, and the like, can be used.

Note that the liquid crystal element is an element that controls transmission and non-transmission of light by the optical modulation action of a liquid crystal. The optical modulation action of the liquid crystal is controlled by an electric field applied to the liquid crystal (including a horizontal electric field, a vertical electric field, and an oblique electric field). As the liquid crystal used for the liquid crystal element, a thermotropic liquid crystal, a low-molecular liquid crystal, a high-molecular liquid crystal, a polymer dispersed liquid crystal (PDLC), a ferroelectric liquid crystal, an anti-ferroelectric liquid crystal, or the like can be used. Such a liquid crystal material exhibits a cholesteric phase, a smectic phase, a cubic phase, a chiral nematic phase, an isotropic phase, or the like depending on conditions.

Although FIG. 21 shows an example of a display device including a liquid crystal element with a vertical electric field mode, a display device including a liquid crystal element with a horizontal electric field mode can be applied to one embodiment of the present invention. In the case of employing a horizontal electric field mode, a liquid crystal exhibiting a blue phase for which an alignment film is not used may be used. The blue phase is one of the liquid crystal phases, which appears just before a cholesteric phase changes into an isotropic phase when the temperature of a cholesteric liquid crystal is increased. Since the blue phase appears only in a narrow temperature range, a liquid crystal composition in which a chiral material of 5 weight % or more is mixed is used for the liquid crystal layer 4008 in order to improve the temperature range. The liquid crystal composition that contains liquid crystal exhibiting a blue phase and a chiral material has a short response speed and exhibits optical isotropy. In addition, the liquid crystal composition containing a liquid crystal exhibiting a blue phase and a chiral material does not need alignment treatment and has small viewing angle dependence. Since an alignment film does not need to be provided and rubbing treatment is unnecessary, electrostatic discharge damage caused by the rubbing treatment can be prevented and defects or damage of the liquid crystal display device in the manufacturing process can be reduced.

A spacer 4035 is a columnar spacer obtained by selective etching of an insulating layer and is provided in order to control a distance (a cell gap) between the first electrode layer 4030 and the second electrode layer 4031. Note that a spherical spacer may alternatively be used.

A black matrix (a light-blocking layer); a coloring layer (a color filter); an optical member (an optical substrate) such as a polarizing member, a retardation member, or an anti-reflection member; or the like may be provided as appropriate if needed. For example, circular polarization may be employed by using a polarizing substrate and a retardation substrate. In addition, a backlight, a side light, or the like may be used as a light source. A micro LED or the like may be used as the backlight or the side light.

In the display device shown in FIG. 21, a light-blocking layer 4132, a coloring layer 4131, and an insulating layer 4133 are provided between the substrate 4006 and the second electrode layer 4031.

Examples of a material that can be used for the light-blocking layer include carbon black, titanium black, a metal, a metal oxide, and a composite oxide containing a solid solution of a plurality of metal oxides. The light-blocking layer may be a film containing a resin material or may be a thin film of an inorganic material such as a metal. Stacked films containing the material of the coloring layer can also be used for the light-blocking layer. For example, a stacked-layer structure of a film containing a material of a coloring layer which transmits light of a certain color and a film containing a material of a coloring layer which transmits light of another color can be employed. It is preferable that the coloring layer and the light-blocking layer be formed using the same material because the same manufacturing apparatus can be used and the process can be simplified.

Examples of a material that can be used for the coloring layer include a metal material, a resin material, and a resin material containing a pigment or a dye. The light-blocking layer and the coloring layer can be formed by an inkjet method, for example.

The display device shown in FIG. 21 includes the insulating layer 4111 and an insulating layer 4104. As the insulating layer 4104 and the insulating layer 4111, insulating layers through which an impurity element does not easily pass are used. A semiconductor layer of the transistor is sandwiched between the insulating layer 4104 and the insulating layer 4111, whereby entry of impurities from the outside can be prevented.

Since the transistor is easily broken by static electricity or the like, a protective circuit for protecting the driver circuit is preferably provided. The protective circuit is preferably formed using a nonlinear element.

Figure 22:
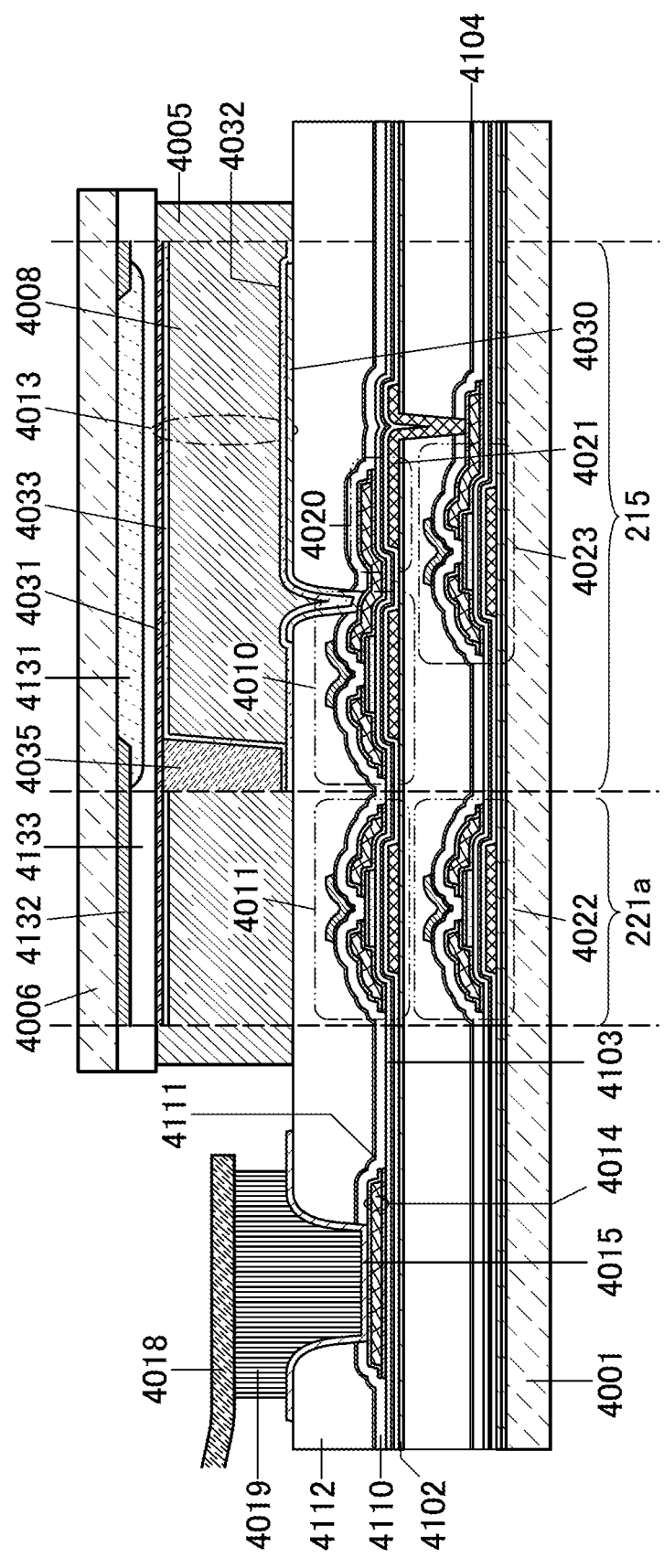
FIG. 22 A diagram showing a display device.

Note that as shown in FIG. 22, a stacked structure including a region where a transistor and a capacitor overlap with each other in the height direction may be employed. For example, when the transistor 4011 and a transistor 4022 included in the driver circuit are provided to overlap with each other, a display device with a narrow bezel can be provided. Furthermore, when the transistor 4010, a transistor 4023, the capacitor 4020, and the like included in the pixel circuit are provided to at least partly overlap with each other, the aperture ratio and the resolution can be improved.

In addition, a light-transmitting conductive film with high visible-light-transmitting property is used as an electrode or a wiring in the pixel circuit, whereby transmittance of light in the pixel can be increased and the aperture ratio can be substantially improved. Note that in the case where an OS transistor is used, a semiconductor layer also has a light-transmitting property and thus the aperture ratio can be further increased. These are effective even when transistors and the like are not stacked.

The display device may have a structure with a combination of a liquid crystal display device and a light-emitting device.

The light-emitting device is disposed on the side opposite to the display surface or on an end portion of the display surface. The light-emitting device has a function of supplying light to the display element. The light-emitting device can also be referred to as a backlight.

Here, the light-emitting device can include a plate-like or sheet-like light guide portion (also referred to as a light guide plate) and a plurality of light-emitting elements which emit light of different colors. When the light-emitting elements are disposed in the vicinity of the side surface of the light guide portion, light can be emitted from the side surface of the light guide portion to the inside. The light guide portion has a mechanism that changes an optical path (also referred to as a light extraction mechanism), and this enables the light-emitting device to emit light uniformly to a pixel portion of a display panel. Alternatively, the light-emitting device may be provided directly under the pixel without providing the light guide portion.

The light-emitting device preferably includes light-emitting elements of three colors: red (R), green (G), and blue (B). In addition, a light-emitting element of white (W) may be included. A light-emitting diode (LED) is preferably used as these light-emitting elements.

Furthermore, the light-emitting elements preferably have extremely high color purities; the full width at half maximum (FWHM) of the emission spectrum of the light-emitting element is less than or equal to 50 nm, preferably less than or equal to 40 nm, more preferably less than or equal to 30 nm, still more preferably less than or equal to 20 nm. Note that the full width at half maximum of the emission spectrum is preferably as small as possible, and can be, for example, greater than or equal to 1 nm. Thus, when color display is performed, a vivid image with high color reproducibility can be displayed.

As the red light-emitting element, an element whose wavelength of an emission spectrum peak is in a range from 625 nm to 650 nm is preferably used. As the green light-emitting element, an element whose wavelength of an emission spectrum peak is in a range from 515 nm to 540 nm is preferably used. As the blue light-emitting element, an element whose wavelength of an emission spectrum peak is in a range from 445 nm to 470 nm is preferably used.

The display device can make the light-emitting elements for the three colors blink sequentially, drive the pixels in synchronization with these light-emitting elements, and perform color display on the basis of the successive additive color mixing method. This driving method can also be referred to as a field-sequential driving.

By the field-sequential driving, a clear color image can be displayed. In addition, a smooth moving image can be displayed. When the above-described driving method is used, one pixel does not need to be formed with subpixels of different colors, which can make an effective reflection area (also referred to as an effective display area or an aperture ratio) per pixel large; thus, a bright image can be displayed. Furthermore, the pixels do not need to be provided with color filters, and thus can have improved transmittance and achieve brighter image display. In addition, the manufacturing process can be simplified, and the manufacturing costs can be reduced.

FIGS. 23(A) and 23(B) each show an example of a schematic cross-sectional view of a display device capable of the field-sequential driving. A backlight unit capable of emitting light of RGB colors is provided on the substrate 4001 side of the display device. Note that in the field-sequential driving, the RGB colors are expressed through time division light emission, and thus color filters are not needed.

A backlight unit 4340a illustrated in FIG. 23(A) has a structure in which a plurality of light-emitting elements 4342 are provided directly under a pixel with a diffusing plate 4352 positioned therebetween. The diffusing plate 4352 have functions of diffusing light emitted from the light-emitting element 4342 to the substrate 4001 side and making the luminance in a display portion uniform. Between the light-emitting element 4342 and the diffusing plate 4352, a polarizing plate may be provided if necessary. The diffusing plate 4352 is not necessarily provided if not needed. The light-blocking layer 4132 may be omitted.

A large number of light-emitting elements 4342 can be provided in the backlight unit 4340a, which enables bright image display. Moreover, there are advantages that a light guide plate is not needed and light efficiency of the light-emitting element 4342 is less likely to be lowered. Note that the light-emitting element 4342 may be provided with a light diffusion lens 4344 if necessary.

A backlight unit 4340b shown in FIG. 23(B) has a structure in which a light guide plate 4341 is provided directly under a pixel with the diffusing plate 4352 positioned therebetween. The plurality of light-emitting elements 4342 are provided at an end portion of the light guide plate 4341. The light guide plate 4341 has an uneven shape on the side opposite to the diffusing plate 4352, and can scatter waveguided light with the uneven shape to emit the light in the direction of the diffusing plate 4352.

The light-emitting element 4342 can be fixed to a printed board 4347. Note that though the light-emitting elements 4342 of RGB colors are arranged to overlap with each other in FIG. 23(B), the light-emitting elements 4342 of RGB colors can be arranged to be lined up in the depth direction. A reflective layer 4348 that reflects visible light may be provided on the side surface of the light guide plate 4341 which is opposite to the light-emitting element 4342.

The backlight unit 4340b can reduce the number of light-emitting elements 4342, leading to reductions in cost and thickness.

A light-scattering liquid crystal element may be used as the liquid crystal element. The light-scattering liquid crystal element is preferably an element containing a composite material of a liquid crystal and a polymer molecule. For example, a polymer-dispersed liquid crystal element can be used. Alternatively, a polymer network liquid crystal (PNLC) element may be used.

The light-scattering liquid crystal element has a structure in which a liquid crystal portion is provided in a three-dimensional network structure of a resin portion sandwiched between a pair of electrodes. As a material used in the liquid crystal portion, for example, a nematic liquid crystal can be used. A photocurable resin can be used for the resin portion. The photocurable resin can be a monofunctional monomer, such as acrylate or methacrylate; a polyfunctional monomer, such as diacrylate, triacrylate, dimethacrylate, or trimethacrylate; or a polymerizable compound obtained by mixing these.

The light-scattering liquid crystal element performs display by transmitting or scattering light utilizing the anisotropy of a refractive index of a liquid crystal material. The resin portion may have the anisotropy of a refractive index. When liquid crystal molecules are arranged in a certain direction in accordance with a voltage applied to the light-scattering liquid crystal element, a direction is generated at which a difference in a refractive index between the liquid crystal portion and the resin portion is small. Incident light along the direction passes without being scattered in the liquid crystal portion. Thus, the light-scattering liquid crystal element is perceived in a transparent state from the direction. In contrast, when liquid crystal molecules are arranged randomly in accordance with the applied voltage, a large difference in refractive index between the liquid crystal portion and the resin portion is not generated, and incident light is scattered in the liquid crystal portion. Thus, the light-scattering liquid crystal element is in an opaque state regardless of the viewing direction.

FIG. 24(A) shows a structure in which the liquid crystal element 4013 of the display device shown in FIG. 23(A) is replaced with a light-scattering liquid crystal element 4016. The light-scattering liquid crystal element 4016 includes a composite layer 4009 including a liquid crystal portion and a resin portion and the electrode layers 4030 and 4031. Although components relating to the field-sequential driving are the same as those in FIG. 23(A), when the light-scattering liquid crystal element 4016 is used, an alignment film and a polarizing plate are not necessary. Note that the spherical spacer 4035 is shown, but the spacer 4035 may have a columnar shape.

FIG. 24(B) shows a structure in which the liquid crystal element 4013 of the display device shown in FIG. 23(B) is replaced with the light-scattering liquid crystal element 4016. In the structure of FIG. 24(B), it is preferable that light be transmitted when a voltage is not applied to the light-scattering liquid crystal element 4016, and light be scattered when a voltage is applied. With such a structure, the display device can be transparent in a normal state (without display). In that case, color display can be performed when light scattering operation is performed.

Figure 25A:
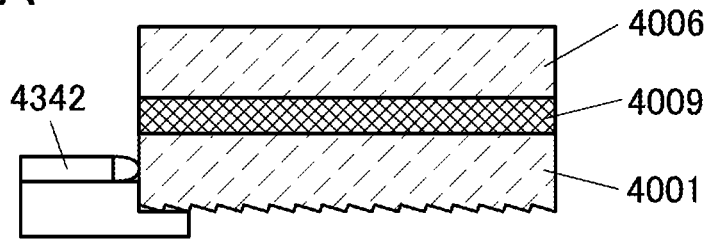
FIG. 25(A) to (E) Diagrams showing display devices.
Figure 25B:
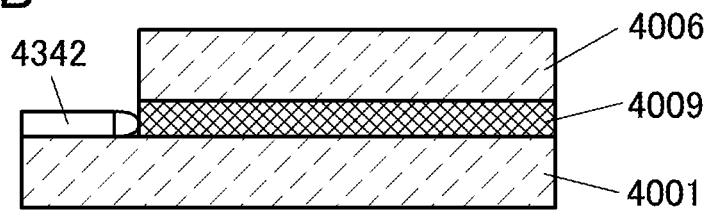

FIGS. 25(A) to 25(E) show modification examples of the display device in FIG. 24(B). Note that in FIGS. 25(A) to 25(E), some components in FIG. 25(B) are used and the other components are not shown for clarity.

FIG. 25(A) shows a structure in which the substrate 4001 has a function of a light guide plate. An uneven surface may be provided on an outer surface of the substrate 4001. With this structure, a light guide plate does not need to be provided additionally, leading to a reduction in a manufacturing cost. Furthermore, the attenuation of light caused by the light guide plate also does not occur; accordingly, light emitted from the light-emitting element 4342 can be efficiently utilized.

FIG. 25(B) shows a structure in which light enters from the vicinity of an end portion of the composite layer 4009. By utilizing total reflection at the interface between the composite layer 4009 and the substrate 4006 and the interface between the composite layer 4009 and the substrate 4001, light can be emitted to the outside from the light-scattering liquid crystal element. For the resin portion of the composite layer 4009, a material having a refractive index higher than that of the substrate 4001 and that of the substrate 4006 is used.

Figure 25C:
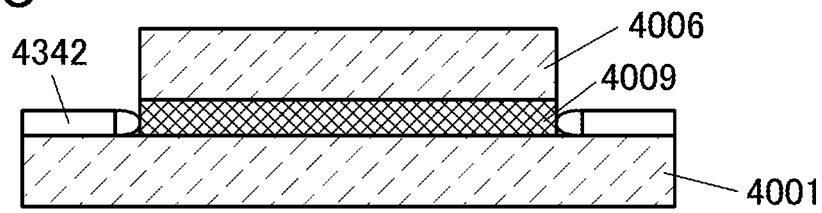

Note that the light-emitting element 4342 is not limited to be provided on one side of the display device, and may be provided on each of two sides facing each other as shown in FIG. 25(C). Furthermore, the light-emitting elements 4342 may be provided on three sides or four sides. When the light-emitting elements 4342 are provided on a plurality of sides, attenuation of light can be compensated for and application to a large-area display element is possible.

Figure 25D:
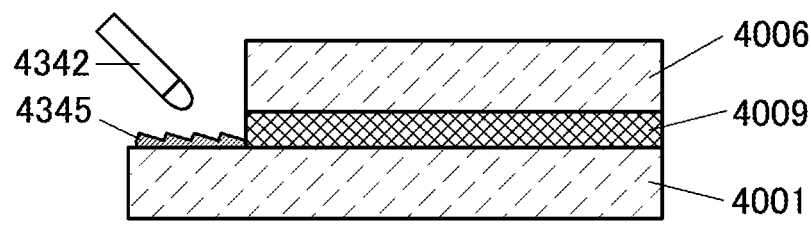

FIG. 25(D) shows a structure in which light emitted from the light-emitting element 4342 is guided to the display device through a mirror 4345. With this structure, light can be guided easily with a certain angle to the display device; thus, total reflection light can be obtained efficiently.

Figure 25E:
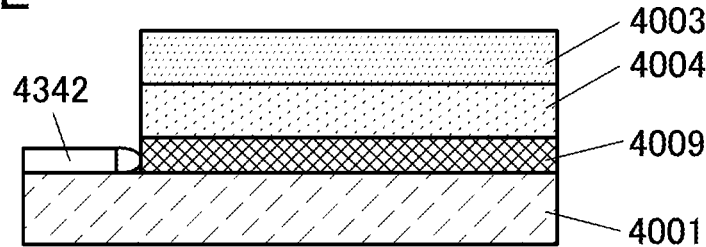

FIG. 25(E) shows a structure in which a layer 4003 and a layer 4004 are stacked over the composite layer 4009. One of the layer 4003 and the layer 4004 is a support such as a glass substrate, and the other can be formed of an inorganic film, a coating film of an organic resin, a film, or the like. For the resin portion of the composite layer 4009, a material having a refractive index higher than that of the layer 4004 is used. For the layer 4004, a material having a refractive index higher than that of the layer 4003 is used.

A first interface is formed between the composite layer 4009 and the layer 4004, and a second interface is formed between the layer 4004 and the layer 4003. With this structure, light passing through without being totally reflected at the first interface is totally reflected at the second interface and can be returned to the composite layer 4009. Accordingly, light emitted from the light-emitting element 4342 can be efficiently utilized.

Note that the structures in FIG. 24(B) and FIGS. 25(A) to 25(E) can be combined with each other.

This embodiment can be implemented in combination with any of the structures described in the other embodiments and the like, as appropriate.

Embodiment 3

In this embodiment, examples of transistors which can be used as the transistors described in the above embodiments will be described with reference to the drawings.

The display device of one embodiment of the present invention can be fabricated using a transistor with any of various structures, such as a bottom-gate transistor or a top-gate transistor. Therefore, a material for a semiconductor layer or the structure of a transistor can be easily changed depending on the existing production line.

[Bottom-Gate Transistor]

FIG. 26(A1) is a cross-sectional view of a channel-protective transistor 810, which is a type of a bottom-gate transistor, in the channel length direction. In FIG. 26(A1), the transistor 810 is formed over a substrate 771. The transistor 810 includes an electrode 746 over the substrate 771 with an insulating layer 772 therebetween. The transistor 810 includes a semiconductor layer 742 over the electrode 746 with an insulating layer 726 therebetween. The electrode 746 can function as a gate electrode. The insulating layer 726 can function as a gate insulating layer.

Furthermore, an insulating layer 741 is provided over a channel formation region in the semiconductor layer 742. Furthermore, an electrode 744a and an electrode 744b are provided to be partly in contact with the semiconductor layer 742 and over the insulating layer 726. The electrode 744a can function as one of a source electrode or a drain electrode. The electrode 744b can function as the other of the source electrode or the drain electrode. Part of the electrode 744a and part of the electrode 744b are formed over the insulating layer 741.

The insulating layer 741 can function as a channel protective layer. With the insulating layer 741 provided over the channel formation region, the semiconductor layer 742 can be prevented from being exposed at the time of forming the electrodes 744a and 744b. Thus, the channel formation region in the semiconductor layer 742 can be prevented from being etched at the time of forming the electrode 744a and the electrode 744b. According to one embodiment of the present invention, a transistor with favorable electrical characteristics can be provided.

The transistor 810 includes an insulating layer 728 over the electrode 744a, the electrode 744b, and the insulating layer 741 and further includes an insulating layer 729 over the insulating layer 728.

In the case where an oxide semiconductor is used for the semiconductor layer 742, a material capable of removing oxygen from part of the semiconductor layer 742 to generate oxygen vacancies is preferably used at least for portions of the electrode 744a and the electrode 744b which are in contact with the semiconductor layer 742. The carrier concentration in the regions of the semiconductor layer 742 where oxygen vacancies are generated is increased, so that the regions become n-type regions ($n^+$ layers). Accordingly, the regions can function as a source region and a drain region. When an oxide semiconductor is used for the semiconductor layer 742, examples of the material capable of removing oxygen from the semiconductor layer 742 to generate oxygen vacancies include tungsten and titanium.

Formation of the source region and the drain region in the semiconductor layer 742 makes it possible to reduce contact resistance between the semiconductor layer 742 and each of the electrode 744*a* and the electrode 744*b*. Accordingly, the electrical characteristics of the transistor, such as the field-effect mobility and the threshold voltage, can be improved.

In the case where a semiconductor such as silicon is used for the semiconductor layer 742, a layer that functions as an n-type semiconductor or a p-type semiconductor is preferably provided between the semiconductor layer 742 and the electrode 744*a* and between the semiconductor layer 742 and the electrode 744*b*. The layer that functions as an n-type semiconductor or a p-type semiconductor can function as the source region or the drain region in the transistor. The insulating layer 729 is preferably formed using a material that can prevent or reduce diffusion of impurities into the transistor from the outside. Note that the insulating layer 729 is not necessarily provided as needed.

A transistor 811 shown in FIG. 26(A2) is different from the transistor 810 in that an electrode 723 that can function as a back gate electrode is provided over the insulating layer 729. The electrode 723 can be formed using a material and a method similar to those of the electrode 746.

In general, a back gate electrode is formed using a conductive layer and positioned so that a channel formation region of a semiconductor layer is positioned between a gate electrode and the back gate electrode. Thus, the back gate electrode can function in a manner similar to that of the gate electrode. The potential of the back gate electrode may be the same as that of the gate electrode or may be a ground (GND) potential or a given potential. By changing the potential of the back gate electrode independently of the potential of the gate electrode, the threshold voltage of the transistor can be changed.

The electrode 746 and the electrode 723 can each function as a gate electrode. Thus, the insulating layer 726, the insulating layer 728, and the insulating layer 729 can each function as a gate insulating layer. The electrode 723 may be provided between the insulating layer 728 and the insulating layer 729.

In the case where one of the electrode 746 or the electrode 723 is referred to as a "gate electrode", the other is referred to as a "back gate electrode". For example, in the transistor 811, in the case where the electrode 723 is referred to as a "gate electrode", the electrode 746 is referred to as a "back gate electrode". In the case where the electrode 723 is used as a "gate electrode", the transistor 811 can be regarded as a kind of top-gate transistor. One of the electrode 746 and the electrode 723 may be referred to as a "first gate electrode", and the other may be referred to as a "second gate electrode".

By providing the electrode 746 and the electrode 723 with the semiconductor layer 742 provided therebetween and setting the potentials of the electrode 746 and the electrode 723 to the same potential, a region of the semiconductor layer 742 through which carriers flow is enlarged in the film thickness direction; thus, the number of transferred carriers is increased. As a result, the on-state current of the transistor 811 is increased and the field-effect mobility is increased.

Therefore, the transistor 811 has a high on-state current with respect to its occupied area. That is, the area occupied by transistor 811 can be small for a required on-state current. According to one embodiment of the present invention, the area of a transistor can be reduced. Therefore, according to one embodiment of the present invention, a semiconductor device having a high degree of integration can be provided.

The gate electrode and the back gate electrode are formed using conductive layers and thus each have a function of preventing an electric field generated outside the transistor from influencing the semiconductor layer in which the channel is formed (in particular, an electric field blocking function against static electricity and the like). When the back gate electrode is formed larger than the semiconductor layer such that the semiconductor layer is covered with the back gate electrode, the electric field blocking function can be enhanced.

When the back gate electrode is formed using a light-blocking conductive film, light can be prevented from entering the semiconductor layer from the back gate electrode side. Therefore, photodegradation of the semiconductor layer can be prevented, and deterioration in electrical characteristics of the transistor, such as a shift of the threshold voltage, can be prevented.

According to one embodiment of the present invention, a transistor with high reliability can be provided. Moreover, a semiconductor device with high reliability can be provided.

FIG. 26(B1) is a cross-sectional view of a channel-protective transistor 820, which has a structure different from FIG. 26(A1), in the channel length direction. The transistor 820 has substantially the same structure as the transistor 810 but is different from the transistor 810 in that the insulating layer 741 covers end portions of the semiconductor layer 742. The semiconductor layer 742 is electrically connected to the electrode 744*a* through an opening portion formed by selectively removing part of the insulating layer 741 that overlaps with the semiconductor layer 742. The semiconductor layer 742 is electrically connected to the electrode 744*b* through another opening portion formed by selectively removing part of the insulating layer 741 that overlaps with the semiconductor layer 742. A region of the insulating layer 741 that overlaps with the channel formation region can function as a channel protective layer.

A transistor 821 shown in FIG. 26(B2) is different from the transistor 820 in that the electrode 723 which can function as a back gate electrode is provided over the insulating layer 729. With the insulating layer 741, the semiconductor layer 742 can be prevented from being exposed at the time of forming the electrode 744*a* and the electrode 744*b*. Thus, the semiconductor layer 742 can be prevented from being reduced in thickness at the time of forming the electrode 744*a* and the electrode 744*b*.

The length between the electrode 744*a* and the electrode 746 and the length between the electrode 744*b* and the electrode 746 in the transistor 820 and the transistor 821 are larger than those in the transistor 810 and the transistor 811. Thus, the parasitic capacitance generated between the electrode 744*a* and the electrode 746 can be reduced. Moreover, the parasitic capacitance generated between the electrode 744*b* and the electrode 746 can be reduced. According to one embodiment of the present invention, a transistor with favorable electrical characteristics can be provided.

FIG. 26(C1) is a cross-sectional view of a channel-etched transistor 825, which is a type of bottom-gate transistor, in the channel length direction. In the transistor 825, the electrode 744*a* and the electrode 744*b* are formed without the insulating layer 741. Thus, part of the semiconductor layer 742 that is exposed at the time of forming the electrode 744*a* and the electrode 744*b* is etched in some cases. However, since the insulating layer 729 is not provided, the productivity of the transistor can be increased.

A transistor 826 shown in FIG. 26(C2) is different from the transistor 825 in that the electrode 723 that can function as a back gate electrode is provided over the insulating layer 729.

FIGS. 27(A1) to (C2) are cross-sectional views of the transistors 810, 811, 820, 821, 825, and 826 in the channel width direction, respectively.

In each of the structures shown in FIGS. 27(B2) and 27(C2), the gate electrode is connected to the back gate electrode, and the gate electrode and the back gate electrode have the same potential. In addition, the semiconductor layer 742 is positioned between the gate electrode and the back gate electrode.

The length of each of the gate electrode and the back gate electrode in the channel width direction is longer than the length of the semiconductor layer 742 in the channel width direction. In the channel width direction, the whole of the semiconductor layer 742 is covered with the gate electrode and the back gate electrode with the insulating layers 726, 741, 728, and 729 positioned therebetween.

In this structure, the semiconductor layer 742 included in the transistor can be electrically surrounded by electric fields of the gate electrode and the back gate electrode.

The transistor device structure in which the semiconductor layer 742 in which the channel formation region is formed is electrically surrounded by electric fields of the gate electrode and the back gate electrode, as in the transistor 821 or the transistor 826, can be referred to as a Surrounded channel (S-channel) structure.

With the S-channel structure, an electric field for inducing a channel can be effectively applied to the semiconductor layer 742 by one or both of the gate electrode and the back gate electrode, which improves the current drive capability of the transistor and offers high on-state current characteristics. In addition, the transistor can be miniaturized because the on-state current can be increased. The S-channel structure can also increase the mechanical strength of the transistor.

[Top-Gate Transistor]

A transistor 842 shown in FIG. 28(A1) is a type of a top-gate transistor. The transistor 842 is different from the transistor 830 and the transistor 840 in that the electrodes 744a and 744b are formed after the insulating layer 729 is formed. The electrode 744a and the electrode 744b are electrically connected to the semiconductor layer 742 through openings formed in the insulating layer 728 and the insulating layer 729.

Furthermore, part of the insulating layer 726 that does not overlap with the electrode 746 is removed, and an impurity 755 is introduced into the semiconductor layer 742 using the electrode 746 and the residual insulating layer 726 as masks, so that an impurity region can be formed in the semiconductor layer 742 in a self-aligned manner. The transistor 842 includes a region where the insulating layer 726 extends beyond end portions of the electrode 746. The semiconductor layer 742 in a region into which the impurity 755 is introduced through the insulating layer 726 has a lower impurity concentration than the semiconductor layer 742 in a region into which the impurity 755 is introduced not through the insulating layer 726. Thus, an LDD (Lightly Doped Drain) region is formed in a region of the semiconductor layer 742 which does not overlap with the electrode 746.

A transistor 843 shown in FIG. 28(A2) is different from the transistor 842 in that the electrode 723 is included. The transistor 843 includes the electrode 723 that is formed over the substrate 771. The electrode 723 includes a region overlapping with the semiconductor layer 742 with the insulating layer 772 therebetween. The electrode 723 can function as a back gate electrode.

As in a transistor 844 shown in FIG. 28(B1) and a transistor 845 shown in FIG. 28(B2), the insulating layer 726 in a region that does not overlap with the electrode 746 may be completely removed. Alternatively, as in a transistor 846 shown in FIG. 28(C1) and a transistor 847 shown in FIG. 28(C2), the insulating layer 726 may be left.

In the transistor 842 to the transistor 847, after the formation of the electrode 746, the impurity 755 is introduced into the semiconductor layer 742 using the electrode 746 as a mask, so that an impurity region can be formed in the semiconductor layer 742 in a self-aligned manner. According to one embodiment of the present invention, a transistor with favorable electrical characteristics can be provided. Furthermore, according to one embodiment of the present invention, a semiconductor device having a high degree of integration can be provided.

FIGS. 29(A1) to 29(C2) are cross-sectional views of the transistors 842, 843, 844, 845, 846, and 847 in the channel width direction, respectively.

The transistor 843, the transistor 845, and the transistor 847 each have the above-described S-channel structure. However, one embodiment of the present invention is not limited to this, and the transistor 843, the transistor 845, and the transistor 847 do not necessarily have the S-channel structure.

This embodiment can be implemented in combination with any of the structures described in the other embodiments and the like, as appropriate.

Embodiment 4

Examples of an electronic device that can use the display device in one embodiment of the present invention include display devices, personal computers, image storage devices or image reproducing devices provided with storage media, cellular phones, game machines including portable game machines, portable data terminals, e-book readers, cameras such as video cameras and digital still cameras, goggle-type displays (head mounted displays), navigation systems, audio reproducing devices (e.g., car audio players and digital audio players), copiers, facsimiles, printers, multifunction printers, automated teller machines (ATM), and vending machines. FIG. 30 shows specific examples of these electronic devices.

Figure 30A:
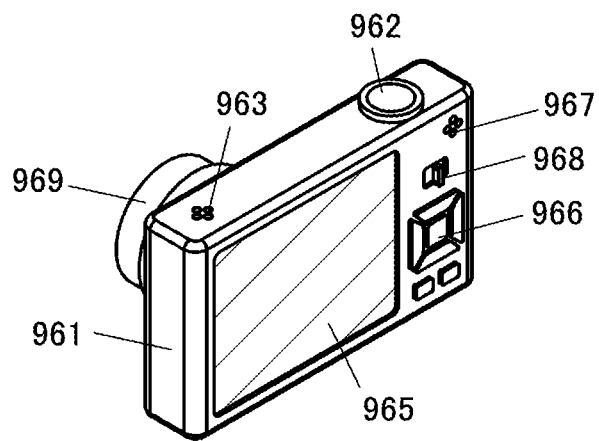
FIG. 30(A) to (F) Diagrams showing electronic devices.

FIG. 30(A) is a digital camera, which includes a housing 961, a shutter button 962, a microphone 963, a speaker 967, a display portion 965, operation keys 966, a zoom lever 968, a lens 969, and the like. The use of the display device of one embodiment of the present invention for the display portion 965 enables display of a variety of images.

Figure 30B:
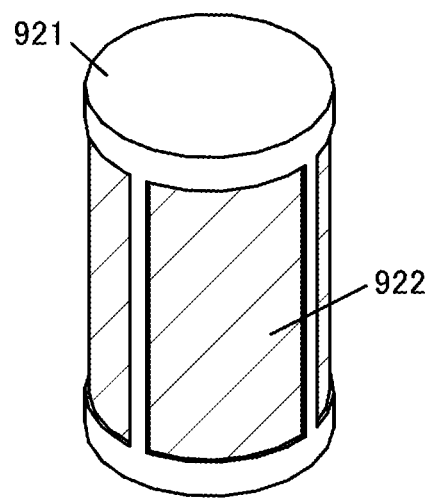

FIG. 30(B) is digital signage, which includes a large display portion 922. The digital signage can be installed on the side surface of a pillar 921, for example. The use of the display device of one embodiment of the present invention for the display portion 922 enables display with high quality.

Figure 30C:
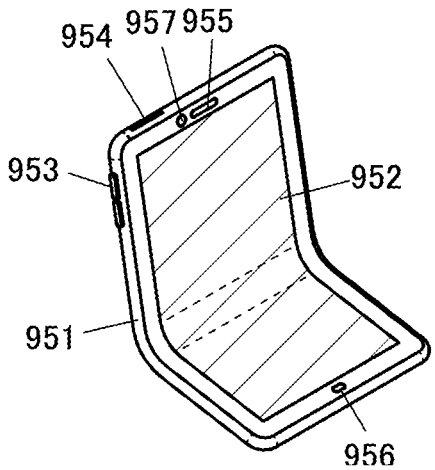

FIG. 30(C) shows an example of a cellular phone, which includes a housing 951, a display portion 952, an operation button 953, an external connection port 954, a speaker 955, a microphone 956, a camera 957, and the like. The display portion 952 of the cellular phone includes a touch sensor. Operations such as making a call and inputting text can be performed by touch on the display portion 952 with a finger, a stylus, or the like. The housing 951 and the display portion 952 have flexibility and can be used in a bent state as shown in the figure. The use of the display device of one embodiment of the present invention for the display portion 952 enables display of a variety of images.

Figure 30D:
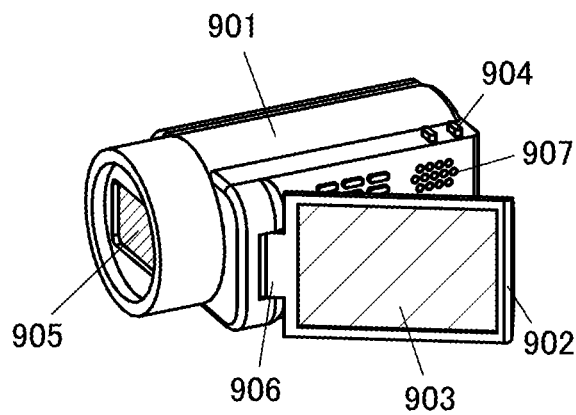

FIG. 30(D) is a video camera, which includes a first housing 901, a second housing 902, a display portion 903, an operation key 904, a lens 905, a connection portion 906, a speaker 907, and the like. The operation key 904 and the lens 905 are provided on the first housing 901, and the display portion 903 is provided on the second housing 902. The use of the display device of one embodiment of the present invention for the display portion 903 enables display of a variety of images.

Figure 30E:
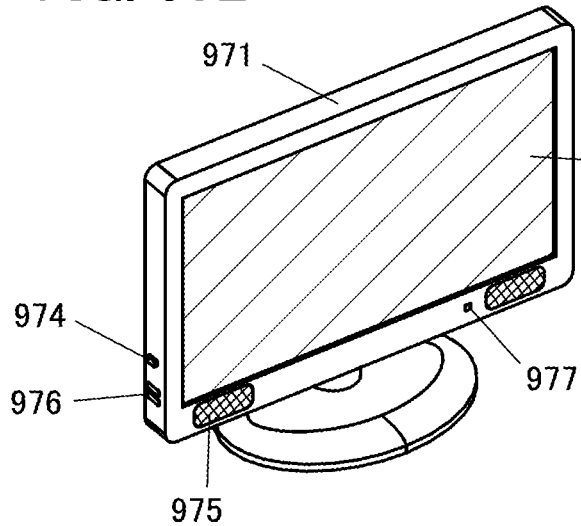

FIG. 30(E) is a television, which includes a housing 971, a display portion 973, an operation key 974, speakers 975, a communication connection terminal 976, an optical sensor 977, and the like. The display portion 973 includes a touch sensor that enables input operation. The use of the display device of one embodiment of the present invention for the display portion 973 enables display of a variety of images.

Figure 30F:
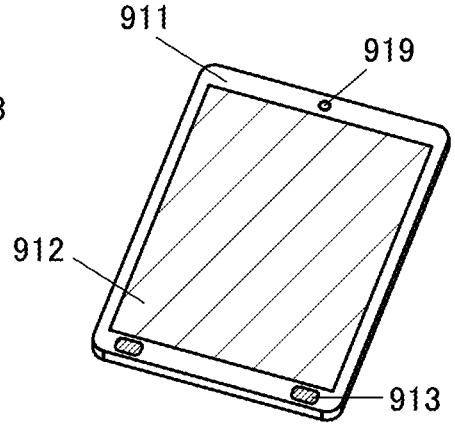

FIG. 30(F) shows a portable data terminal, which includes a housing 911, a display portion 912, speakers 913, a camera 919, and the like. A touch panel function of the display portion 912 enables input and output of information. The use of the display device of one embodiment of the present invention for the display portion 912 enables display of a variety of images.

This embodiment can be implemented in combination with any of the structures described in the other embodiments and the like, as appropriate.

REFERENCE NUMERALS

10: pixel, 11: circuit block, 12: source driver, 13: gate driver, 14: selection circuit, 15: power supply circuit, 101: transistor, 102: transistor, 103: transistor, 104: capacitor, 105: capacitor, 106: capacitor, 107: liquid crystal element, 110: circuit block, 121: wiring, 122: wiring, 123: wiring, 124: wiring, 125: wiring, 126: wiring, 127: wiring, 128: wiring, 132: wiring, 133: wiring, 215: display portion, 221$a$: scan line driver circuit, 231$a$: signal line driver circuit, 232$a$: signal line driver circuit, 241$a$: common line driver circuit, 723: electrode, 726: insulating layer, 728: insulating layer, 729: insulating layer, 741: insulating layer, 742: semiconductor layer, 744$a$: electrode, 744$b$: electrode, 746: electrode, 755: impurity, 771: substrate, 772: insulating layer, 810: transistor, 811: transistor, 820: transistor, 821: transistor, 825: transistor, 826: transistor, 830: transistor, 840: transistor, 842: transistor, 843: transistor, 844: transistor, 845: transistor, 846: transistor, 847: transistor, 901: housing, 902: housing, 903: display portion, 904: operation key, 905: lens, 906: connecting portion, 907: speaker, 911: housing, 912: display portion, 913: speaker, 919: camera, 921: pillar, 922: display portion, 951: housing, 952: display portion, 953: operation button, 954: external connection port, 955: speaker, 956: microphone, 957: camera, 961: housing, 962: shutter button, 963: microphone, 965: display portion, 966: operation key, 967: speaker, 968: zoom lever, 969: lens, 971: housing, 973: display portion, 974: operation key, 975: speaker, 976: communication connection terminal, 977: optical sensor, 4001: substrate, 4003: layer, 4004: layer, 4005: sealant, 4006: substrate, 4008: liquid crystal layer, 4009: compound layer, 4010: transistor, 4011: transistor, 4013: liquid crystal element, 4014: wiring, 4015: electrode, 4016: light-scattering liquid crystal element, 4017: electrode, 4018: FPC, 4019: anisotropic conductive layer, 4020: capacitor, 4021: electrode, 4022: transistor, 4023: transistor, 4030: electrode layer, 4031: electrode layer, 4032: insulating layer, 4033: insulating layer, 4035: spacer, 4041: printed circuit board, 4042: IC, 4102: insulating layer, 4103: insulating layer, 4104: insulating layer, 4110: insulating layer, 4111: insulating layer, 4112: insulating layer, 4131: coloring layer, 4132: light-blocking layer, 4133: insulating layer, 4200: input device, 4210: touch panel, 4227: electrode, 4228: electrode, 4237: wiring, 4238: wiring, 4239: wiring, 4263: substrate, 4272$b$: FPC, 4273$b$: IC, 4340$a$: backlight unit, 4340$b$: backlight unit, 4341: light guide plate, 4342: light-emitting element, 4344: lens, 4345: mirror, 4347: printed circuit board, 4348: reflection layer, 4352: diffusing plate This application is based on Japanese Patent Application Serial No. 2018-073883 filed with Japan Patent Office on Apr. 6, 2018, the entire contents of which are hereby incorporated herein by reference.

What is claimed is:

1. A display device comprising:
   a first pixel;
   a second pixel;
   a first wiring;
   a second wiring;
   a third wiring;
   a fourth wiring;
   a fifth wiring; and
   a sixth wiring,
   wherein each of the first pixel and the second pixel comprises a first transistor, a first memory, a second memory, and a liquid crystal element,
   wherein in each of the first pixel and the second pixel:
      a gate of the first transistor is electrically connected to the first wiring;
      one of a source and a drain of the first transistor is electrically connected to the sixth wiring;
      the other of the source and the drain of the first transistor is electrically connected to one of electrodes of the liquid crystal element;
      the first memory is electrically connected to the second wiring;
      the first memory is electrically connected to the one of the electrodes of the liquid crystal element;
      the second memory is electrically connected to the third wiring; and
      the second memory is electrically connected to the one of the electrodes of the liquid crystal element,
   wherein in the first pixel:
      the first memory is electrically connected to the fourth wiring; and
      the second memory is electrically connected to the fifth wiring,
   wherein in the second pixel:
      the first memory is electrically connected to the fifth wiring; and
      the second memory is electrically connected to the fourth wiring.

2. The display device according to claim 1,
   wherein each of the first pixel and the second pixel comprises a first capacitor, and
   wherein in each of the first pixel and the second pixel, one of electrodes of the first capacitor is electrically connected to the one of the electrodes of the liquid crystal element.

3. The display device according to claim 1,
   wherein the first memory comprises a second transistor and a second capacitor,
   wherein the second memory comprises a third transistor and a third capacitor,
   wherein in each of the first pixel and the second pixel:
      a gate of the second transistor is electrically connected to the second wiring;

one of a source and a drain of the second transistor is electrically connected to one of electrodes of the second capacitor;

the other of the electrodes of the second capacitor is electrically connected to the one of the electrodes of the liquid crystal element;

a gate of the third transistor is electrically connected to the third wiring;

one of a source and a drain of the third transistor is electrically connected to one of electrodes of the third capacitor; and the other of the electrodes of the third capacitor is electrically connected to the one of the electrodes of the liquid crystal element, wherein in the first pixel:

the other of the source and the drain of the second transistor is electrically connected to the fourth wiring; and the other of the source and the drain of the third transistor is electrically connected to the fifth wiring, wherein in the second pixel:

the other of the source and the drain of the second transistor is electrically connected to the fifth wiring; and the other of the source and the drain of the third transistor is electrically connected to the fourth wiring.

4. The display device according to claim 1, further comprising a third pixel and a fourth pixel, wherein each of the third pixel and the fourth pixel comprises a fourth transistor, wherein in each of the third pixel and the fourth pixel:

a gate of the fourth transistor is electrically connected to the first wiring; and one of a source and a drain of the fourth transistor is electrically connected to the sixth wiring.

5. The display device according to claim 1,
wherein the liquid crystal element is driven with an OCB mode.

6. The display device according to claim 1,
wherein the liquid crystal element comprises a polymer-dispersed liquid crystal.

7. The display device according to claim 1,
wherein the first transistor comprises a metal oxide in a channel formation region, and
wherein the metal oxide includes In, Zn, and M (M is Al, Ti, Ga, Sn, Y, Zr, La, Ce, Nd, or Hf).

8. An electronic device comprising:
the display device according to claim 1; and
a camera.

9. An operation method of a display device wherein one of a source and a drain of a transistor, one of electrodes of a first capacitor and one of electrodes of a second capacitor are electrically and directly connected to a node to which one of electrodes of a liquid crystal element is connected, comprising:

a first step of supplying a first potential to the one of the electrodes of the liquid crystal element through the transistor and supplying a second potential to the other of the electrodes of the first capacitor;

a second step of supplying a third potential to the other of the electrodes of the second capacitor;

a third step of supplying a fourth potential to the one of the electrodes of the liquid crystal element through the transistor and supplying a fifth potential to the other of the electrodes of the first capacitor; and a fourth step of supplying a sixth potential to the other of the electrodes of the first capacitor, wherein the first step, the second step, the third step, and the fourth step are performed in this order, wherein the first potential and the fourth potential are the same, and wherein the second potential is an inversion potential of the sixth potential.

10. The operation method of a display device according to claim 9,
wherein absolute values of the second potential and the fifth potential are twice the value of an absolute value of the first potential or the fourth potential or a neighborhood value of twice the value.

* * * * *